(12) United States Patent
Chidambarakrishnan et al.

(10) Patent No.: US 9,944,891 B2
(45) Date of Patent: *Apr. 17, 2018

(54) PROCESS FOR REDUCING ETHANOL LOSS WHILE DEVELOPING DESIRABLE ORGANOLEPTICS DURING WOODEN BARREL AGING OF ALCOHOLIC BEVERAGE

(71) Applicant: Cryovac, Inc., Duncan, SC (US)

(72) Inventors: Seetharaman Chidambarakrishnan, Bangalore (IN); Sumita S. Ranganathan, Simpsonville, SC (US); Robert Babrowicz, Spartanburg, SC (US); Angela Elizabeth Morgan, Greer, SC (US)

(73) Assignee: Cryovac, Inc., Charlotte, NC (US)

( * ) Notice: Subject to any disclaimer, the term of this patent is extended or adjusted under 35 U.S.C. 154(b) by 551 days.

This patent is subject to a terminal disclaimer.

(21) Appl. No.: 14/333,867

(22) Filed: Jul. 17, 2014

(65) Prior Publication Data

US 2015/0037459 A1    Feb. 5, 2015

Related U.S. Application Data

(60) Provisional application No. 61/861,563, filed on Aug. 2, 2013, provisional application No. 61/847,803, filed on Jul. 18, 2013.

(51) Int. Cl.
*C12H 1/22* (2006.01)
*C12G 3/08* (2006.01)
(Continued)

(52) U.S. Cl.
CPC ............... *C12G 3/085* (2013.01); *B32B 3/06* (2013.01); *B32B 21/08* (2013.01); *B32B 27/08* (2013.01);
(Continued)

(58) Field of Classification Search
CPC ......... B32B 21/08; B32B 27/08; B32B 27/16; B32B 27/325; B32B 3/06; B32B 27/32;
(Continued)

(56) References Cited

U.S. PATENT DOCUMENTS 2,027,403 A    1/1936 Shepherd
2,050,461 A    8/1936 Perry
(Continued)

FOREIGN PATENT DOCUMENTS

CN    201140823    10/2008
CN    202170060    3/2012
(Continued)

OTHER PUBLICATIONS

Randy Jester, Cyclic Olefin Copolymer Enhances Polyolefin Blends for Film Packaging, Plastics Technology, May 2011, 3 pages.
(Continued)

*Primary Examiner* — Vera Stulii
(74) *Attorney, Agent, or Firm* — Rupert B. Hurley, Jr.

(57) ABSTRACT

An alcoholic beverage is aged in a wooden barrel after the barrel is covered by a film having an oxygen transmission rate of at least 50 cc/m$^2$/day and an ethanol transmission rate of less than 30 g/m$^2$/day. The beverage acquires one or more specific flavor components in an amount of 50%, 75%, or 100% relative to amounts of one or more of the same flavor components in a control alcoholic beverage aged in a wooden barrel without the film thereon. Covering the barrel with the film reduces the angels' share evaporative loss, while allowing the beverage to develop desirable flavor components during aging. In another embodiment, the process reduces angels' share evaporative loss while achieving organoleptics indistinguishable from a control.

19 Claims, 31 Drawing Sheets

(51) Int. Cl.
    *B32B 27/32* (2006.01)
    *C12G 3/07* (2006.01)
    *C12L 11/00* (2006.01)
    *B32B 21/08* (2006.01)
    *B32B 27/08* (2006.01)
    *B32B 27/16* (2006.01)
    *B32B 3/06* (2006.01)
    *C12H 1/12* (2006.01)

(52) U.S. Cl.
    CPC .............. *B32B 27/16* (2013.01); *B32B 27/32* (2013.01); *B32B 27/325* (2013.01); *C12G 3/065* (2013.01); *C12H 1/12* (2013.01); *C12H 1/22* (2013.01); *C12L 11/00* (2013.01); *B32B 2270/00* (2013.01); *B32B 2307/51* (2013.01); *B32B 2307/518* (2013.01); *B32B 2307/72* (2013.01); *B32B 2439/00* (2013.01)

(58) Field of Classification Search
    CPC .......... C12G 3/085; C12G 3/065; C12H 1/22; C12H 1/12; C12L 11/00
    USPC .......................................................... 426/11
    See application file for complete search history.

(56) References Cited

U.S. PATENT DOCUMENTS

| | | | |
|---|---|---|---|
| 2,294,744 A | | 9/1942 | Gallagher |
| 2,865,770 A | | 12/1958 | Nickol |
| 2,943,940 A | | 7/1960 | Wiedemann |
| 3,001,877 A | | 9/1961 | Shapiro |
| 3,462,038 A | | 8/1969 | Morris |
| 5,174,461 A | | 12/1992 | Sullivan |
| 5,492,947 A | | 2/1996 | Wood et al. |
| 5,629,398 A | * | 5/1997 | Okamoto ................ C08F 32/00 524/553 |
| 6,703,060 B1 | | 3/2004 | Gross, II et al. |
| 6,790,468 B1 | | 9/2004 | Mize et al. |
| 8,012,572 B2 | | 9/2011 | Ramli et al. |
| 2004/0005394 A1 | | 1/2004 | Planas-Navarro |
| 2006/0099436 A1 | | 5/2006 | Schwark et al. |
| 2007/0240579 A1 | | 10/2007 | Boake |
| 2009/0061061 A1 | | 3/2009 | Beckwith et al. |
| 2010/0025396 A1 | | 2/2010 | Boake |
| 2011/0068037 A1 | | 3/2011 | Ozaki et al. |
| 2011/0070331 A1 | | 3/2011 | Watson et al. |
| 2011/0129589 A1 | | 6/2011 | Watson et al. |
| 2012/0164300 A1 | | 6/2012 | Niazi |
| 2014/0160465 A1 | | 6/2014 | Malcolm et al. |

FOREIGN PATENT DOCUMENTS

| | | | |
|---|---|---|---|
| CN | 202186612 | | 4/2012 |
| CN | 202193328 | | 4/2012 |
| DE | 10064618 A1 | | 7/2002 |
| FR | 2571382 A1 | | 4/1986 |
| JP | 57008777 A | * | 1/1982 |
| WO | 2009109121 A1 | | 9/2009 |

OTHER PUBLICATIONS

Vernon Singleton, Maturation of Wines and Spirits: Comparisons, Facts, and Hypotheses, AM. J. Vitic., vol. 46, No. 1, 1995.

Topas Advanced Polymers, High Barrier for Antiseptic Packaging, 19 pages.

Celanese, Fortron Polyphenylene Sulfide(PPS) FX4382T1 Data Sheet, 3 pages.

Neal Palmer, The Controlled Ingress of Oxygen Into Wine Storage Vessels in Duplication of the Oxidative Function of Oak Barrels, 6 pages.

Appendix K: RACT Analysis for Wine Fermentation, Wine Storage Tanks, and Brandy Aging, Apr. 30, 2007.

Emission Factor and Inventory Group, Emission Factor Documentation for AP-42, Section 9.12.3, Distilled Spirits Final Report, Mar. 1997.

Emission Factor and Inventory Group, Emission Factor Documentation for AP-42, Section 9.12.3 Distilled Spirits Final Report, Appendices Only, Mar. 1997.

Dharmadhikari, Murli. "Oak Aging of Red Wine | Midwest Grape and Wine Industry Institute". Extension.iastate.edu. N.p., 2017. Web. Mar. 23, 2017.

Poisson, Luigi, and Peter Schieberle. "Characterization of the Most Odor-Active Compounds in an American Bourbon Whisky by Application of the Aroma Extract Dilution Analysis". Journal of Agricultural and Food Chemistry 56.14 (2008): 5813-5819.

* cited by examiner

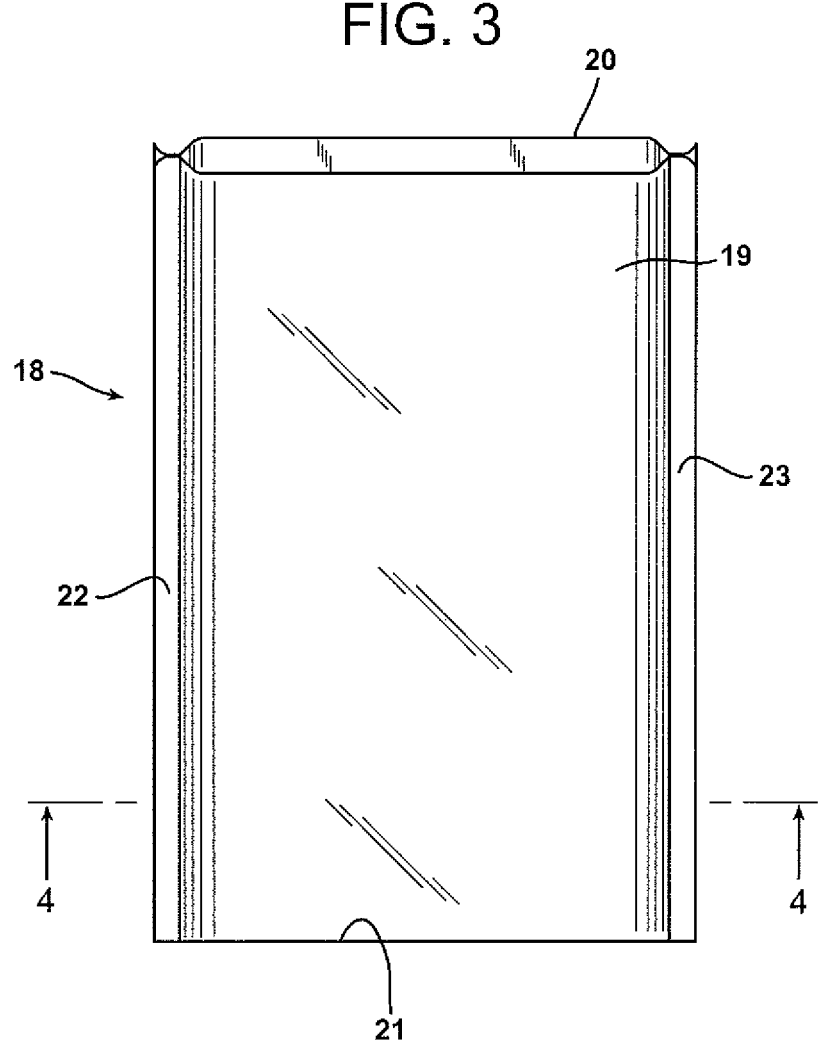
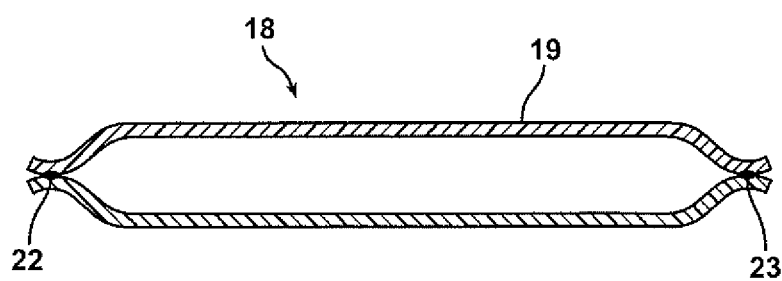

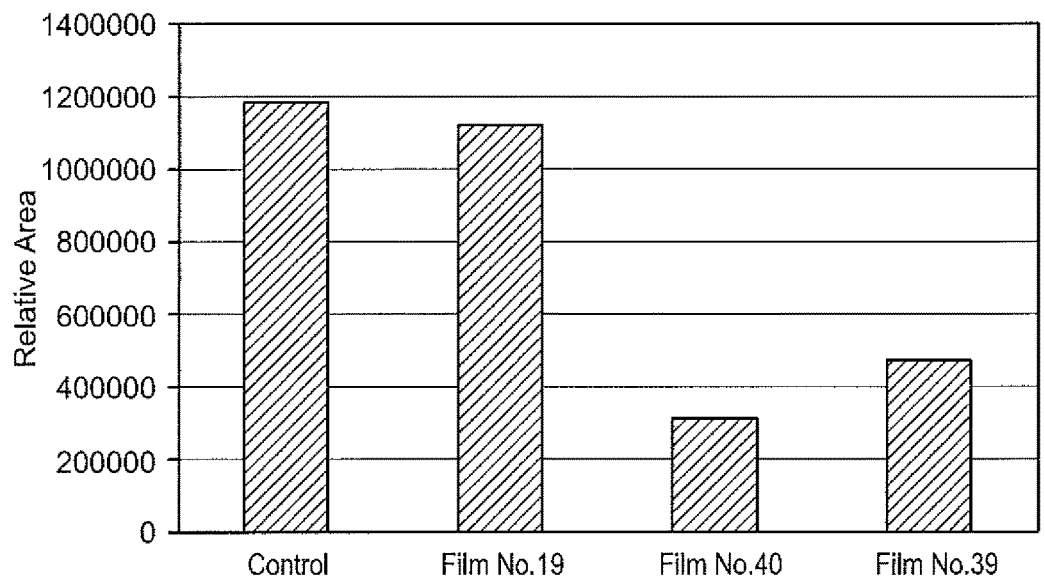
FIG. 31 Syringaldehyde
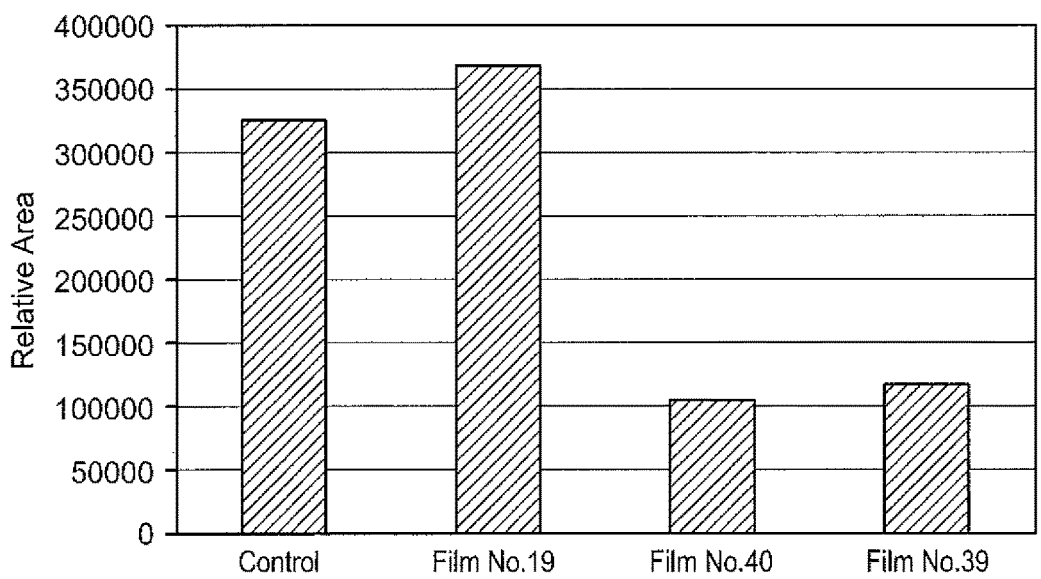
FIG. 32 Syringol

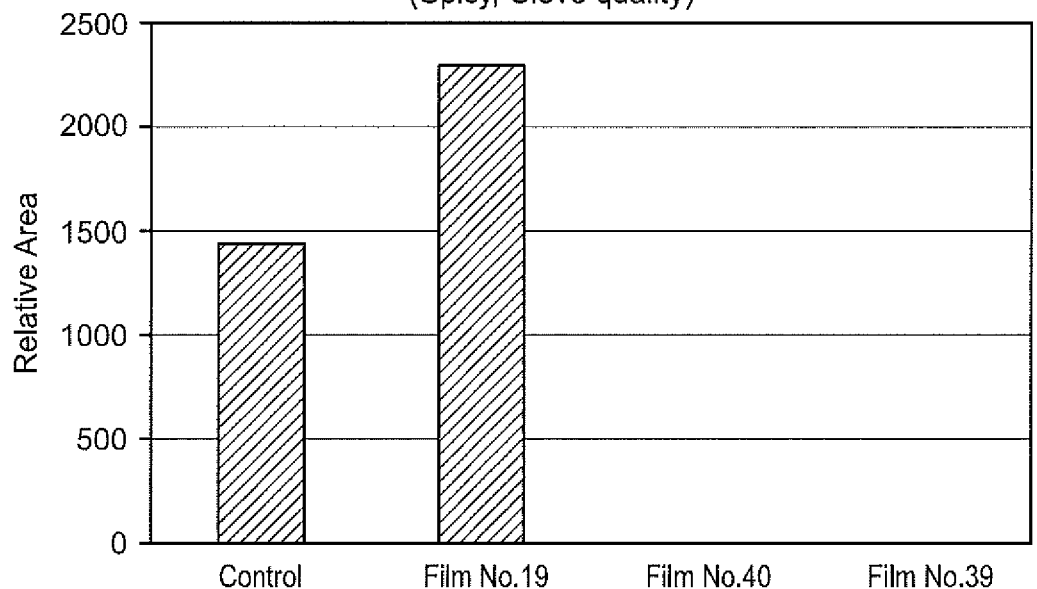
FIG. 33 Eugenol (Spicy, Clove quality)
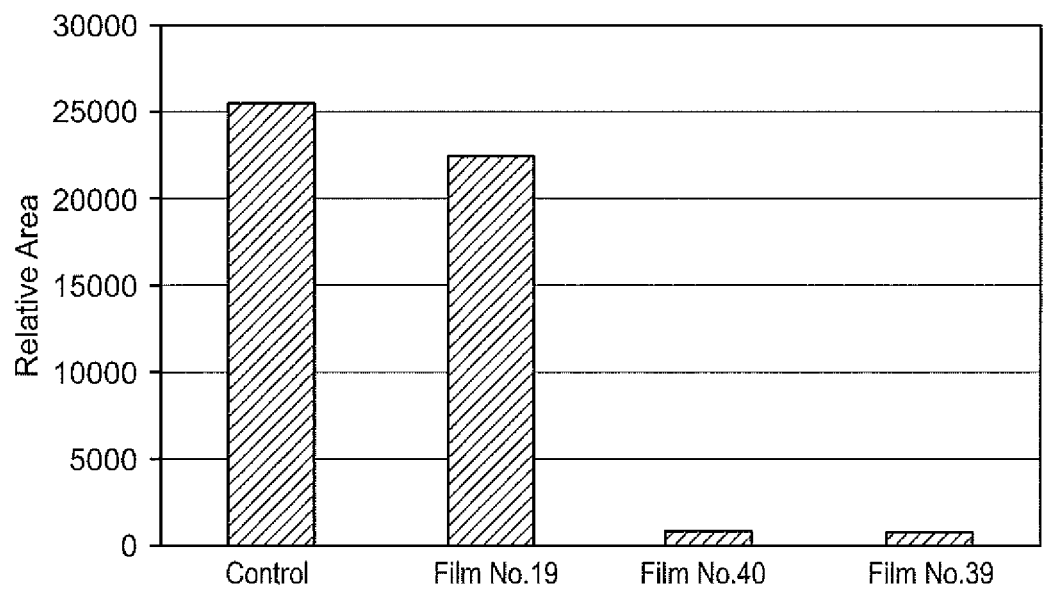
FIG. 34 Isoeugenol

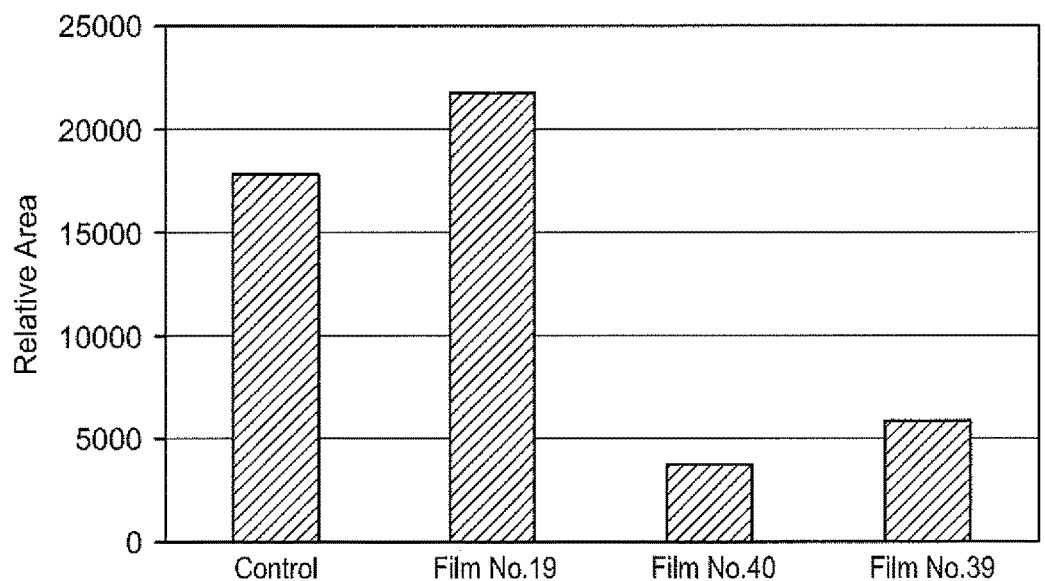
FIG. 39 4-Ethylguaiacol
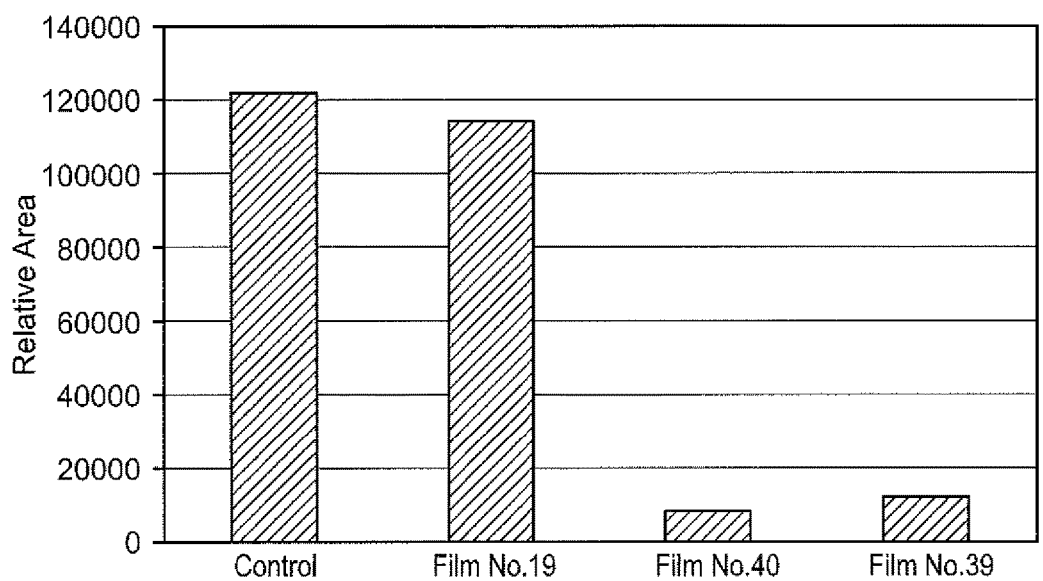
FIG. 40 4-Vinylguaiacol

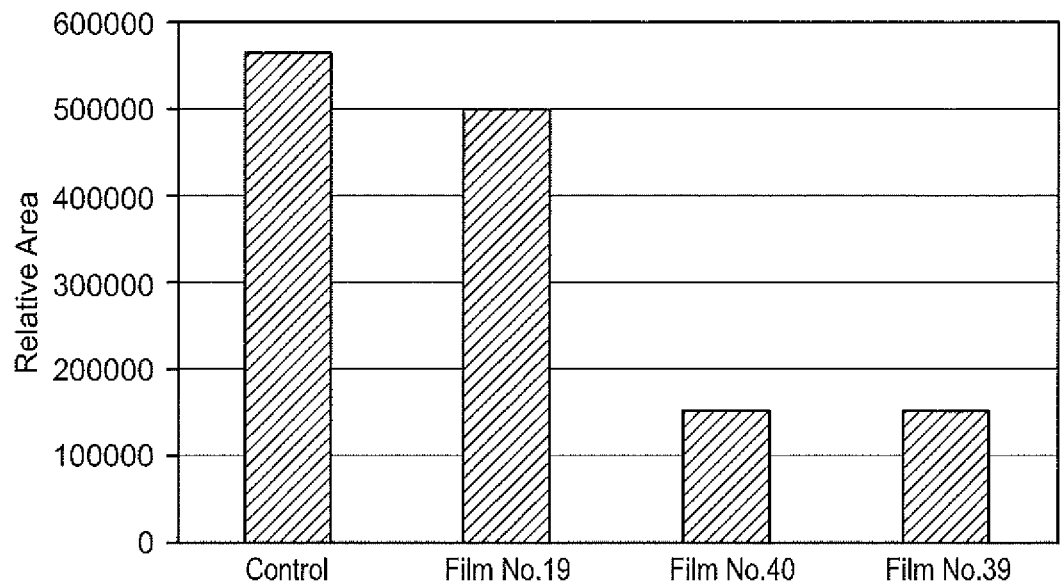
FIG. 43 Sinapaldehyde
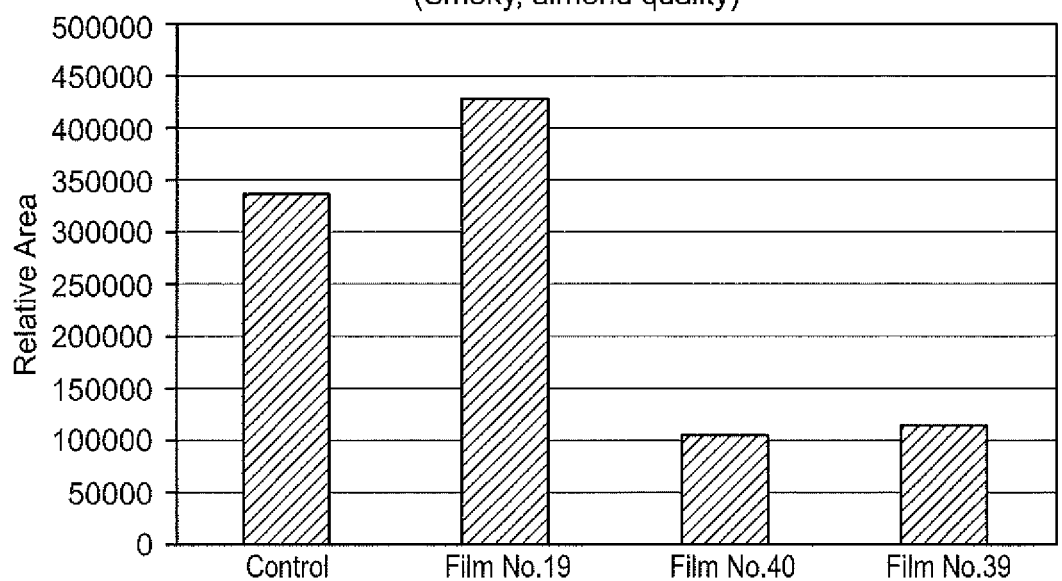
FIG. 44 Furfural (Smoky, almond quality)

PROCESS FOR REDUCING ETHANOL LOSS WHILE DEVELOPING DESIRABLE ORGANOLEPTICS DURING WOODEN BARREL AGING OF ALCOHOLIC BEVERAGE

This application claims priority from provisional U.S. Ser. No. 61/847,803, filed 18 Jul. 2013, and U.S. Ser. No. 61/861,563, filed 2 Aug. 2013, each of which is hereby incorporated, in its entirety, by reference thereto.

BACKGROUND

The present invention is directed to the wooden barrel aging of alcoholic beverages such as distilled spirits, wine, and beer. During typical wooden barrel aging of distilled spirits derived from grains and other farm sources, from 2 to 50 wt % or more of the distilled ethanol and water in the mixture diffuses between and through the wooden barrel components (staves and heads) and thereafter evaporates into the surrounding atmosphere. The diffusion and evaporation continues throughout the aging period, which can be from a few weeks or months up to 20 years or more. The extent of evaporation depends on the initial alcohol content of the distillate, the duration of aging in the wooden barrels, relative humidity, ambient temperature, etc. The distilled spirits industry defines this loss as the "angels' share."

The amount of water, ethanol, etc lost through evaporation when aging distilled spirits in 53 gallon white oak barrels over periods of time ranging from 1 to 20+ years ranges from about 2% per year to about 10% per year, depending upon the ambient conditions during aging, e.g., depending upon the climate. The distillate is considerably stronger upon emerging from the distillation process than it is after aging for 10 years, as ethanol loss is greater than water loss. The loss of ethanol during aging has adverse effects over and above the loss of the alcohol itself. The release of alcohol into the atmosphere around the barrels produces an explosion hazard, as the high ethanol content in the air can ignite explosively if subjected to spark or flame. Evaporated ethanol released into the ambient environment also serves as sustenance for black fungi and/or molds growing on warehouse walls, adjacent buildings, cars, etc.

For many decades, distillers have attempted to reduce the angels' share during aging of distilled spirits and wine in wooden casks. Barrels have been provided with coatings, including coating of the outer surface of barrel staves and/or barrel heads. Bonding agents have been used between the staves. Barrels have been made from reconstructed staves having intermediate plies of non-porous material. Barrels have been placed inside bags made from a multilayer film having an aluminum foil layer with vinyl on each side, with the atmosphere evacuated and the bag heat sealed closed. Wooden barrels have been suspended in a secondary container (e.g., metal barrel) over a reservoir of ethanol inside the metal barrel. Metal barrels containing distillate have been aged by suspending wooden staves in the distillate, with oxygen supplied to the system. Finely pulverized wood has been added to distillate in a container to accelerate aging of the distillate. Aging of distillates has also been accelerated by increasing the reaction of ethanol with the atmospheric oxygen. However, none of these solutions has proven to significantly reduce the Angels' Share while maintaining or improving the organoleptic properties of the alcoholic beverage. It would be desirable to find a way to age alcoholic beverage in a manner allowing the development of desirable organoleptic character while reducing loss due to angels' share diffusion and evaporation.

SUMMARY

A process has been discovered to reduce the Angels' Share loss during the aging of alcoholic beverage products while maintaining or improving the organoleptic content of the alcoholic beverage.

A first aspect is directed to a process for aging an alcoholic beverage, comprising (a) filling a first wooden barrel with an unaged alcoholic beverage, the barrel having an outer surface; (b) covering at least 60 percent of the outer surface of the first wooden barrel with a film having an oxygen transmission rate of at least 50 cc/m$^2$/day and an ethanol transmission rate of less than 30 g/m$^2$/day; and (c) aging the unaged alcoholic beverage under ambient conditions while the alcoholic beverage remains in the first wooden barrel surrounded by the film for a time period of at least 1 month, to produce an aged alcoholic beverage, wherein during aging, the alcoholic beverage acquires or produces at least one flavor component selected from the group consisting of vanillin, guaiacol, syringaldehyde, syringol, eugenol, isoeugenol, cis-β-methyl-γ-octalactone, o-cresol, 2-methoxy-4-methylphenol, 4-methylsyringol, 4-ethylguaiacol, 4-vinylguaiacol, vanillyl methyl ketone, methoxyeugenol, sinapaldehyde, and furfural, so that the aged alcoholic beverage contains the at least one flavor component in an amount of at least 50% relative to an amount of the same flavor component in a control alcoholic beverage aged in a control wooden barrel without any film covering the control barrel during aging.

In an embodiment, at least 75% of the outer surface of the first wooden barrel is covered with the film, and the aged alcoholic beverage contains the at least one flavor component in an amount of at least 75% relative to the amount of the same flavor component in the control alcoholic beverage.

In an embodiment, the aged alcoholic beverage contains each flavor component in the group consisting of vanillin, guaiacol, syringaldehyde, syringol, eugenol, isoeugenol, cis-β-methyl-γ-octalactone, o-cresol, 2-methoxy-4-methylphenol, 4-methylsyringol, 4-ethylguaiacol, 4-vinylguaiacol, vanillyl methyl ketone, methoxyeugenol, sinapaldehyde, and furfural in an amount of at least 75% relative to the amount of each corresponding flavor component in the control alcoholic beverage.

In an embodiment, the film surrounds the outer surface of the first wooden barrel, and the aged alcoholic beverage contains each flavor component in the group consisting of each of syringol, eugenol, cis-β-methyl-γ-octalactone, o-cresol, 2-methoxy-4-methylphenol, 4-methylsyringol, 4-ethylguaiacol, vanillyl methyl ketone, and furfural in an amount of greater than 100% relative to the amount of each corresponding flavor component in the control alcoholic beverage. For example, if the aged alcohol beverage contains each of the flavor components in an amount of 101% of the amount of the amount of each of the flavor components in the control, the process is in accordance with this embodiment.

In an embodiment, the film surrounds the outer surface of the first wooden barrel, and the film comprises cyclic olefin copolymer in an amount of from 15 to 80 weight percent, based on total film weight, and the film has a thickness of from 1.5 to 6 mils, and the aged alcoholic beverage contains eugenol in an amount of at least 110% relative to the amount of eugenol in the control alcoholic beverage. For example, if the aged alcohol beverage contains eugenol in an amount of 111% of the amount of the amount of eugenol in the control, the process is in accordance with this embodiment.

In an embodiment, the film comprises cyclic olefin copolymer in an amount of from 15 to 80 weight percent, based on total film weight, and the film has a thickness of from 1.5 to 6 mils and an ethanol transmission rate of less than 1 g/m$^2$/day and an oxygen transmission rate of at least 170 cc/m$^2$/day.

In an embodiment, the film is a multilayer film comprising polyolefin in an amount of from 50 to 82 percent, based on total film weight, and cyclic olefin copolymer in an amount of from 18 to 50 weight percent based on total film weight, with the cyclic olefin copolymer being present in a blend with polyolefin, the film having a thickness of from 1.5 to 4 mils.

In an embodiment, the multilayer film comprises three layers including two outer layers and one inner layer, the inner layer comprising a blend of from 20 to 80 wt % ethylene norbornene copolymer and from 80 to 20 wt % ethylene/alpha-olefin copolymer, and the alcoholic beverage product is selected from distillate and wine.

In an embodiment, barrel is surrounded by the film and the film has an ethanol transmission rate of less than 1 g/m$^2$/day and an oxygen transmission rate of at least 170 cc/m$^2$/day and a moisture vapor transmission rate less than 1 g/m$^2$/day, and the aged alcoholic beverage, either having an alcohol by volume of less than 30% or being diluted with water to have an alcohol by volume of 30%, exhibits an aroma and flavor, evaluated in accordance with ASTM E1879-00 Sensory Evaluation of Beverages Containing Alcohol together with ASTM E1885-04 Standard Method for Sensory Analysis—Triangle Test, indistinguishable relative to the control barrel containing the control alcoholic beverage.

In an embodiment, the inner layer comprises a blend of from 40 to 60 wt % ethylene norbornene copolymer and from 60 to 40 wt % polyolefin, and the film has a thickness of from 2 to 3.5 mils and an ethanol transmission rate of less than 0.5 g/m$^2$/day and an oxygen transmission rate of at least 170 to 250 cc/m$^2$/day, and the first aged alcoholic beverage, either having an alcohol by volume of less than 30% or being diluted with water to have an alcohol by volume of 30%, further exhibits a color, evaluated in accordance with ASTM E1879-00 Sensory Evaluation of Beverages Containing Alcohol, together with ASTM E1885-04 Standard Method for Sensory Analysis—Triangle Test, indistinguishable relative to the control barrel containing the control alcoholic beverage.

A second aspect is directed to a process for aging an alcoholic beverage, comprising (a) filling a first wooden barrel with an unaged alcoholic beverage, the barrel having an outer surface; (b) covering at least 60 percent of the outer surface of the first wooden barrel with a film having an oxygen transmission rate of at least 50 cc/m$^2$/day and an ethanol transmission rate of less than 30 g/m$^2$/day; and (c) aging the unaged alcoholic beverage in the first wooden barrel covered with the film, the aging being carried out under ambient conditions for a time period of at least 1 month while the alcoholic beverage remains in the first wooden barrel covered by the film, to produce an aged alcoholic beverage, wherein during aging, an angel share fraction of the alcoholic beverage escapes through the wooden barrel and through the film covering the outer surface of the wooden barrel, with the angel share fraction being at least 30% less relative to a corresponding angel share fraction escaping through a wooden control barrel containing a control alcoholic beverage aged in the control barrel, the control barrel having an outer surface in direct contact with an ambient atmosphere without any film covering any portion of the control barrel. The aged alcoholic beverage, either having an alcohol by volume of less than 30% or upon being diluted with water to have an alcohol by volume of 30%, exhibits an aroma and flavor, upon evaluation in accordance with ASTM E1879-00 Sensory Evaluation of Beverages Containing Alcohol together with ASTM E1885-04 Standard Method for Sensory Analysis—Triangle Test, is indistinguishable relative to the control barrel containing the control alcoholic beverage aged therein, the aged control alcoholic beverage also having an alcohol by volume of less than 30% or being diluted with water to have an alcohol by volume of 30%.

In an embodiment, the first barrel is surrounded by the film and the angels' share is reduced by at least 70% relative to the control barrel containing the control alcoholic beverage, and the film comprises polyolefin.

In an embodiment, the first barrel is surrounded by the film and the angels' share is reduced by at least 85% relative to the control barrel containing the control alcoholic beverage, and the film comprises from 30 to 85 wt % polyolefin and from 70 to 15 wt % ethylene/norbornene copolymer based on total film weight, and the film has an oxygen transmission rate of from 170 to 350 cc/m$^2$/day and an ethanol transmission rate of from 0.10 to 1.0 g/m$^2$/day.

In an embodiment, the angels' share is reduced by at least 90% relative to the control barrel containing the control alcoholic beverage, and the film comprises from 40 to 60 wt % polyolefin and from 60 to 40 wt % ethylene/norbornene copolymer based on total film weight, and the film has an oxygen transmission rate of from 170 to 250 cc/m$^2$/day and an ethanol transmission rate of from 0.17 to 0.27 g/m$^2$/day, and the aged alcoholic beverage, either having an alcohol by volume of less than 30% or being diluted with water to have an alcohol by volume of 30%, further exhibits a color, evaluated in accordance with ASTM E1879-00 Sensory Evaluation of Beverages Containing Alcohol, together with ASTM E1885-04 Standard Method for Sensory Analysis—Triangle Test, indistinguishable relative to the control barrel containing the control alcoholic beverage.

A third aspect is directed to a process for aging an alcoholic beverage, comprising (a) filling a wooden barrel with an unaged alcoholic beverage, the wooden barrel having an oxygen transmission rate of from 1 to 10 cc/m$^2$/day, (b) covering an outer surface of the barrel with a film having an oxygen transmission rate of at least 50 cc/m$^2$/day and an ethanol transmission rate of less than 30 g/m$^2$/day, the film having a thickness of from 1 to 10 mils, and (c) aging the unaged alcoholic beverage while it remains in the wooden barrel, covered by the film, for at least 1 month, to produce an aged alcoholic beverage.

In an embodiment, the film has an oxygen transmission rate of at least 100 cc/m$^2$/day and an ethanol transmission rate of from 0.1 to 20 g/m$^2$/day, and the film comprises polyolefin.

In an embodiment, the film has a thickness of from 1.5 to 5 mils.

In an embodiment, the film has an oxygen transmission rate of at least 120 cc/m$^2$/day and an ethanol transmission rate of 0.1 to 1 g/m$^2$/day, and the film further comprises a cyclic olefin copolymer, and the aging of the alcoholic beverage is carried out for at least 2 months.

In an embodiment, the film further comprises a blend of the polyolefin and the cyclic olefin copolymer, and the cyclic olefin copolymer comprises ethylene/norbornene copolymer, and the ethylene norbornene copolymer is present in the film in an amount of from 15 to 70 weight percent based on total film weight and the polyolefin is present in the film in an amount of from 30 to 85 wt % based on total film weight, and the aging of the alcoholic beverage is carried out for at least 3 months, and the film has a thickness of from 2 to 4 mils, an oxygen transmission rate of from 150 to 500 cc/m²/day, an ethanol transmission rate of less than 1 g/m²/day, and a moisture vapor transmission rate less than 1 g/m²/day.

A fourth aspect is directed to a product suitable for aging, comprising (a) an unaged alcoholic beverage inside a wooden barrel, the wooden barrel surrounding the alcoholic beverage and the wooden barrel having an oxygen transmission rate of from 1 to 10 cc/m²/day, and (b) a film covering at least 60 percent of an outer surface of the barrel, the film having an oxygen transmission rate of at least 50 cc/m²/day and an ethanol transmission rate of less than 30 g/m²/day, a moisture vapor transmission rate less than 1 g/m²/day, and a peak load impact strength of at least 100 Newtons, a thickness of from 1 to 10 mils.

In an embodiment, the film surrounds the barrel and the film comprises cyclic olefin copolymer in an amount of from 15 to 80 wt %, based on total film weight, the film has an ethanol transmission rate of less than 1 g/m²/day, the film has an oxygen transmission rate of from 175 to 350 cc/m²/day, the film has a peak load impact strength of from 150 to 200 Newtons, and the film has a total thickness of from 2 to 4 mils.

In a fifth aspect directed to a film suitable for use in aging an unaged alcoholic beverage in a wooden barrel with the film covering an outer surface of the wooden barrel, the film comprises a blend of polyolefin and cyclic olefin copolymer, the cyclic olefin copolymer comprising ethylene/norbornene copolymer, with the ethylene norbornene copolymer being present in the film in an amount of from 15 to 70 weight percent based on total film weight, and the polyolefin being present in the film in an amount of from 30 to 85 wt % based on total film weight, with the film having a peak load impact strength of at least 100 Newtons, a thickness of from 2 to 4 mils, an oxygen transmission rate of from 150 to 500 cc/m²/day, an ethanol transmission rate of less than 1 g/m²/day, and a moisture vapor transmission rate of less than 1 g/m²/day.

In a sixth aspect directed to a film for use in aging an imaged alcoholic beverage in a wooden barrel with the film covering an outer surface of the wooden barrel, the film comprises polyolefin in an amount of from 80 to 100 weight percent based on total film weight, the film having a thickness of from 2 to 4 mils, an oxygen transmission rate of from 150 to 500 cc/m²/day, an ethanol transmission rate of less than 30 g/m²/day, a moisture vapor transmission rate less than 1 g/m²/day, and the film having a peak load impact strength of at least 100 Newtons.

BRIEF DESCRIPTION OF THE DRAWINGS

FIG. 3 is a schematic plan view of a side-seal bag.

FIG. 4 is a transverse cross-sectional view of the side-seal bag of FIG. 3, taken through section 4-4 of FIG. 3.

FIGS. 29 through 45 provide GC/MS data of various flavor components present in aged Virgin Wheat Whisky aged under a variety of conditions.

DETAILED DESCRIPTION

Figure 1:
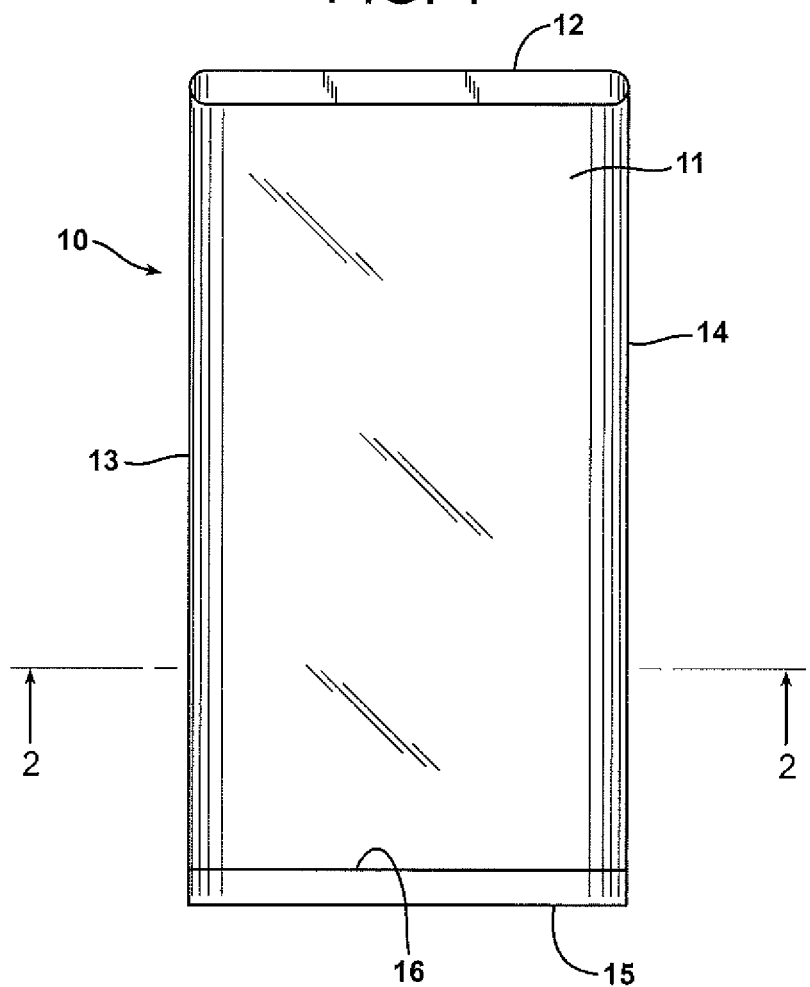
FIG. 1 is a schematic plan view of an end-seal bag.

As used herein, the term "barrel" refers to wooden barrels as used for the aging of distillate alcoholic beverages, wine, and beer. As used herein, the phrase "wooden barrel" refers to a barrel having at least one wooden stave or at least one wooden cant in the head. As used herein, the term "cask" is used interchangeably with the word "barrel." The barrel can be of any desired size, from a quart (or liter) or even less, to 250 gallons (1000 liters) or more. In an embodiment the wood comprises oak, and in a further embodiment, white oak. At least a portion of the interior surface of the barrel is charred.

As used herein, the phrase "filling a barrel" includes partial filling of the barrel as well as filling the barrel to the maximum. Usually, filling of the barrel is to the maximum.

Oak barrels generally have an oxygen transmission rate (OTR) of from approximately 2.5 to 4 $cc/m^2/day$, which varies with ambient conditions such as temperature, relative humidity, thickness of wood, amount of liquid inside barrel, etc. and relative humidity. The aging of alcoholic beverages benefits from an OTR of 2.5 to 4 $cc/m^2/day$ over the surface of the barrel, as the beverage inside the barrel needs a net transmission of oxygen into the barrel (i.e., inward, through the staves and ends) in order to support the oxidative reactions needed for the generation of the desired flavor profiles as the alcoholic beverage ages.

As used herein, the phrase "covering . . . the barrel with a film" refers to placing a film over at least a portion of the outer surface of the barrel, such as covering at least 60% of the outer surface of the barrel, or even covering 100% of the outer surface of the barrel. As used herein, the phrase "surrounding . . . the barrel with a film" refers to 100% coverage of the outer surface of the barrel. The film can provide 100% coverage of the barrel regardless of whether the film is tight or loose around the barrel. Films can be used to cover only the outer surfaces of the barrel staves with the barrel ends left uncovered, or films can be used to cover the barrel ends only, leaving the outer surface of the barrel staves left uncovered.

The wooden barrel can be covered by a first film and a second film, with the first film being between the wooden barrel and the second film. The second film can have a thickness of from 1 to 20 mils. The second film can exhibit a peak load impact strength of from 30 to 200 pounds measured in accordance with ASTM D 3763, which is hereby incorporated, in its entirety, by reference thereto. The second film can have a thickness of from 3 to 20 mils, the second film exhibiting a peak load impact strength of from 50 to 200 pounds measured by the procedure of ASTM D 3763. The second film can have a thickness of from 1 to 2.9 mils, and the second film can exhibit a peak load impact strength of from 30 to 65 pounds measured by the procedure of ASTM D 3763. The packaged alcoholic beverage product can further comprise a protective plastic mesh over the film or films covering the wooden staves of the barrel, with the plastic mesh also covering the hoops of the barrel.

In an embodiment, the entire exterior surface of the staves can be covered by the film, with the barrel ends uncovered. In an alternative embodiment, one or both of the barrel ends are covered by the film, with the exterior surface of the staves left uncovered.

In an embodiment, both the staves and the hoops are covered by the film. In an alternative embodiment, the film is between the staves and the hoops.

If a barrel is covered with a film within a specified thickness range, the film can be a single discrete film within the thickness range, or the film can be the sum of the thickness of a thin film wrapped multiple times over top of itself and over the barrel to generate a total film thickness within the specified thickness range.

As used herein, the term "film" is used in a generic sense to include plastic web, regardless of whether it is film or sheet. Preferably, films of and used in the present invention have a thickness of 0.25 mm or less. The film can have any total thickness desired, so long as the film provides the desired properties for the particular packaging operation in which the film is used.

Moreover, the film is inclusive of both a free standing film and a coating film. The phrase "free-standing film," as used herein, refers to a film made from one or more layers which have been extruded through a die. As used herein, the phrase "coating film" refers to a film applied to a surface by spray coating, dipping, or a coating applied with an applicator such as a brush, cloth, spatula, etc. In accordance with any one or more of the above aspects, as well as any one or more of the embodiments of those aspects, the film can be a free standing film or a coating film.

As used herein, the phrase "oxygen transmission rate" and the phrase "$O_2$ transmission rate" and the acronym "OTR" all refer to the rate at which atmospheric $O_2$ (i.e., $O_2$ gas) is transmitted through a film using the measurement process of ASTM D3985-05 (2010)e1, which is hereby incorporated, in its entirety, by reference thereto. This is sometimes also referred to as "oxygen gas transmission rate" with the acronym "$O_2$GTR." Oxygen transmission rate and oxygen gas transmission rate can both expressed in the units of cubic centimeters per square meter of film per day. Each of the expressions "$cc/m^2$ day" and "$cc/m^2/day$" are considered to represent "cubic centimeters per square meter of film per day." The measurement is carried out at standardized conditions of 1 atmosphere pressure, 23° C., and 0% relative humidity.

Unless otherwise excluded in an above aspect or embodiment thereof, in a further embodiment of any of the above aspects and embodiments, the film can have an oxygen transmission rate of at least 60 $cc/m^2/day$, or at least 70 $cc/m^2/day$, or at least 80 $cc/m^2/day$, or at least 90 $cc/m^2/day$, or at least 100 $cc/m^2/day$, or at least 110 $cc/m^2/day$, or at least 120 $cc/m^2/day$, or at least 130 $cc/m^2/day$, or at least 140 $cc/m^2/day$, or at least 150 $cc/m^2/day$, or at least 160 $cc/m^2/day$, or at least 170 $cc/m^2/day$, or at least 180 $cc/m^2/day$, or at least 190 $cc/m^2/day$, or at least 200 $cc/m^2/day$. The film can have an oxygen transmission rate of from 50 to 2000 $cc/m^2/day$, or from 60 to 1800 $cc/m^2/day$, or from 70 to 1700 $cc/m^2/day$, or from 80 to 1500 $cc/m^2/day$, or from 80 to 1200 $cc/m^2/day$, or from 80 to 1000 $cc/m^2/day$, or from 80 to 800 $cc/m^2/day$, or from 80 to 700 $cc/m^2/day$, or from 80 to 600 $cc/m^2/day$, or from 80 to 500 $cc/m^2/day$, or from 90 to 450 $cc/m^2/day$, or from 100 to 400 $cc/m^2/day$, or from 110 to 375 $cc/m^2/day$, or from 120 to 350 $cc/m^2/day$, or from 130 to 350 $cc/m^2/day$, or from 140 to 350 $cc/m^2/day$, or from 150 to 350 $cc/m^2/day$, or from 160 to 340 $cc/m^2/day$, or from 170 to 330 $cc/m^2/day$, or from 180 to 320 $cc/m^2/day$, or from 190 to 310 $cc/m^2/day$, or from 200 to 300 $cc/m^2/day$.

As used herein, the phrase "moisture vapor transmission rate" and the acronym "MVTR" refer to the rate at which atmospheric moisture is transmitted through a film using the measurement process of ASTM F1249-06 (2011)e1, which is hereby incorporated, in its entirety, by reference thereto. The phrase "water vapor transmission rate" and the acronym "WVTR" are also used interchangeably with MVTR. The moisture vapor transmission rate can be expressed as grams per 100 square inches of film per day. Each of the expressions "$g/100$ $in^2$ day" and "$g/100$ $in^2/day$" are considered to represent "grams per 100 square inches of film per day." The measurement is carried out at standardized conditions of 1 atmosphere pressure, 100° F. (37.8° C.), and 100% relative humidity.

Unless otherwise excluded in an above aspect or embodiment thereof, in a further embodiment of any of the above aspects and embodiments, the film can have an moisture vapor transmission rate of less than 15 g/m$^2$/day, or less than 12 g/m$^2$/day, or less than 10 g/m$^2$/day, or less than 9 g/m$^2$/day, or less than 8 g/m$^2$/day, or less than 7 g/m$^2$/day, or less than 6 g/m$^2$/day, or less than 5 g/m$^2$/day, or less than 4 g/m$^2$/day, or less than 3 g/m$^2$/day, or less than 2.5 g/m$^2$/day, or less than 2 g/m$^2$/day, or less than 1.5 g/m$^2$/day, or less than 1.4 g/m$^2$/day, or less than 1.3 g/m$^2$/day, or less than 1.2 g/m$^2$/day, or less than 1.1 g/m$^2$/day, or less than 1 g/m$^2$/day, or less than 0.9 g/m$^2$/day, or less than 0.8 g/m$^2$/day, or less than 0.7 g/m$^2$/day, or less than 0.6 g/m$^2$/day, or from 0.1 to 30 g/m$^2$/day, or from 0.15 to 15 g/m$^2$/day, or from 0.2 to 12 g/m$^2$/day, or from 0.2 to 11 g/m$^2$/day, or from 0.3 to 10 g/m$^2$/day, or from 0.3 to 8 g/m$^2$/day, or from 0.3 to 6 g/m$^2$/day, or from 0.3 to 5 g/m$^2$/day, or from 0.3 to 4 g/m$^2$/day, or from 0.3 to 3 g/m$^2$/day, or from 0.3 to 2 g/m$^2$/day, or from 0.3 to 1.5 g/m$^2$/day, or from 0.35 to 1 g/m$^2$/day, or from 0.35 to 0.9 g/m$^2$/day, or from 0.35 to 0.8 g/m$^2$/day, or from 0.4 to 0.7 g/m$^2$/day, or from 0.45 to 0.65 g/m$^2$/day.

As used herein, the phrase "ethanol transmission rate" and the acronym "ETR" each refer to the rate at which ethanol is transmitted through a film, and is measured using a cell in which the film is installed with an excess of ethanol in the bottom of the cell (below the film), with a stream of ethanol-free nitrogen constantly purging the top of the cell (above the film) at a low rate, e.g., 10 cc dry nitrogen per minute. The cell has mating surfaces in a clamshell arrangement, with the film installed between the mating surfaces so that the volume inside the cell is sealed except for the inlet and outlet ports for insertion of the stream of nitrogen gas. Those of skill in the art know that this type of arrangement is present in Mocon® Ox-Tran® instruments used for measuring oxygen transmission rate through a film.

Figure 19:
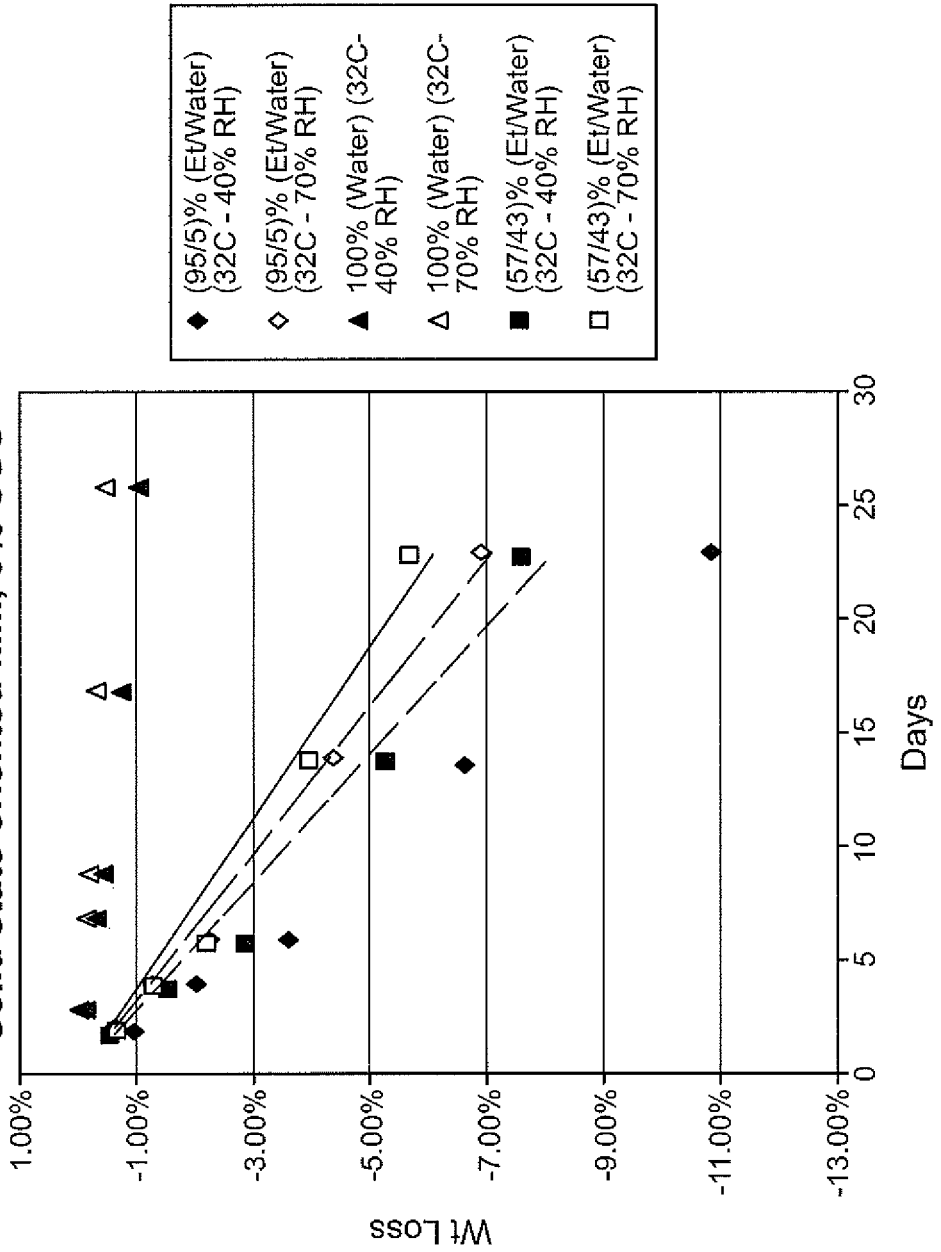
FIG. 19 is a graph of weight loss as a function of time for pouches made from Film No. 22, under two different relative humidity conditions.

Conceptually, the test cell is illustrated in FIG. 19, with dry nitrogen being swept through the portion of the chamber above the film. The partial pressure difference between the high-ethanol concentration atmosphere below the film and the lower ethanol concentration atmosphere above the film causes ethanol molecules to diffuse through the film into the low concentration atmosphere above the film. The use of the purging gas in that portion of the chamber above the film maintains the low ethanol concentration in the atmosphere above the film in order to maintain a constant rate of diffusion of the ethanol through the film.

The ethanol barrier character of the film determines the rate of ethanol permeation, which can be continuously measured from the outflow of the nitrogen gas sweeping through that portion of the chamber containing the atmosphere above the film. A steady state is eventually reached in the atmosphere above the film. This steady state can require days or weeks to achieve. A steady state is reached when the sensor used detects a constant (i.e., unchanging) amount of ethanol in the atmosphere swept out of the upper portion of the chamber. The response is never truly constant or unchanging; it merely reaches a state in which the change in signal versus time is below some defined threshold. Initially the signal will change greatly with time but will eventually reach a point where Δsignal/Δtime is significantly lower. At steady state, by definition the amount of ethanol purged out of the upper portion of the chamber in a given time corresponds precisely with the amount of ethanol passing through the film during the same period of time. The amount of ethanol passing through the film in any given period of time divided by the area of the film being tested is the calculation of the transmission rate of ethanol through a specified area of film in a specified period of time. This transmission rate can be expressed in terms such as grams ethanol per square meter per day (i.e., g/m$^2$/day, also expressed as g/m$^2$ day). The transmission rate can also be normalized for the film thickness, e.g., g/100μ/m$^2$/day, as reported in examples below.

Figure 18:
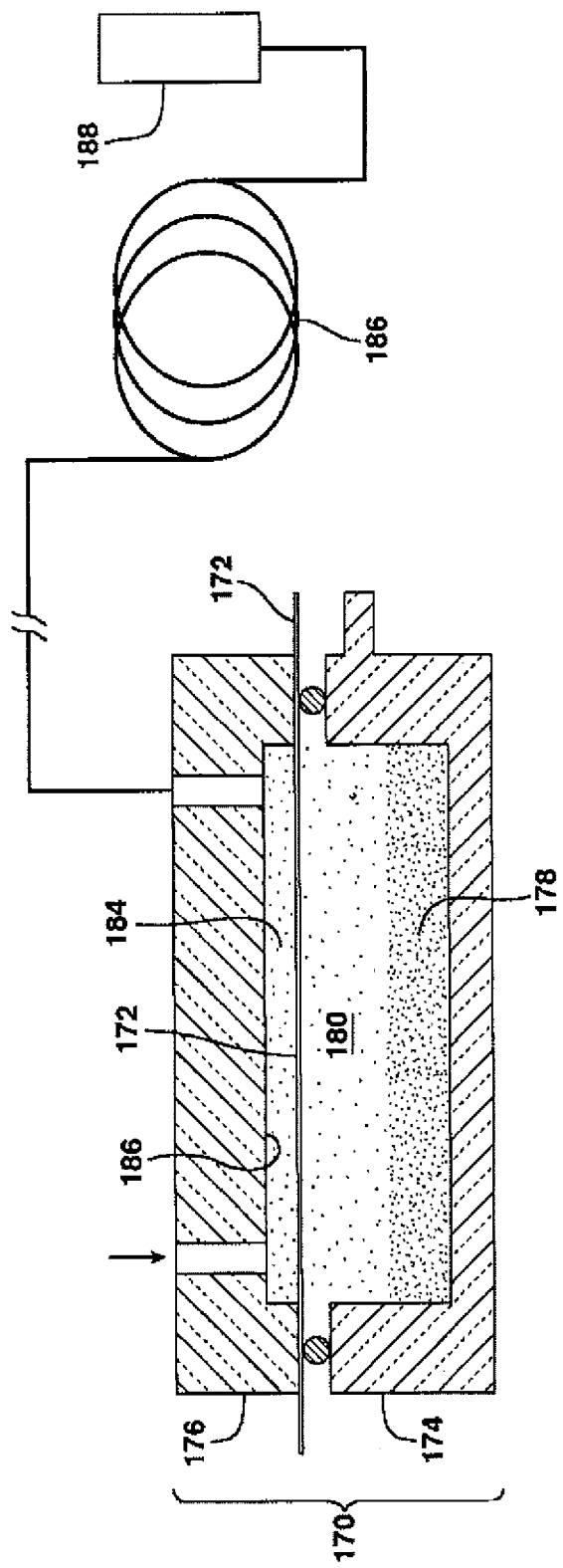
FIG. 18 is a schematic of a process for measuring the ethanol transmission rate of a film.

FIG. 18 illustrates the process and equipment for the evaluation of the ETR of a film sample for use in a film covering part or all of a wooden barrel containing an alcoholic beverage such as a distillate product, wine, or beer. In FIG. 18, film sample 172 is held in permeation cell 170 between lower cell member 174 and upper cell member 176. Pool 178 of 95% ethanol solution is contained with a recess formed inside lower member 174. Ethanol vapor evaporating from pool 178 passes into atmosphere 180 above the upper surface of pool 178 but below film sample 172.

Ethanol vapor in atmosphere 180 below film sample 172 permeates film sample 172, moving into chamber upper volume 184 which is bounded by film sample 172 and inside surface 186 of upper cell member 176. The rate of ethanol permeation through film sample 172 is measured by continuously flushing upper chamber volume 184 with nitrogen gas, with the ethanol content of the gas emerging from upper volume 184 being intermittently sampled and analyzed. The analysis can be carried out by passing the sample into an analytical device such as a gas chromatograph (schematically illustrated as 186), equipped with, for example, a flame ionization detector (FID, not illustrated). The ethanol is separated from any other components emerging, and then passes through the FID, which generates a peak corresponding to the amount of ethanol in the sample. In this manner, the amount of ethanol emerging from the upper volume can be determined, and in so doing the ethanol transmission rate of the film can be measured.

In place of a flame ionization detector or other detector in the gas chromatograph, the ethanol separated in the gas chromatograph can be passed through a Mass Spectrometer Detector (MSD) 188. As such, the ethanol flushed from upper chamber volume 184 is separated from other components using capillary column gas chromatograph 186 and is thereafter both identified and quantified by the character and intensity of the mass spectral fragmentation pattern generated by the mass spectrometer, resulting in the identification and quantification of the ethanol contained in the stream emerging from upper chamber volume 184.

This type of ethanol transmission rate measurement has been used for the ethanol transmission rates reported herein. These ethanol transmission rates were measured by Mocon Inc., at 7500 Mendelssohn Avenue N., Minneapolis, Minn. 55428. The ethanol transmission rate is set forth in the normalized-for-film-thickness units of "g/100μ/m$^2$ day." The analysis is conducted while the film was in an ambient environment at 38-40° C. The analysis was carried out until steady state was reached, or for 4 weeks, whichever was shorter. Macon reports that they use a capillary chromatography column in an Agilent 6890 gas chromatograph equipped with an FID.

Unless otherwise excluded in an above aspect or embodiment thereof, in a further embodiment of any of the above aspects and embodiments, the film can have an ethanol transmission rate of less than 25 g/m$^2$/day, or less than 20 g/m$^2$/day, or less than 15 g/m$^2$/day, or less than 10 g/m$^2$/day, or less than 8 g/m$^2$/day, or less than 6 g/m$^2$/day, or less than 5 g/m²/day, or less than 4 g/m²/day, or less than 3 g/m²/day, or less than 2.5 g/m²/day, or less than 2 g/m²/day, or less than 1.5 g/m²/day, or less than 1.4 g/m²/day, or less than 1.3 g/m²/day, or less than 1.2 g/m²/day, or less than 1.1 g/m²/day, or less than 1.0 g/m²/day, or less than 0.9 g/m²/day, or less than 0.8 g/m²/day, or less than 0.7 g/m²/day, or less than 0.6 g/m²/day, or less than 0.5 g/m²/day, or less than 0.4 g/m²/day, or less than 0.3 g/m²/day, or less than 0.25 g/m²/day. The film can have an ethanol transmission rate of from 0.05 to 40 g/m²/day, or from 0.1 to 35 g/m²/day, or from 0.2 to 1 g/m²/day, or from 0.11 to 30 g/m²/day, or from 0.12 to 25 g/m²/day, or from 0.13 to 20 g/m²/day, or from 0.14 to 15 g/m²/day, or from 0.15 to 10 g/m²/day, or from 0.15 to 8 g/m²/day, or from 0.15 to 6 g/m²/day, or from 0.15 to 4 g/m²/day, or from 0.15 to 2 g/m²/day, or from 0.16 to 1.5 g/m²/day, or from 0.17 to 1.4 g/m²/day, or from 0.18 to 1.3 g/m²/day, or from 0.19 to 1.2 g/m²/day, or from 0.2 to 1 g/m²/day.

Unless otherwise excluded in an above aspect or embodiment thereof, in a further embodiment of any of the above aspects and embodiments, the film can have a peak load impact strength (measured in accordance with ASTM D 3763, which is hereby incorporated, in its entirety, by reference thereto) of at least 100 Newtons, or at least 110 Newtons, or at least 120 Newtons, or at least 130 Newtons, or at least 140 Newtons, or at least 150 Newtons, or from 100 to 1000 Newtons, or from 110 to 600 Newtons, or from 120 to 500 Newtons, or from 130 to 400 Newtons, or from 140 to 300 Newtons, or from 145 to 290 Newtons.

Unless otherwise excluded in an above aspect or embodiment thereof, in a further embodiment of any of the above aspects and embodiments, the film can have an elongation to break (measured in accordance with ASTM D882, which is hereby incorporated, in its entirety, by reference thereto) of at least 0.5 Joule, or at least 0.7 Joule, or at least 1 Joule, or at least 1.3 Joules, or at least 1.5 Joules, or at least 1.6 Joules, or at least 1.7 Joules, or at least 1.8 Joules, or at least 1.9 Joules, or at least 2 Joules, or from 1.7 to 4 Joules, from 1.7 to 4.1 Joules, or from 1.7 to 4 Joules, or from 1.7 to 3.5 Joules, or from 1.7 to 3 Joules, or from or from 1.7 to 2.5 Joules, or from 1.7 to 2.3 Joules, or from 1.7 to 2.2 Joules.

As used herein, the phrase "free shrink" refers to the percent dimensional change in a 10 cm. by 10 cm. specimen of film, when subjected to selected heat (i.e., at a certain temperature), with the quantitative determination being carried out according to ASTM D 2732, as set forth in the 1990 Annual Book of ASTM Standards, Vol. 08.02, pp. 368-371, which is hereby incorporated, in its entirety, by reference thereto. The test is carried out under designated conditions, i.e., one atmosphere of pressure, 23° C., and 0% relative humidity.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

In an embodiment, the film has a total free shrink (longitudinal plus transverse) at 185° F. of at least 10 percent, measured in accordance with ASTM D 2732. The film can have a total free shrink at 185° F. of at least 30 percent, measured in accordance with ASTM D 2732. The film can have a total free shrink at 185° F. of at least 50 percent, measured in accordance with ASTM D 2732. In an embodiment, the film has a total free shrink at 185° F. of less than 10 percent, measured in accordance with ASTM D 2732.

Unless otherwise excluded in an above aspect or embodiment thereof, in a further embodiment of any of the above aspects and embodiments, the film can have thickness (i.e., total film thickness) of from 1 mil to 20 mils, or from 1.2 mils to 15 mils, or from 1.3 mils to 12 mils, or from 1.4 mils to 10 mils, or from 1.5 mils to 8 mils, or from 1.6 mils to 7 mils, or from 1.7 mils to 6.5 mils, or from 1.8 mils to 6 mils, or from 1.9 mils to 5.5 mils, or from 2 mils to 5 mils, or from 2.5 to 4 mils, or from 2.5 to 3.5 mils, or from 2.7 to 3.3 mils.

The film can be a monolayer film or a multilayer film. In an embodiment, the film comprises a first layer that is an inner film layer serves as an ethanol barrier layer, a second layer that is a first outer film layer and which serves as a heat seal layer, and a third layer which is a second outer film layer and which serves as an abuse layer.

As used herein, the term "heat-seal," and the phrase "heat-sealing," refer to any seal of a first discrete region of a film surface to a second discrete region of a film surface, wherein the heat seal is formed by heating the discrete regions to at least their respective seal initiation temperatures. Suitable polymers for use in heat seal layers homogeneous ethylene/alpha-olefin copolymer, ethylene/vinyl acetate copolymer, and ionomer resin.

The layer which is a barrier to ethanol can comprise a cyclic olefin polymer (COP) or including a cyclic olefin copolymer (COC). There are various types of cyclic olefin copolymers based on different types of cyclic monomers and polymerization methods. Cyclic olefin copolymers are produced by chain copolymerization of cyclic monomers such as 8,9,10-trinorborn-2-ene (norbornene) or 1,2,3,4,4a,5,8,8a-octahydro-1,4:5,8-dimethanonaphthalene (tetracyclododecene) with ethene, or by ring-opening metathesis polymerization of various cyclic monomers followed by hydrogenation. These latter materials using a single type of monomer are more properly named cyclic olefin polymers.

The cyclic olefin copolymer can comprise ethylene/norbornene copolymer. Cyclic olefin copolymer is a barrier to both ethanol and water vapor. Alternatively, polyolefin provides a relatively high barrier to moisture vapor, but is a lesser barrier to ethanol than is cyclic olefin copolymer.

As used herein, the term "polyolefin" refers to all polymerized olefins except cyclic olefin copolymers such as ethylene/norbornene. Included as linear, branched, aliphatic, aromatic, substituted, or unsubstituted. More specifically, included in the term polyolefin are homopolymers of olefin, copolymers of olefin, copolymers of an olefin and a non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/unsaturated ester copolymer, ethylene/unsaturated acid copolymer, (especially ethyl acrylate copolymer, ethylene/butyl acrylate copolymer, ethylene/methyl acrylate copolymer, ethylene/acrylic acid copolymer, ethylene/methacrylic acid copolymer), modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

In a film having at least one layer containing a cyclic olefin copolymer, one or more additional layers of the film can be made from a polymer allowing relatively high transmission of atmospheric oxygen (i.e., $O_2$), such as polyolefins including ethylene homopolymer, ethylene/α-olefin copolymer, propylene homopolymer, etc. In this manner the transmission rate of alcohol and water can be reduced in combination with providing a high oxygen transmission rate while at the same time providing a film of high peak load impact strength.

The film can comprise up to 100 weight percent polyolefin. The film can comprise up to 90 weight percent cyclic olefin copolymer, e.g., ethylene/norbornene copolymer. The film can comprise a blend of polyolefin and cyclic olefin copolymer.

In an embodiment of each of the above aspects (including embodiments thereof), the film does not comprise, and is absent, polyphenylene sulfide.

In an embodiment of each of the above aspects (including embodiments thereof), the film does not comprise, and is absent, a metal foil layer or a vapor deposited metal layer.

In an embodiment of each of the above aspects (including embodiments thereof), the film does not comprise, and is absent, aluminum foil.

In an embodiment of each of the above aspects (including embodiments thereof), the film does not comprise, and is absent, polyvinylchloride.

In an embodiment, the film is a stretch film. A stretch film and/or elastic film can have a thickness of from about 0.5 mil to 5.0 mil, an elongation of 500%, and an elastic recovery of at least 10%.

In an embodiment, the film comprises an ultraviolet light barrier, including, for example, hindered amine light stabilizers (HALS), benzotriazoles, and hydroxyl-benophenones.

In an embodiment, the film comprises an antioxidant, including, for example, sterically hindered phenolic antioxidant, for example IRGANOX® 1010 or IRGANOX® 1076 and, phosphorous phosphite compounds like IRGAFOS® 168 (tris(2,4-di-tert-butylphenyl)phosphite.)

The alcoholic beverage can comprise at least one member selected from a distilled alcoholic beverage product and a fermented alcoholic beverage product. The alcoholic beverage product can comprise wine. The alcoholic beverage product can comprise beer. In an embodiment, the alcoholic beverage product comprises at least one member selected from the group consisting of whisky, tequila, rum, cognac, vodka, brandy, sherry, port, wine, and beer. Distillate alcoholic beverage products include whisky, cognac, brandy, sherry, and port. Alcoholic beverages include both water and ethanol.

As used herein, the phrase "unaged alcoholic beverage" includes alcoholic beverages which are entirely unaged, as well as alcoholic beverages which are in an intermediate stage of aging with further aging to be carried out.

The aging period can be from 1 month to 30 years, or from 1 month to 24 years, or from 1 month to 18 years, or from 1 month to 16 years, or from one month to 14 years, or from 1 month to 12 years, or from 1 month to 10 years, or from 1 month to 8 years, or from 1 month to 5 years, or from 1 month to 3 years, or from 1 month to 1 year, or from 1 month to 8 months, or from 1 month to 6 months, or from 1 month to 4 months, or from 1 month to 3 months, or from 2 months to 15 years, or from 2 months to 6 years, or from 3 months to 12 years, or from 3 months to 5 years, or from 4 months to 12 years, or from 4 months to 14 months, or from 6 months to 10 years, or from 6 months to 6 years, or from 6 months to 5 years, or from 6 months to 1 year, or from 1 year to 8 years.

As used herein, the phrase "angels' share" refers to the amount of alcoholic beverage lost to diffusion through a wooden barrel followed by evaporation into the atmosphere. The amount of alcoholic beverage lost includes all ingredients of the beverage, e.g., water, ethanol, and other components.

During aging in some regions, in addition to the loss of ethanol, there is also a concern for the loss of moisture from the barrel. However, the greater concern is the loss of ethanol from the barrel. In tropical climates, the loss of ethanol can be high enough that the evaporative loss is greater than the added value of the organoleptic character acquired by the aging of the alcoholic beverage in the barrel.

Unless otherwise excluded in an above aspect or embodiment thereof, in a further embodiment of any of the above aspects and embodiments, with the film covering at least 60% of the outer surface of the barrel, the angels' share can be reduced by at least 30%, or at least 40%, or at least 50%, or at least 60%, relative to a control barrel containing a control alcoholic beverage aged without any film covering the control barrel the barrel. With the film surrounding the barrel, the angels' share loss can be reduced from 30% to 99.9%, or from 40% to 99%, or from 50% to 98%, or from 60% to 97%, or from 70 to 97%, or from 74.3 to 96%, or from 82% to 95.5%, or from 89.4% to 95.5%, relative to a control barrel containing a control alcoholic beverage aged without any film covering the control barrel the barrel.

In assessing angels' share loss, and/or organoleptics (aroma, flavor, and/or color) of the subject aged alcoholic beverage (i.e., the alcoholic beverage aged in the barrel covered by or surrounded by the film) versus a control aged alcoholic beverage (i.e., alcoholic beverage aged in barrel not covered by film), the control barrel containing the control alcoholic beverage is a barrel of the same size, composition, source, and condition as the subject barrel which is covered with the film in the aging of the alcoholic beverage. Moreover, the control barrel is filled with an alcoholic beverage identical to (e.g., taken from the same uniformly mixed batch) the alcoholic beverage in the subject barrel. Finally, the aging conditions (temperature, humidity, etc) of the control alcoholic beverage are identical to the aging conditions alcoholic beverage in the subject barrel, e.g., same warehouse, same ambient conditions.

Alternatively, during aging the wt % angels' share loss per year can be from can be from 0.1 to 1.8 wt %, or from 0.2 to 1.5 wt %, or from 0.2 to 1.3 wt %, or from 0.3 to 1.2 wt %.

The alcoholic beverage product can increase in proof level during aging. This may occur if the moisture vapor transmission rate (MVTR) of the film covering or surrounding the subject barrel is substantially higher than the ethanol transmission rate (ETA) of the film covering or surrounding the subject barrel.

Covering the barrel with the film can be carried out by placing the barrel inside a bag made from the film. The bag can be closed with a clip, a heat seal, a zipper, a hook and loop closure, an adhesive, etc. The bag can be an end-seal bag, a side-seal bag, an L-seal bag, a pouch (i.e., U-seal bag), a backseamed bag (with a fin-type backseam or a lap-type backseam).

Figure 2:
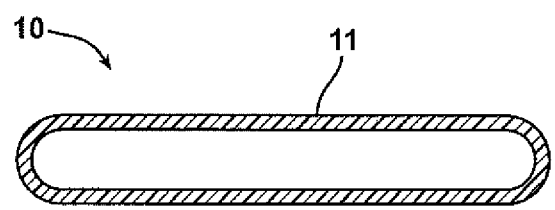
FIG. 2 is a transverse cross-sectional view of the end-seal bag of FIG. 1, taken through section 2-2 of FIG. 1.

FIG. 1 is a schematic of a preferred end-seal bag 10, in a lay-flat position; FIG. 2 is a cross-sectional view of bag 10 taken through section 2-2 of FIG. 1. Viewing FIGS. 1 and 2 together, bag 10 comprises bag film 11, top edge 12 defining an open top, first bag side edge 13, second bag side edge 14, bottom edge 15, and end seal 16.

FIGS. 3 and 4 illustrate side-seal bag 18. FIG. 3 illustrates a schematic of side seal bag 18, in a lay-flat view; FIG. 4 illustrates a cross-sectional view taken through section 4-4 of FIG. 3. With reference to FIGS. 3 and 4 together, side seal bag 18 is comprised of bag film 19, top edge 20 defining an open top, bottom edge 21, first side seal 22, and second side seal 23.

Figure 5:
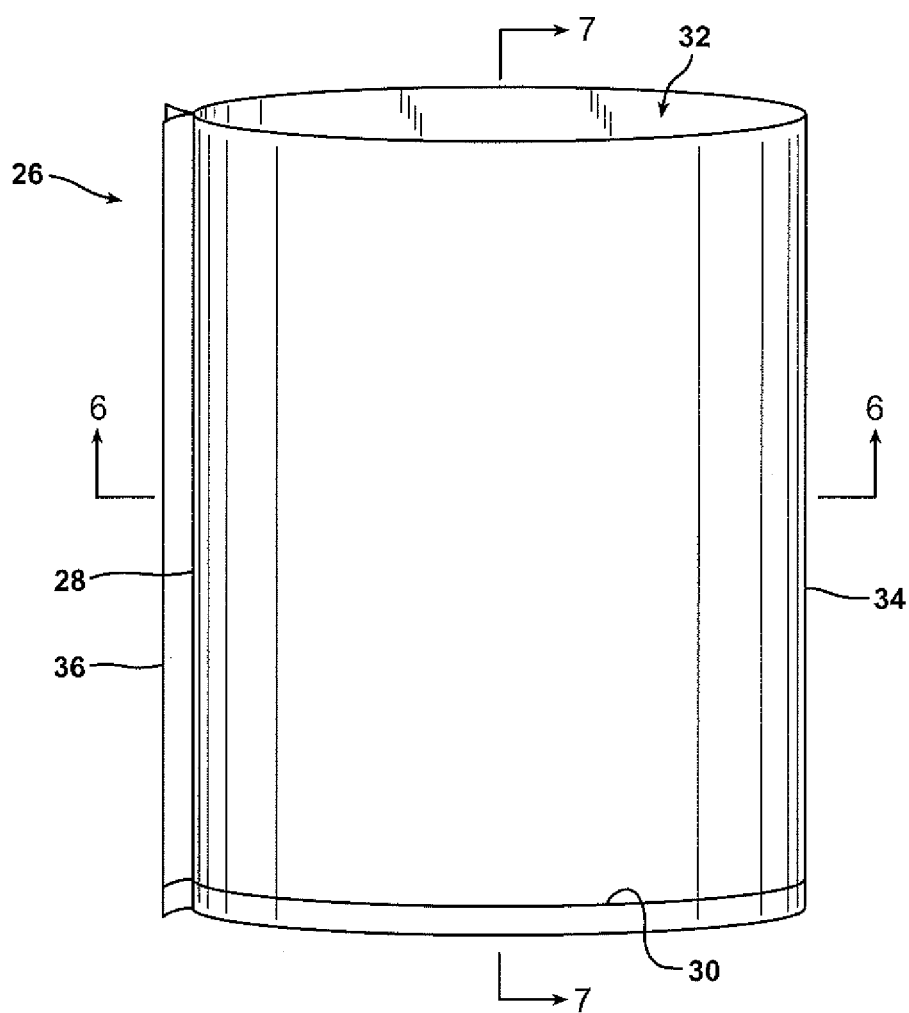
FIG. 5 is a schematic plan view of an L-seal bag.
Figure 6:
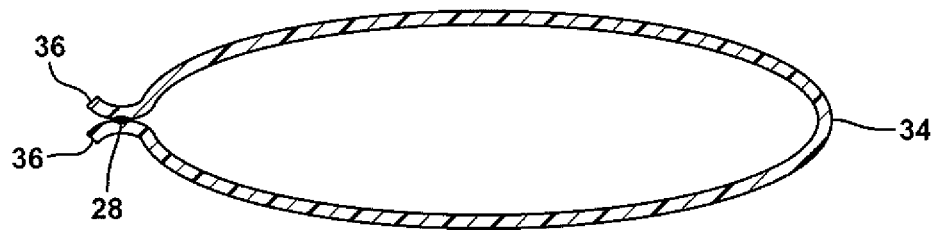
FIG. 6 is a transverse cross-sectional view of the L-seal bag of FIG. 5, taken through section 6-6 of FIG. 5.
Figure 7:
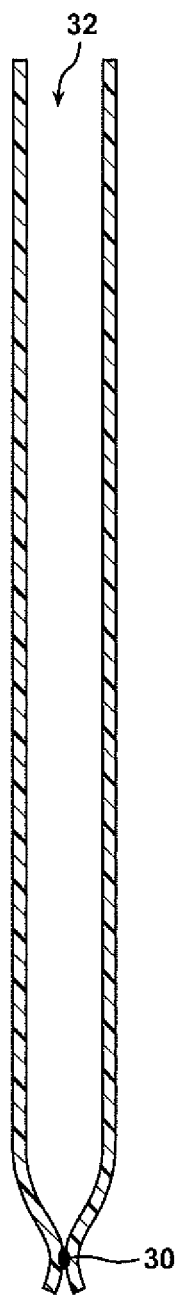
FIG. 7 is a longitudinal cross-sectional view of the L-seal bag of FIG. 5, taken through section 7-7 of FIG. 5.

FIG. 5 is a lay-flat view of a preferred L-seal bag 26, in a lay-flat position. FIG. 6 is a transverse cross-sectional view of L-seal bag 26, taken through section 6-6 of FIG. 5. FIG. 7 is a longitudinal cross-sectional view of L-seal bag 26 taken through section 7-7 of FIG. 5. Viewing FIGS. 5, 6, and 7 together, L-seal bag 26 has side-seal 28, bottom seal 30, open top 32, seamless folded bag side edge 34, and seamed bag side edge 36.

Figure 8:
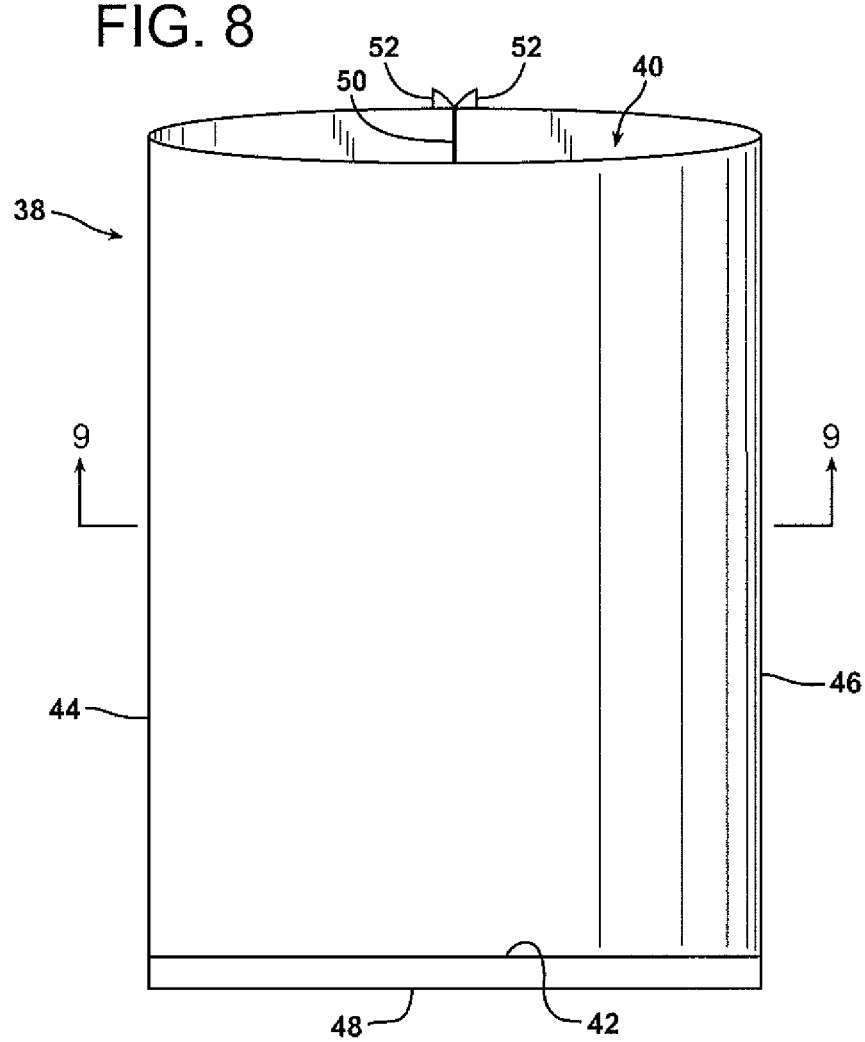
FIG. 8 is a schematic plan view of a backseamed bag having a fin-type backseam.
Figure 9:
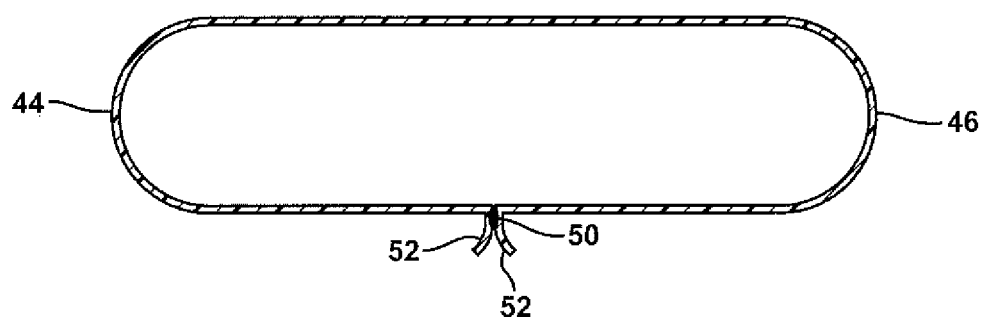
FIG. 9 is a transverse cross-sectional view of the backseamed bag of FIG. 8.

The fin-seal backseamed bag 38 of FIGS. 8 and 9 has open top 40, bottom seal 42, first folded side edge 44, second folded side edge 46, bottom edge 48, backseam seal 50 (inside film layer heat sealed to itself), and backseam fins 52.

Figure 10:
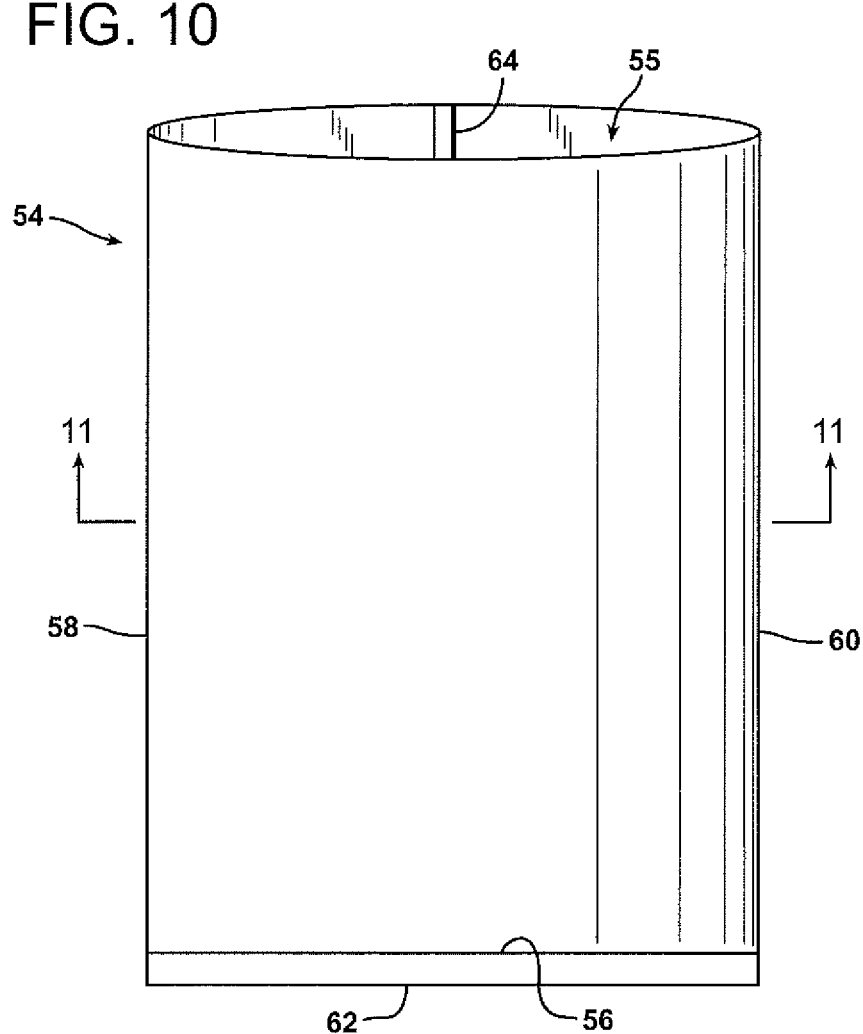
FIG. 10 is a schematic plan view of a backseamed bag having a lap-type backseam.
Figure 11:
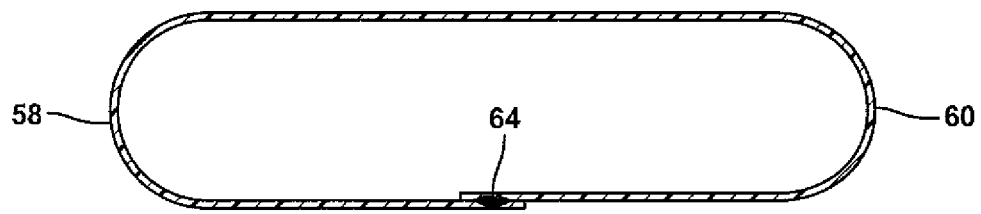
FIG. 11 is a transverse cross-sectional view of the backseamed bag of FIG. 10.

The lap-seal backseamed bag 54 of FIGS. 10 and 11 has open top 55, bottom seal 56, first folded side edge 58, second folded side edge 60, bottom edge 62, and backseam seal 64 (inside film layer heat sealed to outside film layer).

Figure 12:
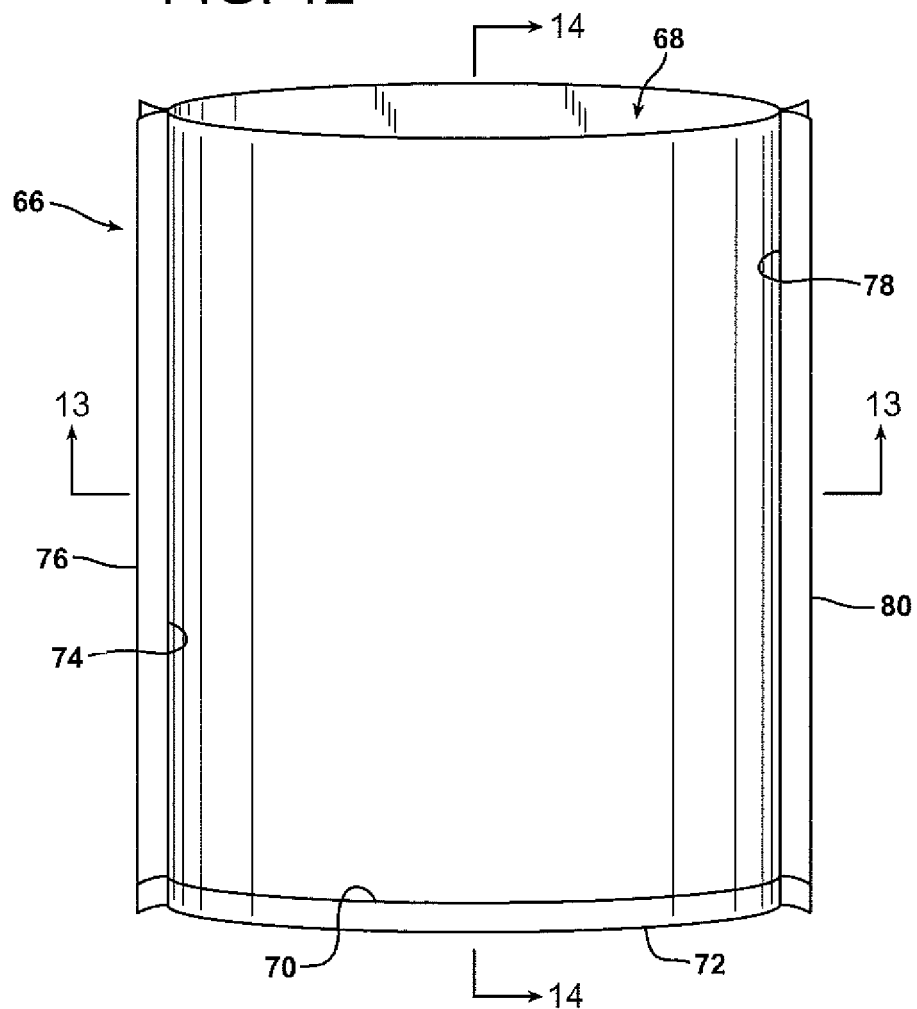
FIG. 12 is a schematic plan view of a pouch-type bag.
Figure 13:
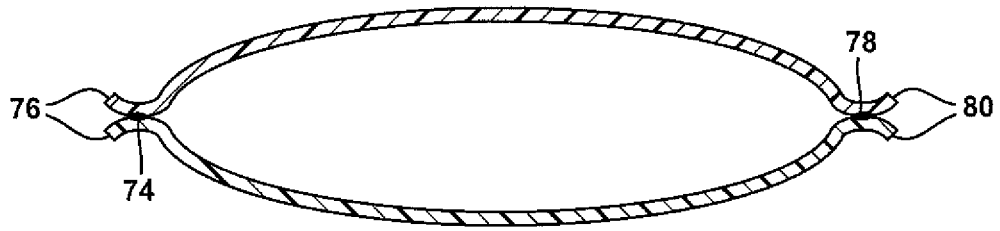
FIG. 13 is a transverse cross-sectional view of the pouch-type bag of FIG. 12, taken through section 13-13 of FIG. 12.
Figure 14:
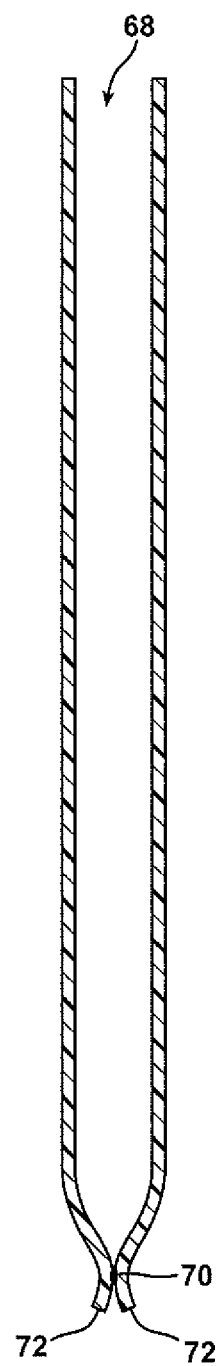
FIG. 14 is a longitudinal cross-sectional view of the pouch-type bag of FIG. 12, taken through section 14-14 of FIG. 12.

FIGS. 12, 13, and 14 illustrate a pouch-type bag 66 made from sealing two separate pieces of flat film together. In FIGS. 12, 13, and 14, pouch 66 has open top 68, bottom heat seal 70 and bottom edge 72, first side seal 74 and first side edge 76, second side seal 78 and second side edge 80. Together, first and second side seals 74 and 76 connect with bottom seal 70 to form a "U-shaped" seal connecting the two pieces of flat film together to form the pouch-type bag 66.

Figure 15:
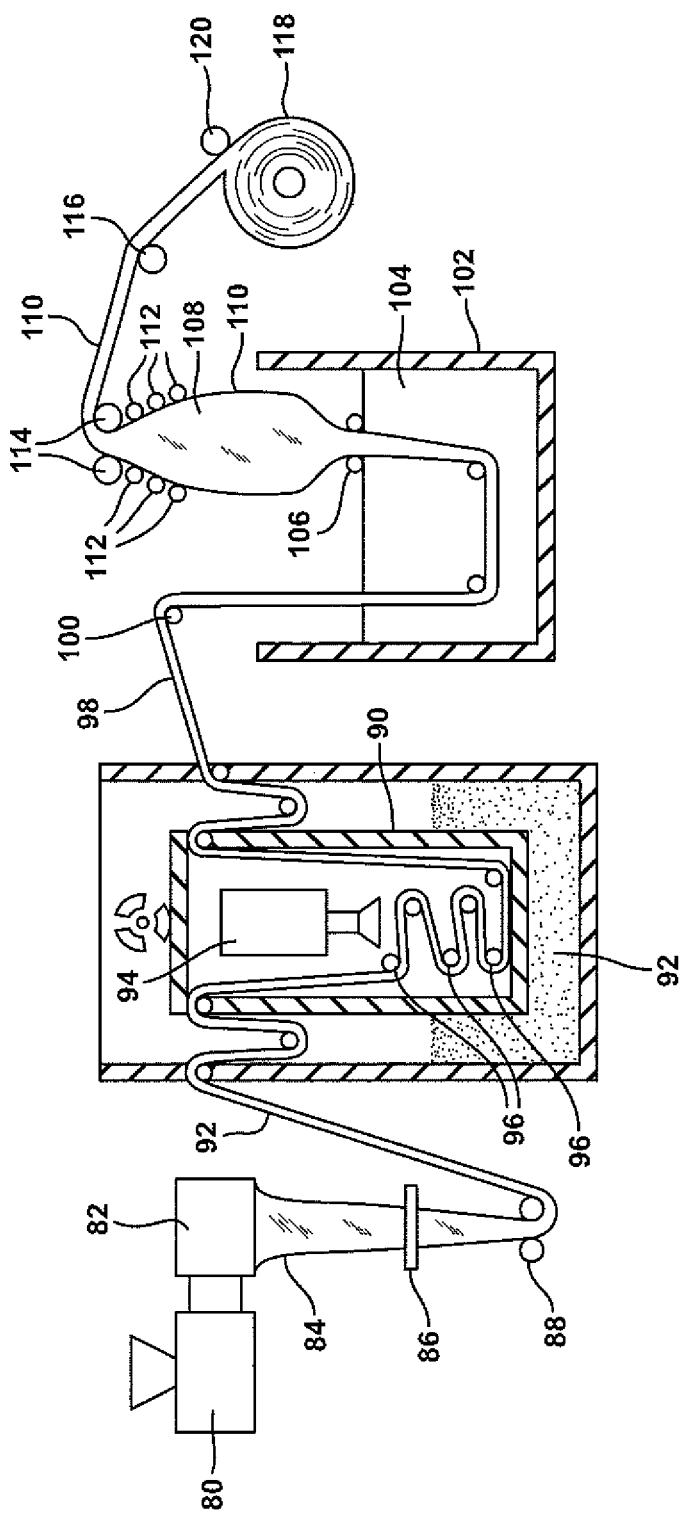
FIG. 15 is a schematic of a process used to make a heat-shrinkable film such as could be used to make a heat-shrinkable bag.

FIG. 15 is a schematic of a process used to make a heat-shrinkable film such as could be used to make a heat-shrinkable bag. The process of FIG. 15 utilizes solid state orientation to produce polymer stress at a temperature below the melting point, whereby the resulting oriented film is heat shrinkable. In the process illustrated in FIG. 15, solid polymer beads (not illustrated) are fed to a plurality of extruders 80 (for simplicity, only one extruder is illustrated). Inside extruders 80, the polymer beads are forwarded, melted, and degassed, following which the resulting bubble-free melt is forwarded into die head 82, and extruded through annular die, resulting in tubing 84 which is 5-40 mils thick, more preferably 20-30 mils thick, still more preferably, about 25 mils thick.

After cooling or quenching by water spray from cooling ring 86, tubing 84 is collapsed by pinch rolls 88, and is thereafter fed through irradiation vault 90 surrounded by shielding 92, where tubing 84 is irradiated with high energy electrons (i.e., ionizing radiation) from iron core transformer accelerator 94. Tubing 84 is guided through irradiation vault 90 on rolls 96. Preferably, the irradiation of tubing 84 is at a level of about 7 MR.

After irradiation, irradiated tubing 98 is directed over guide roll 100, after which irradiated tubing 98 passes into hot water bath tank 102 containing water 104. The now collapsed irradiated tubing 98 is submersed in the hot water for a retention time of at least about 5 seconds, i.e., for a time period in order to bring the film up to the desired temperature, following which supplemental heating means (not illustrated) including a plurality of steam rolls around which irradiated tubing 98 is partially wound, and optional hot air blowers, elevate the temperature of irradiated tubing 98 to a desired orientation temperature of from about 240° F. to about 250° F. Thereafter, irradiated film 98 is directed through nip rolls 106, and bubble 108 is blown, thereby transversely stretching irradiated tubing 98. Furthermore, while being blown, i.e., transversely stretched, irradiated film 98 is drawn (i.e., in the longitudinal direction) between nip rolls 106 and nip rolls 114, as nip rolls 114 have a higher surface speed than the surface speed of nip rolls 106. As a result of the transverse stretching and longitudinal drawing, irradiated, biaxially-oriented, blown tubing film 110 is produced, this blown tubing preferably having been both stretched at a ratio of from about 1:1.5-1:6, and drawn at a ratio of from about 1:1.5-1:6. More preferably, the stretching and drawing are each performed at a ratio of from about 1:2-1:4. The result is a biaxial orientation of from about 1:2.25-1:36, more preferably, 1:4-1:16.

While bubble 108 is maintained between pinch rolls 106 and 114, blown tubing 110 is collapsed by rolls 112, and thereafter conveyed through nip rolls 114 and across guide roll 116, and then rolled onto wind-up roll 118. Idler roll 120 assures a good wind-up.

Figure 16:
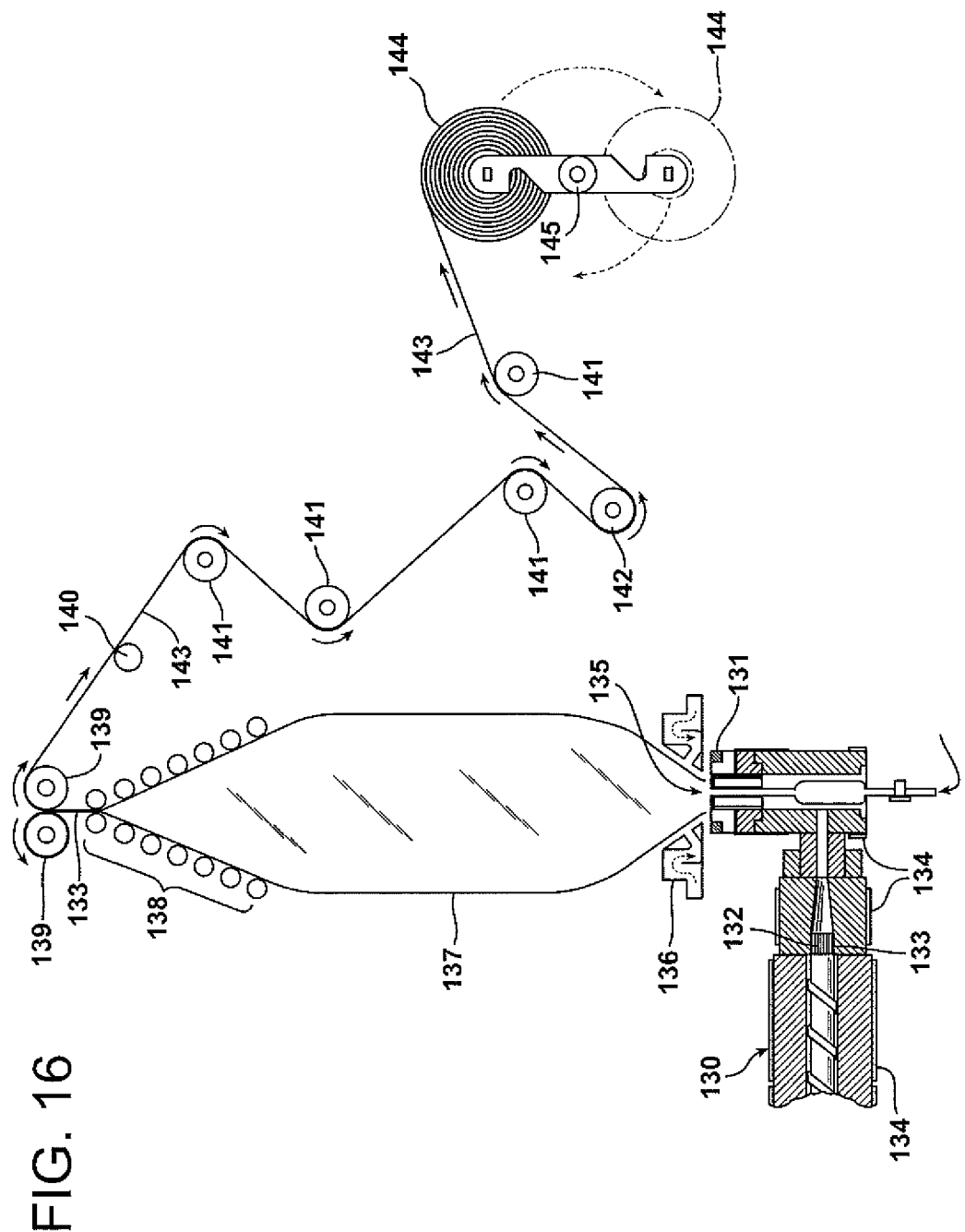
FIG. 16 is a schematic of a process used to make a non-heat-shrinkable film that can be used to make a non-heat-shrinkable bag.

FIG. 16 illustrates a schematic view of a process for making a non-heat shrinkable film, i.e., a "hot-blown" film, which is oriented in the melt state and is not heat shrinkable. Although only one extruder 139 is illustrated in FIG. 16, there can be more extruders, such as 2 or 3 extruders. Extruder 130 supplies molten polymer to annular die 131 for the formation of the film, which can be monolayer or multilayer, depending upon the design of the die and the arrangement of the extruder(s) relative to the die, as known to those of skill in the art. Extruder 130 is supplied with polymer pellets suitable for the formation of the film. Extruder 130 subjects the polymer pellets to sufficient heat and pressure to melt the polymer and forward the molten stream through die 131.

Extruder 130 is equipped with screen pack 132, breaker plate 133, and heaters 134. The film is extruded between mandrel 135 and die 131, with the resulting extrudate being cooled by cool air from air ring 136. The molten extrudate is immediately blown into blown bubble 137, forming a melt oriented film. The melt oriented film cools and solidifies as it is forwarded upward along the length of bubble 137. After solidification, the film tubing passes through guide rolls 138 and is collapsed into lay-flat configuration by nip rolls 139. The collapsed film tubing is optionally passed over treater bar 140, and thereafter over idler rolls 141, then around dancer roll 142 which imparts tension control to collapsed film tubing 143, after which the collapsed film tubing is wound up as roll 144 via winder 145.

Figure 17:
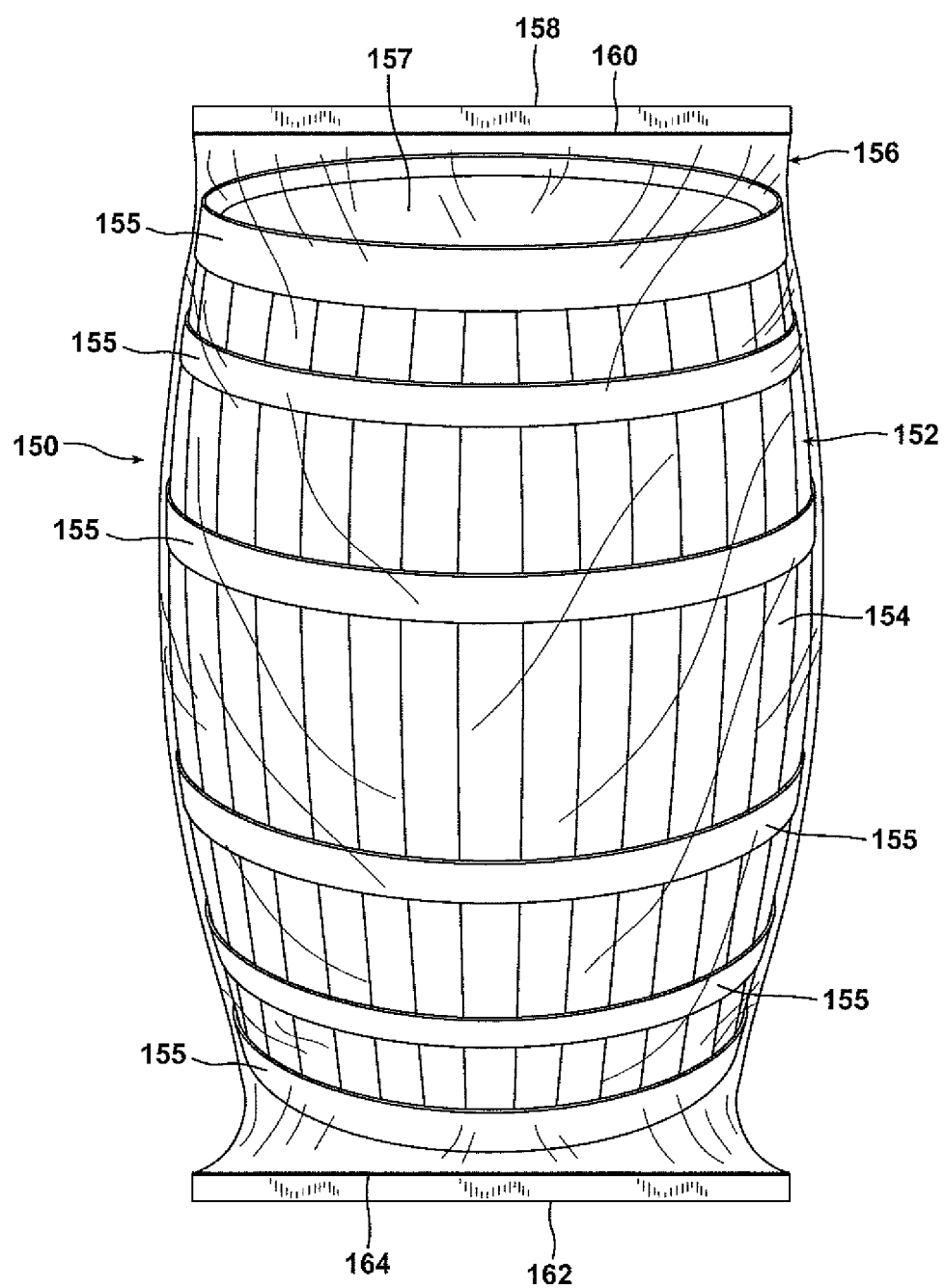
FIG. 17 is a schematic of a barrel enveloped within a bag that has been sealed closed.

FIG. 17 is a schematic of a packaged alcoholic beverage product 150. In FIG. 17, which has barrel 152 within a bag that has been sealed closed. Barrel 152 is made from staves 154 held together by hoops 155 and has top 157 and bottom (not illustrated). Barrel 152 is covered by bag 156 having top edge 158, top heat seal 160, bottom edge 162, and bottom heat seal 164.

EXAMPLES

The present invention can be further understood by reference to the following examples that are merely illustrative and are not to be interpreted as a limitation to the scope of the present invention that is defined by the appended claims. The films of the examples contained various resins identified in the table below.

| Tradename/Supplier | Chemical Nature | Acronym | Properties & Parameters |
|---|---|---|---|
| t50-200-178 Ineos | High density polyethylene | HDPE-1 | 0.952 g/cm³ 2.0 g/10 min |
| Surpass ® EX-HPs667 AB01 Nova Chemicals | High density polyethylene | HDPE-2 | 0.967 g/cm³ 6.0 g/10 min |
| Surpass ® EX-HPs 167AB Nova Chemicals | High density polyethylene | HDPE-3 | 0.966 g/cm³ 1.2 g/10 min |
| T60-500-119 Ineos | High density polyethylene | HDPE-4 | 0.961 g/cm³ 6.2 g/10 min |
| Dowlex ® 2037 Dow | Medium Density Polyethylene (Ziegler natta catalyzed) | MDPE | 0.935 g/cm³ 2.5 g/10 min |
| Dowlex ® 2045.04 Dow | Linear Low Density Polyethylene (Ziegler natta catalyzed) | LLDPE-1 | 0.920 g/cm³ 1.0 g/10 min |
| Dowlex ® 2045.03 Dow | Linear Low Density Polyethylene (Ziegler natta catalyzed) | LLDPE-2 | 0.920 g/cm³ 1.1 g/10 min 6.5 wt % octene mer |
| LDPE-662I Dow | Low Density Polyethylene | LDPE-1 | 0.919 g/cm³ 0.47 g/10 min |
| Escorene ® LD-200.48 ExxonMobil | Low Density Polyethylene | LDPE-2 | 0.915 g/cm³ 7.5 g/10 min |
| EB 403AQ Westlake Chemical | Low Density Polyethylene | LDPE-3 | 0.924 g/cm³ 0.8 g/10 min |
| Elite ® 5400G Dow | Polyethylene, Linear Low Density Ethylene/Octene Copolymer - Single Site/Single Site | ssc EAO-1 | 0.917 g/cm³ 1.1 g/10 min |
| Affinity ® PL 1840G Dow | Polyethylene, Very Low Density Ethylene/Octene Copolymer - Branched, Single Site | ssc EAO-2 | 0.9090 g/cm³ 1.0 g/10 min |
| Exceed ® 4518 ExxonMobil | Single site catalyzed ethylene/hexene copolymer | ssc EAO-3 | 0.918 g/cm³ 4.5 g/10 min |
| Affinity ® EG 8100G Dow | Single site catalyzed ethylene/octene copolymer | ssc EAO-4 | 0.870 g/cm³ 0.99 g/10 min |
| Exceed ® 1012 CA ExxonMobil | Single site catalyzed Linear low density polyethylene | ssc EAO-5 | 0.912 g/cm³ 1.0 g/10 min |
| Exceed ® 1012HA ExxonMobil | Single site catalyzed Linear low density polyethylene | ssc EAO-6 | 0.912 g/cm³ 1.0 g/10 min |
| Wintec WFW4F Japan Polypropylene | Single site catalyzed propylene/ethylene copolymer | ssc EAO-7 | 0.90 g/cm³ 7.0 g/10 min |
| Affinity PL 1850G Dow | Single site catalyzed ethylene octene copolymer | ssc EAO-8 | 0.902 g/cm³ 3.0 g/10 min |
| Exact ® 3128 ExxonMobil | Single site catalyzed Very low density polyethylene | ssc EAO-8 | 0.900 g/cm³ 1.2 g/10 min |
| Fortron ® PPS FX4382T1 | Ethylene/octene block copolymer | EAO-BC | 1.264 g/cm³ |
| EOD-01-03 Total Petrochemical | Propylene-ethylene copolymer | PEC | 0.90 g/cm³ 8.0 g/10 min |
| Surlyn ® AM7927 DuPont | Zinc Neutralized Ethylene Methacrylic Acid copolymer | Ion | 0.980 g/cm³ 11.5 g/10 min |
| Surlyn ® 1859 DuPont | Zinc Neutralized Ethylene Methacrylic Acid copolymer | Ion-2 | 0.94 g/cm³ 4.0 g/10 min |
| EF437AA Westlake Chemical | Ethylene/vinyl acetate copolymer | EVA-1 | 0.925 g/cm3 2.0 g/10 min 2.5 wt % vinyl acetate |
| LD319.32 ExxonMobil | Ethylene/vinyl acetate copolymer | EVA-2 | 0.930 g/cc 2.0 g/10 min |
| Petrothene ® NA 340013 LyondellBasell Ind | Ethylene/vinyl acetate copolymer | EVA-3 | 0.924 g/cc 1.0 g/10 min |
| Plexar ® PX 3227 Nippon Goshei | Maleic anyhydride modified LLDPE | m-LLDPE-1 | 0.913 g/cm³ 1.7 g/10 min |
| Plexar ® PX3610X01 Lyondell Basell Ind. | Maleic Anhydride-Modified Polyethylene, Linear Low Density | m-LLDPE-2 | 0.918 g/cm³ 2.1 g/10 min |
| Plexar ® PX 3410 Lyondell Basell Ind. | Maleic Anhydride-Modified Linear Low Density polyethylene | m-LLDPE-3 | 0.918 g/cm³ 1.1 g/10 min |
| Plexar ® PX 3236 Lyondell Basell Ind. | Maleic Anhydride-Modified Linear Low Density polyethylene | m-LLDPE-4 | 0.921 g/cm³ 2.0 g/10 min |
| NF 539A Mitsui Chemical | Anhydride modified linear low density polyethylene | m-LLDPE-5 | 0.91 g/cc 1.7 g/10 min |
| Plexar ® PX 2246 Lyondell Basell Ind. | Maleic Anhydride-Modified High Density polyethylene | m-HDPE-1 | 0.95 g/cm³ 0.63 g/10 min |
| Plexar ® PX 2220 Lyondell Basell Ind. | Maleic Anhydride-Modified High Density polyethylene | m-HDPE-2 | 0.943 g/cm³ 5.5 g/10 min |
| E171B Evalca/Kuraray | Hydrolyzed ethylene vinyl acetate copolymer | EVOH1 | 1.14 g/cm³ 1.7 g/10 min 44 mol % ethylene |
| Soarnol ® SGN017B Nippon Gohsei | Hydrolyzed Ethylene/Vinyl Acetate Copolymer, Lubricated - Less than 30 mole % Ethylene | EVOH2 | 1.2 g/cm³ 3.8 g/10 min 27.5 mol % ethylene |

| Tradename/Supplier | Chemical Nature | Acronym | Properties & Parameters |
|---|---|---|---|
| Grilon ® CF6S EMS-Grivory | Polyamide 6/12 | PA6/12 | Density 1.05 g/cm$^3$, Melt Index 5.75 g/10 min (Cond. 230° C./2.16 kg), Melting Point 130° C. |
| Ultramid ® B40 LN01 BASF | Polyamide - 6, Lubricated and Nucleated - Poly(caprolactam) | PA6 | 1.14 g/cm$^3$ melt point 220° C. |
| Ultramid ® B40 BASF | Polyamide - 6 (polycaprolactam) | PA6-2 | 1.13 g/cm$^3$ melt point 230° C. |
| Ultramid ® C33 01 BASF | Polyamide 6/66 | PA6/66 | 1.13 g/cm$^3$ 196° C. melt point |
| Ultramid C40 L01 BASF | Polyamide 6/66 | PA6/66-2 | 1.125 g/cc 190° C. melt point |
| MXD6 Nylon S6007 Mitsubishi Engineering - Plastics | Polyamide MXD6 | PA-MXD6 | 0.122 g/cc 237° C. melt point |
| Eastar PETG 6763 Eastman Chemical | Polyethylene terephthalate glycol | PETG | 1.27 g/cm$^3$ 2.8 g/10 min |
| Eastapak Copolyester 9921 Eastman Chemical | Copolyester | CO-PET | 1.40 g/cm$^3$ 255° C. melt point |
| G1645MO Kraton Polymers | styrene ethylene butene terpolymer | SEB | 0.885 g/cm$^3$ 3.25 g/10 min |
| Topas ® 8007 F-04 Topas Advanced Polymers, Inc. | Ethylene norbornene copolymer | ENB-1 | 1.02 g/cm$^3$ 32 g/10 min 36 mol % norbornene |
| Topas ® 9903D-10 Topas Advanced Polymers, Inc. | Ethylene/Norbornene Copolymer | ENB-2 | 0.974 g/cm$^3$ 1.0 g/10 min |
| Topas ® 8007F-400 Topas Advanced Polymers, Inc. | Ethylene/Norbornene Copolymer | ENB-3 | 1.02 g/cm$^3$ 2.04 g/10 min |
| Topas ® E-140 Topas Advanced Polymers, Inc. | Cyclic Olefin Copolymer | ENB-4 | 0.94 g/cm$^3$ 3.0 g/10 min |
| Kemester ® 300 Special PMC Biogenics | Mixed Glycerol Fatty Acid Ester/Propylene Glycol antifog agent | AF | 0.96 g/c$^3$ |
| Polybutylene-1 PB 8640M LyondellBasell Industries | Butene/ethylene copolymer (polybutylene) | PB | 0.90 g/cm$^3$ 1 g/10 min |
| High Purity Ethyl Acetate Eastman Chemical | ethyl acetate | HP EthAcet | 0.9015 |
| Adcote 842 Rohm and Haas | Solvent based Polyurethane | PUAdh-1 | — |
| CR 842B adhesive Rohm and Haas | Aliphatic isocyanate, polyol, ethyl acetate | PuAdh-2 | — |
| Kemamide ® E Ultra Bead PMC-Biogenix | eurcamide wax | WAX-1 | 0.8150 g/cm$^3$ 81° C. melt point |
| Kemamide ® W-40 Prill PMC-Biogenix | N,N'-ethylene-bis stearamide wax | WAX-2 | 0.995 g/cm$^3$ 146° C. melt point |
| Kemamide ® VO PMC-Biogenix | amide-oleamide wax | WAX-3 | 0.920 g/cm$^3$ 73° C. melt point |
| Kemamide ® B Bead PMC-Biogenix | amide wax-behenamide | WAX-4 | 0.8070 g/cm$^3$ |
| Kaopolite ® SF Kaopolite, Inc | Anhydrous aluminum silicate Antiblocking agent | AB-1 | 2.62 g/cm$^3$ 1% moisture |
| 502835 Ampacet | Sodium Calcium Aluminosilicate and Talc in High Density Polyethylene | AB-2 | 1.06 g/cm$^3$ 4.8 g/10 min |
| Superfine Super Floss Celite | Silica-calcined diatomaceous earth | AB-3 | 2.3 g/cm$^3$ |
| LP 102.74 ExxonMobil | Antiblock and slip in low density polyethylene | AB-4 | 0.920 g/cm$^3$ 6.5 g/10 min |
| 10622 Ampacet | Antiblock in low density polyethylene | AB-5 | 0.92 g/cc |
| FSU 255E Schulman | Slip and antiblock in polyethylene | S&AB-1 | 1.08 g/cm$^3$ 8.0 g/10 min |
| 100458 Ampacet | Fluoropolymer in LLDPE: Processing aid | PA-1 | 0.93 g/cm$^3$ 1.4 g/10 min |
| 102804 Ampacet | Antiblock and slip in high density polyethylene | AB/S | 1.02 g/cc 7.1 g/10 min |
| 95% EVA-1 3.3% WAX-2 1.7% AB-3 | Polymer blend | PolyBlnd | see components above |
| 90.8% EVA-1 3.4% WAX-1 3.3% WAX-2 1.7% AB-3 0.8% WAX-3 | Masterbatch | MB | see components above |

Example 1 (Comparative)

A first set of ninety-eight empty, used American standard white oak casks were each overwrapped (i.e., "bagged") using an end-seal bag made from transparent, heat-shrinkable Film No. 1, described below. Each wooden cask had a length of 100 centimeters and a maximum diameter of 55 centimeters. The bag placed over each cask was an end-seal bag having a lay-flat width of 115 cm and a length of 200 cm. Each empty cask was packaged by standing the cask upright on end, with the open end of the end-seal bag dropped down over the upright cask until the end-seal contacted the top of the cask. The cask was then inverted while the bag was held in place around the cask. After inverting the cask 180 degrees, i.e., other end up, the open end of the bag was pulled upward and the excess bag length was gathered together over the upper cask end. Pressure-sensitive packaging tape (equivalent or similar to Scotch® 3750 Commercial Performance packaging tape) was wrapped around the gathered excess bag length immediately over the upper end of the cask, thereby enclosing the cask inside the bag and effectively enveloping the cask within the bag.

After bagging the cask, the bung hole in the cask was visually located through the transparent film. A small piece of the bag film (i.e., 2.5 to 3.5 cm in diameter) was cut away, exposing the bung hole. Using the passageway through the bung hole, the cask was then filled with malt distillate from a dip tank and a bung was driven into the bung hole to seal the cask closed. No film patch was secured over the hole cut into the film over the bung hole.

Using an air gun, the bags around the first ten of the ninety-eight casks were shrunk before the bagged casks were filled and transported to and placed on the aging rack. During the shrinking of the bag film on the first ten casks, it was noticed that the film strained along the steel hoops, and caused the film to tear in the vicinity of the hoops while the film was shrinking. Moreover, during transport of the resulting bagged casks, the shrunken film exhibited significant tearing during transport to the aging rack. After racking ten of the ninety-eight casks, it was decided not to shrink the film against the eleventh cask, and it was found that the film over the eleventh cask exhibited less tearing during transport than the films that were shrunk around the casks. As a result, the bag film was not shrunken for the remaining eighty-seven casks.

Each of the first set of ninety-eight bagged, filled casks were transported from the bagging and filling area to the storage rack in the distillate aging warehouse. During the transport of the bagged casks, the bags suffered damage, including numerous holes and tears on the staves and in the hoop areas as the casks were rolled and otherwise moved onto a storage rack for aging of the alcoholic beverage, with the shrunken films exhibiting more holes and tears than the unshrunken films.

The rack was present in a warehouse in which outdoor temperatures ranged from about 12° C. to 30° C. in the winter, and from about 22° C. to 40° C. in the summer. The first set of ninety-eight bagged casks were loaded onto the same distillate aging rack, which had a capacity of about 115 casks. The first set of ninety-eight bagged, filled casks were placed on the rack.

The first set of bagged casks remained on the rack, unmoved, for a period of one year. After the year of aging on the rack, the aged alcoholic beverage in each of the first set of ninety-eight casks was poured into an empty dip tank, with the volume and ethanol content of the aged alcoholic beverage measured and compared against the initial volume and initial ethanol content of the malt distillate alcoholic beverage. Moreover, the aged alcoholic beverage was tested for organoleptic properties.

A second set of ninety-eight empty American standard used white oak casks, each also having a volume of 53 gallons and filled with the same malt spirit from the same batch of distillate from the same dip tank, was aged during the same year as the first set of bagged casks was aged. The oak casks of the second set were not bagged, and were left without any overwrap and aged as comparative examples. The second set of ninety-eight unbagged, comparative casks were racked on another similar rack in the same warehouse, and as with the first set of casks. The aged alcoholic beverage from the second set of ninety-eight unbagged casks was also emptied into an empty dip tank, with the volume, ethanol content, and organoleptic properties of the aged alcoholic beverage from the unbagged casks measured and compared against the initial volume and initial ethanol content of the malt distillate alcoholic beverage placed into the unbagged casks.

The results of the tests obtained for the aged alcoholic beverage from ninety-eight aged, bagged casks were compared against the test results obtained for the ninety-eight aged, unbagged casks.

Film No. 1, had the following layer arrangement and layer composition:

| | | | | Film No. 1 | | | |
|---|---|---|---|---|---|---|---|
| Layer 1 (inside) | Layer 2 | Layer 3 | Layer 4 | Layer 5 | Layer 6 | Layer 7 | Layer 8 (outside) |
| 71% LLDPE 24% MDPE 4% AF 1% AB-1 (0.27 mil) | mLLDPE-1 (0.09 mil) | 80% PA 6/66 20% Ion (0.09 mil) | EVOH1 (0.09 mil) | 90% EVOH1 10% PA 6/12 (0.09 mil) | 80% PA 6/66 20% Ion (0.09 mil) | mLLDPE-1 (0.09 mil) | 71% LLDPE 24% MPDE 4% AF 1% AB-1 (0.27 mil) |

Film No. 1 was a heat-shrinkable, heat-sealable film multilayer film having eight layers and a total thickness of 1 mil before shrinking. Layer 4 contained saponified ethylene/vinyl acetate copolymer (also referred to as "ethylene/vinyl alcohol copolymer") having a thickness of 0.09 mm. Layer 4 controlled the oxygen transmission rate of the entire film because it had the lowest OTR of any of the film layers. Film No. 1 also had outer ethylene-based layers providing heat sealability and abuse resistance.

Each end-seal bag was made by heat sealing across a seamless extruded tubing having a lay-flat width of 115 centimeters. After the end-seal was made, the inside layer of the multilayer tubing film was heat sealed to itself at intervals of 200 centimeters. The tubing was cut transversely about 1 cm below the transverse heat seal, to produce the end-seal bags. Heat-shrinkable Film No. 1 was produced using a process as illustrated in FIG. 15, described above. The end-seal bag was as illustrated in FIGS. 1 and 2, described above.

On a bulk liter basis, the results demonstrated that the 1 mil thick Film No. 1 reduced the loss from 12.84% for the unbagged casks to 10.52% for the bagged casks, which is an 18.07% reduction in diffusion and evaporation loss on a bulk liter basis. Since the 18.07% reduction in bulk liter loss was greater than the 16.2% reduction in proof liter loss, it is apparent that while the bagging of the casks in Film No. 1 reduced the loss of both water and ethanol from the cask, the bagging reduced the loss of water more than the loss of ethanol, i.e., the bag was somewhat more of a barrier to the moisture vapor than to the ethanol.

After the 12 months of aging, sensory testing (i.e., taste testing) of the aged distillate revealed no noticeable difference between the organoleptic properties of the distillates in the bagged casks versus the organoleptic properties of the distillate in the unbagged comparative casks. It was recognized that the numerous holes and tears could have contributed to the migration of enough atmospheric oxygen through the cask walls and into the distillate to enable the oxidative reactions that result in the formation of desired organoleptic components such as esters, etc. Thus, the holes and tears could have been partially or wholly responsible for the result that the aged distillate had an organolepic character equivalent to the unbagged comparative casks.

The discovery that the 16.2% reduction in Angels' Share proof-liter loss of Example 1 occurred even though the bags had numerous holes and tears during the 12 month aging period, led to the conception that a more effective reduction in Angels' Share proof-liter loss could be effected if the bags of Film No. 1 were overwrapped with a second bag made from a tough film. This conception was the basis for the design of Example 2, below.

Example 2 (Comparative)

A set of ten used American standard used white oak casks, each having a volume of 53 gallons, were filled with malt spirit from a dip tank. The casks themselves were identical to the casks utilized in Example 1. Each cask was "double bagged" by being first bagged in a bag made from transparent, heat-shrinkable transparent Film No. 1 (described above), the bags being identical to the bags used in Example 1. The resulting bagged cask was bagged again (i.e., "overbagged" or "double bagged") by having a second bag made from transparent Film No. 2 placed over the cask and over the bag made from Film No. 1.

After placing both bags over the cask, the open end of both bags were pulled upward and the excess bag length was gathered together over the upper cask end. As with the bagged casks of Example 1, pressure-sensitive packaging tape was wrapped around the gathered excess bag lengths immediately over the upper end of the cask, thereby enclosing the cask inside the first bag, while simultaneously enclosing both the cask and first bag in inside the second bag.

A set of ten control casks were also prepared using the same type of barrels and using the same malt spirit from the same dip tank. However, the ten control casks were left to age without coverage by any film, i.e., with the cask surface in direct contact with the ambient environment in the aging warehouse.

Film No, 2, had the following layer arrangement and layer composition.

| Film No. 2 | | |
|---|---|---|
| Layer 1 (inside) | Layer 2 | Layer 3 |
| 50% LLDPE-2 | 90% LLDPE-2 | 50% LLDPE-2 |
| 25% MDPE | 4.5% LLDPE | 25% MDPE |
| 24.6% EVA | 3.4% $C_3/C_2$ copolymer | 24.6% EVA |
| 0.26% WAX-2 | 2% polypropylene | 0.26% WAX-2 |
| 0.14% AB-3 | 0.5% polybutylene | 0.14% AB-3 |
| (0.53 mil) | (1.94 mils) | (0.53 mil) |

As with Film No, 1, Film No. 2 was also heat-shrinkable and heat-sealable. Film No. 2 was a multilayer film having three layers and a total thickness of 3 mils before shrinking. Film No. 2 was made primarily from ethylene-based polymers. Film No. 2 was thick and tough, providing abuse-resistance in an effort to prevent the formation of holes and tears during transport of the casks from the bagging area to the aging rack. However, Film No. 2 did not contain an $O_2$-barrier layer. Film No. 2 was also produced using a process as illustrated in FIG. 15, described above.

The bagged casks remained on the rack, unmoved, for a period of six months. The control casks were aged on a similar rack at a similar level in the warehouse. When the malt spirit was added to each of the twenty casks (i.e., the ten casks of the example plus the ten control casks), the average volume of the malt spirit in each cask was 200.25 liters. After the six months of aging, the average volume in each of the ten double bagged casks was 187 liters, while the average volume in each of the ten double bagged casks was 181 liters. Thus, the bagged casks suffered an average fluid loss of 13.25 liters (i.e., 6.6%), while the unbagged control casks suffered an average fluid loss of 19.25 liters (i.e., about 9.6%). The use of the doubled bags around the ten casks of example 2 reduced the fluid loss level about 3.3% of the 9.6% fluid loss that occurred for the ten unbagged control casks, i.e., approximately a 34.4% reduction in the level of fluid loss.

In addition, a blind taste test was conducted of the aged malt sprit from the ten bagged casks versus the aged malt spirit from the ten unbagged control casks. The perception of the taste tester was that the liquid from the wrapped casks possessed "smoother notes" than the liquid from the unwrapped casks. Moreover, the liquid from the wrapped casks was marginally darker in color versus the liquid from the control casks.

Additional films have been prepared for use in the preparation of a packaged alcoholic beverage product. Several of these films contained an ethylene/norbornene copolymer. It has been found that ethylene/norbornene copolymer can be used to make a film providing the combination of (i) a relatively low ethanol transmission rate, (ii) a relatively low water vapor transmission rates, and while at the same time providing (iii) a relatively high $O_2$ transmission rate.

Film No. 3 through Film No. 16, set forth below, can be used to make a packaged alcoholic beverage product, with the package being suitable for aging. In a single package, the films can be used either singly or one on top of another. The alcoholic beverage can be placed in a wooden barrel which is thereafter sealed closed and then partially covered or fully covered with the film. Supplemental films such as the relatively thick and abuse resistant Film No. 2, described above, can be used overtop of any one or more of Film Nos. 2 through Film No. 16.

Film No. 3

| Layer 1 (inside) | Layer 2 | Layer 3 | Layer 4 | Layer 5 | Layer 6 | Layer 7 (outside) |
|---|---|---|---|---|---|---|
| 22% LDPE-1<br>70% LLDPE<br>8% AB-2<br>(1.93 mils) | mLLDPE-2<br>(0.28 mil) | PA6<br>(0.55 mil) | EVOH2<br>(0.55 mil) | PA6<br>(0.55 mil) | mLLDPE-2<br>(1.10 mils) | 60% ENB-1<br>15% HDPE-1<br>20% ssc-LLDPE<br>5% AB-2<br>(0.55 mil) |

Film No. 4

| Layer 1 (inside) | Layer 2 | Layer 3 | Layer 4 | Layer 5 | Layer 6 (outside) |
|---|---|---|---|---|---|
| 74% LLDPE<br>22.74% EVA<br>1.17% WAX-1<br>0.91% WAX-2<br>0.86% AB-1<br>0.32% AB-3<br>(0.04 mil) | 45% LLDPE<br>40% ssc EAO-2<br>13.8% EVA<br>0.45% WAX-1<br>0.27% WAX-2<br>0.14% WAX-3<br>0.30% AB-1<br>(0.05 mil) | ENB-2<br>(0.06 mil) | LLDPE<br>(0.06 mil) | 45% LLDPE<br>40% ssc EAO-2<br>13.8% EVA<br>0.45% WAX-1<br>0.27% WAX-2<br>0.14% WAX-3<br>0.30% AB-1<br>(0.05 mil) | 74% LLDPE<br>22.74% EVA<br>1.17% WAX-1<br>0.91% WAX-2<br>0.86% AB-1<br>0.32% AB-3<br>(0.04 mil) |

Film No. 5

| Layer 1 | Layer 2 | Layer 3 | Layer 4 | Layer 5 |
|---|---|---|---|---|
| ssc EAO-3<br>(0.4 mil) | ssc EAO-4<br>(0.6 mil) | ssc HDPE-2<br>(1.0 mil) | ssc EAO-4<br>(0.6 mil) | ssc EAO-3<br>(0.4 mil) |

Film No. 6

| Layer 1 | Layer 2 | Layer 3 | Layer 4 | Layer 5 |
|---|---|---|---|---|
| ssc EAO-3<br>(0.4 mil) | ssc EAO-4<br>(0.6 mil) | ssc HDPE-3<br>(1.0 mil) | ssc EAO-4<br>(0.6 mil) | ssc EAO-3<br>(0.4 mil) |

Film No. 7

| Layer 1 | Layer 2 | Layer 3 | Layer 4 | Layer 5 |
|---|---|---|---|---|
| 70% ssc EAO-3<br>30% AB-4<br>(0.4 mil) | ssc EAO-4<br>(0.6 mil) | EAO-5<br>(1.0 mil) | ssc EAO-4<br>(0.6 mil) | 70% ssc EAO-3<br>30% AB-4<br>(0.4 mil) |

Film No. 8

| Layer 1 | Layer 2 | Layer 3 | Layer 4 | Layer 5 |
|---|---|---|---|---|
| 70% ssc EAO-3<br>30% AB-4<br>(0.4 mil) | ssc EAO-4<br>(0.6 mil) | 70% ENB-3<br>30% ssc EAO-5<br>(1.0 mil) | ssc EAO-4<br>(0.6 mil) | 70% ssc EAO-3<br>30% AB-4<br>(0.4 mil) |

Film No. 10

| Layer 1 | Layer 2 | Layer 3 | Layer 4 | Layer 5 |
|---|---|---|---|---|
| 70% ssc EAO-3<br>30% AB-4<br>(0.4 mil) | ssc EAO-4<br>(0.6 mil) | 70% ENB-3<br>30% ssc EAO-5<br>(1.0 mil) | ssc EAO-4<br>(0.6 mil) | 70% ssc EAO-3<br>30% AB-4<br>(0.4 mil) |

Film No. 11

| Layer 1 | Layer 2 | Layer 3 |
|---|---|---|
| EVA-2<br>20% PB<br>2% AB-5<br>(0.4 mil) | 60% ENB-3<br>40% EAO-5<br>(3.2 mils) | HDPE-4<br>(0.4 mil) |

Film No. 12

| Layer 1 | Layer 2 | Layer 3 |
|---|---|---|
| EVA-2<br>20% PB<br>2% AB-5<br>(0.4 mil) | 70% ENB-3<br>30% EAO-5<br>(3.2 mils) | HDPE-4<br>(0.4 mil) |

Film No. 13

| Layer 1 | Layer 2 | Layer 3 |
|---|---|---|
| EVA-2<br>20% PB<br>2% AB-5<br>(0.4 mil) | 80% ENB-3<br>20% EAO-5<br>(3.2 mils) | HDPE-4<br>(0.4 mil) |

| Film No. 14 | | |
|---|---|---|
| Layer 1 | Layer 2 | Layer 3 |
| 98% LUNG | 30% ENB-3 | 98% EVA-3 |
| 2% AB-5 | 70% ssc EAO-5 | 2% AB-5 |
| (0.9 mil) | (2.7 mils) | (0.9 mil) |

| Film No. 15 |
|---|
| 100% ENB-3 |
| (4 mils; cast monolayer film) |

Film No. 16 was made from 100% cyclic olefin copolymer and exhibited an ethanol transmission rate of 0.0175 $g/m^2$/day, an oxygen ($O_2$) transmission rate ("OTR") of 50 cc $g/m^2$/day, and a moisture vapor transmission rate ("MVTR") of 0.078 $g/m^2$/day.

| Film No. 16 |
|---|
| Layer 1 (monolayer film) |
| 100% Fortron ® PPS FX 4382T1 polyphenylene sulfide (6 mils; cast film) |

Weight Loss Studies of Pouches Made from Films 17-22

Film Numbers 17-22, set forth below, were prepared. Film Nos. 17, 18, and 19 were hot blown (i.e., not heat shrinkable) films prepared in accordance with the process illustrated in FIG. 16, described above. Film Nos. 20, 21, and 22 were oriented (i.e., heat-shrinkable) films made in accordance with the process illustrated in FIG. 15, described above.

Below is a table providing a summary of cyclic olefin copolymer content and total film gauge for each of Film Nos. 17-22. For each of Film Nos. 17-22, more detailed information is present in Tables 20 through 25, below.

| Film No. | Solid State Oriented or Hot Blown | Wt % COC (in blend in layer) | Wt % COC (total film basis) |
|---|---|---|---|
| 22 | SS Oriented | 0 | 0 |
| 21 | SS Oriented | 50 | 12.5 |
| 20 | SS Oriented | 70 | 18.25 |
| 17 | Hot Blown | 0 | 0 |
| 18 | Hot Blown | 50 | 30 |
| 19 | Hot Blown | 70 | 49 |

Each of Film Nos. 17-22 was used to make a plurality of pouches that were filled with various liquids and sealed closed to make a packaged product. The packaged products were place in conditioned storage for specified periods, and were periodically removed for a brief period so that the weight of the packaged product could be measured.

Each of Film Nos. 17-22 was tested using each of three different fluids. A first fluid, termed a "duplicating fluid," contained "95% ethanol"+anhydrous esters. More particularly, the duplicating fluid was Duplicating Fluid no. 5, i.e., DPF 501, obtained from SolvChem, Inc. DPF 501 contained 85-90% ethanol (CAS #64-17-5) [European EC #200-578-6], 0-10% n-propyl acetate (CAS #109-60-4), and 0-5% isopropanol (CAS #67-63-0) [European EC #200-661-7].

The second fluid was a 60 vol %/40 vol % (52 wt %/47 wt %) mixture of ethanol and water. The third fluid was 100% water.

For each of Film Nos. 17-22, a first set of five pouches packaging the first fluid (DPF 501) were stored at 32° C. and 40% relative humidity. A second set of five pouches packaging DPF 501 were stored at 32 C and 70% relative humidity. A first set of five pouches containing the second fluid (60/40 ethanol/water mix) were stored at 32° C. and 70% relative humidity. A second set of five pouches containing the second fluid were stored at 32° C. and 40% relative humidity. A first set of five pouches containing the third fluid (100% water) were stored at 32° C. and 70% relative humidity. A second set of five pouches containing the third fluid (100% water) were stored at 32° C. and 40% relative humidity. Thus, in the weight loss tests, a total of 180 pouches were tested, i.e., thirty pouches for each of the six films tested.

The change in weight provided evidence of the permeability of the film as a function of the film layer arrangement, layer composition, and layer thickness, the type of liquid contained in the package, and the ambient conditions during storage, i.e., the temperature and relative humidity. In this manner, each of Film Nos. 17-22 were assessed for weight change as a function of type of solution in the pouch, ambient conditions in which the pouch was stored, and length of time in the pouch.

The ratio of surface area of American standard oak barrels (53 gallon) to weight of distillate inside the barrel was calculated as 5643 $in^2$ for 53 gallons having a density of 0.89 (i.e., a fluid weight of 178,557 grams), producing a surface area (SA) to weight (g) ratio of 5643 $in^2$ to 178,557 grams=0.031 $in^2/g$. The ratio of surface area of 5 gallon oak test barrels to weight of distillate inside the test barrel was calculated 1465 $in^2$ containing 5 gallons liquid (16,845 grams), resulting in a surface area to weight ratio of 1465 $in^2$ to 16,845 grams of 0.086 $in^2/g$.

The packaged products made up using the 180 pouches provided from about 8× to about 11× greater surface area to weight ratio than the barrel surface area to distillate weight values calculated values above. Each packaged product was made from a single piece of film six inches long and four inches wide. It was folded in half and sealed along each side edge, resulting in a pouch having lay-flat dimensions of 4 inches wide and 3 inches long, with an appearance substantially corresponding with the side-seal bag of FIGS. 3 and 4, described above. The ratio of surface area of the pouch to weight of liquid inside the pouch was calculated as follows. For 100% water, the inside surface area was assumed to be 24 $in^2$, and 100 grams of water were place in the pouch, producing a surface area to weight ratio of 24 $in^2$/100 g, = 0.24 $in^2/g$, which is about 8× the SA/g of the American standard barrel. For the 60/40 ethanol/water blend, the inside surface area was assumed to be 24 $in^2$, and 80 grams of the blend were place in the pouch, producing a surface area to weight ratio of 24 $in^2$/80 g, =0.30 $in^2/g$, which is about 10× the SA/g of the American standard barrel. For the pouches filled with DPF501, the inside surface area was assumed to be 24 $in^2$, and 70 grams of the blend were place in the pouch, producing a surface area to weight ratio of 24 $in^2$/70 g, =0.34 $in^2/g$, which is about 11× the SA/g of the American standard barrel. In this manner, the higher surface area per gram of fluid provided the potential to accelerate the relative amount of weight change of the liquid in the pouch, relative to the amount of weight change likely to occur with a standard oak barrel surrounded by the same film.

Figure 20:
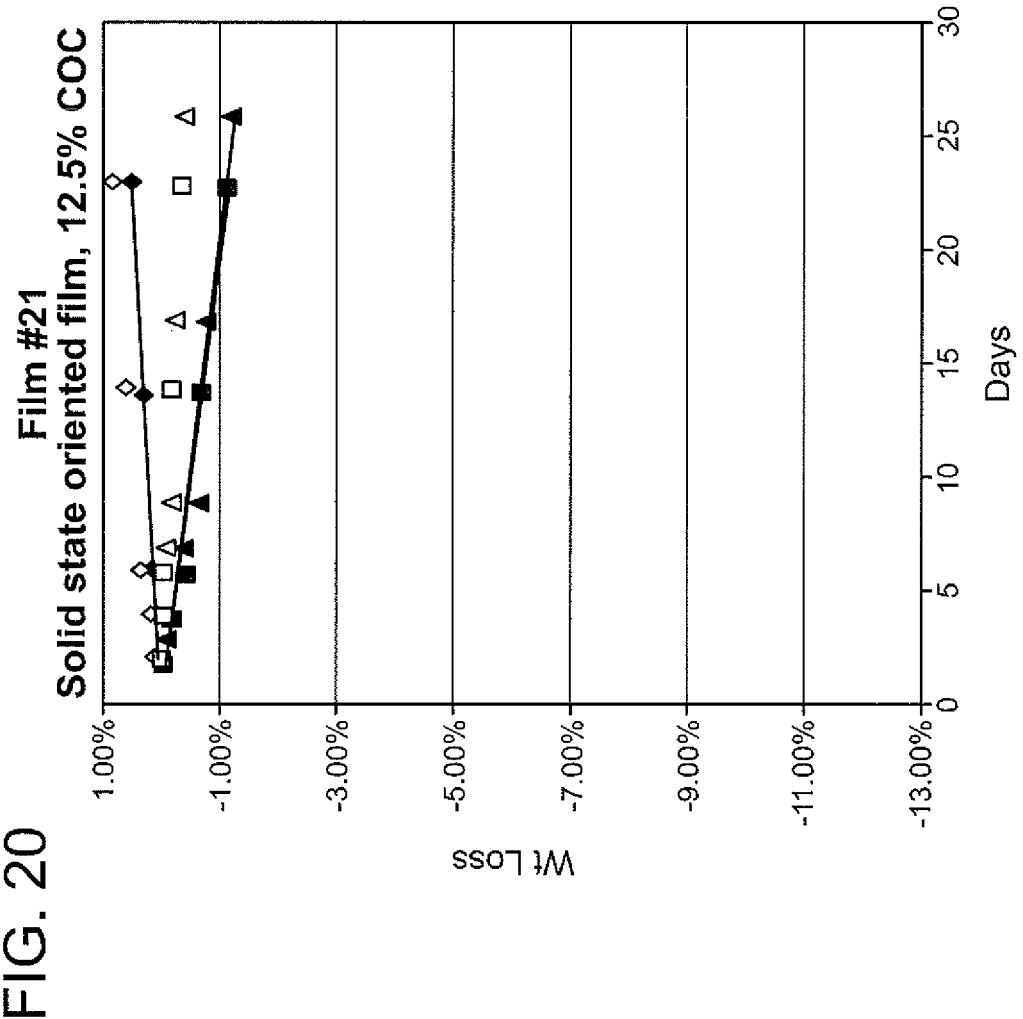
FIG. 20 is a graph of weight loss as a function of time for pouches made from Film No. 21, under two different relative humidity conditions.
Figure 21:
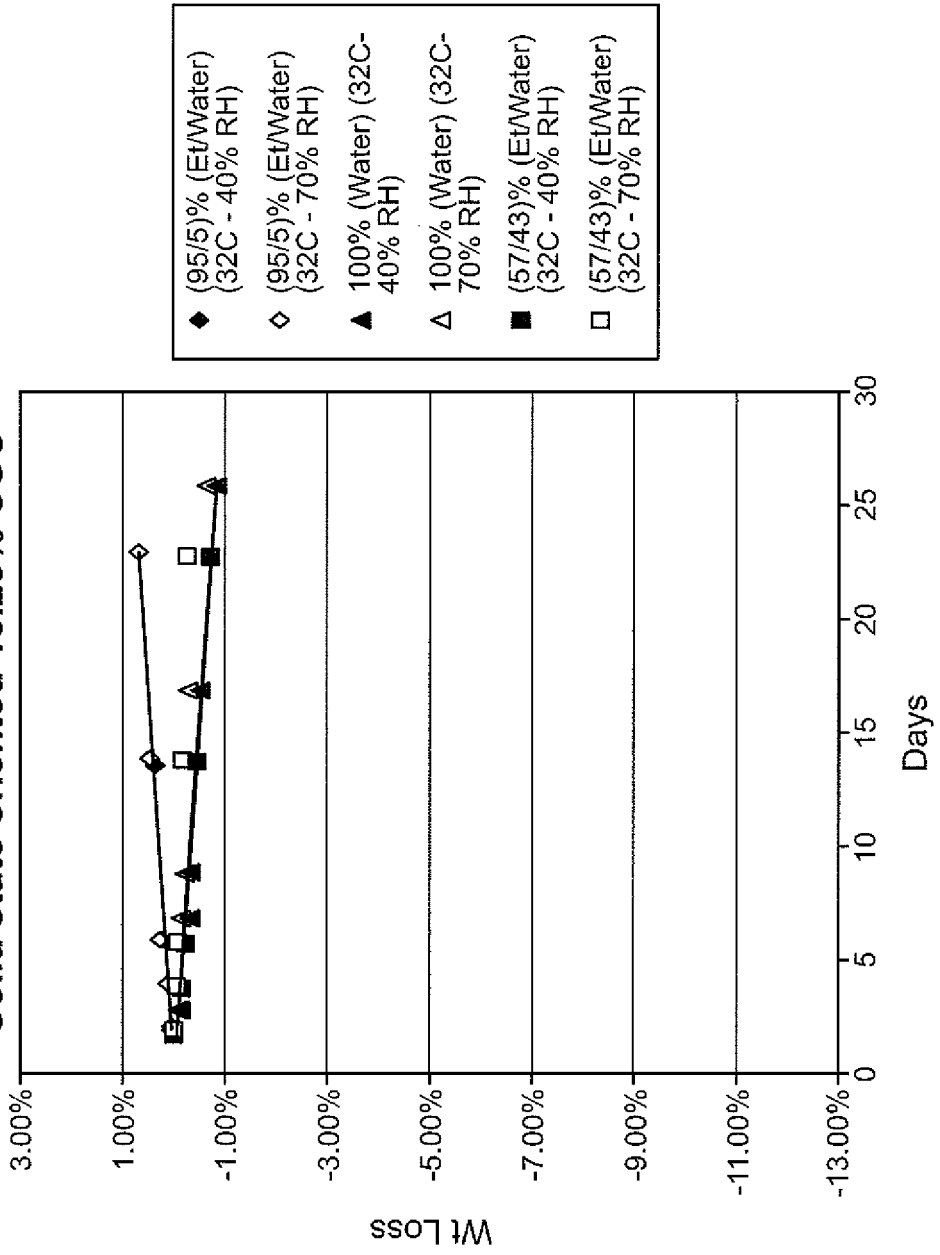
FIG. 21 is a graph of weight loss as a function of time for pouches made from Film No. 20, under two different relative humidity conditions.
Figure 22:
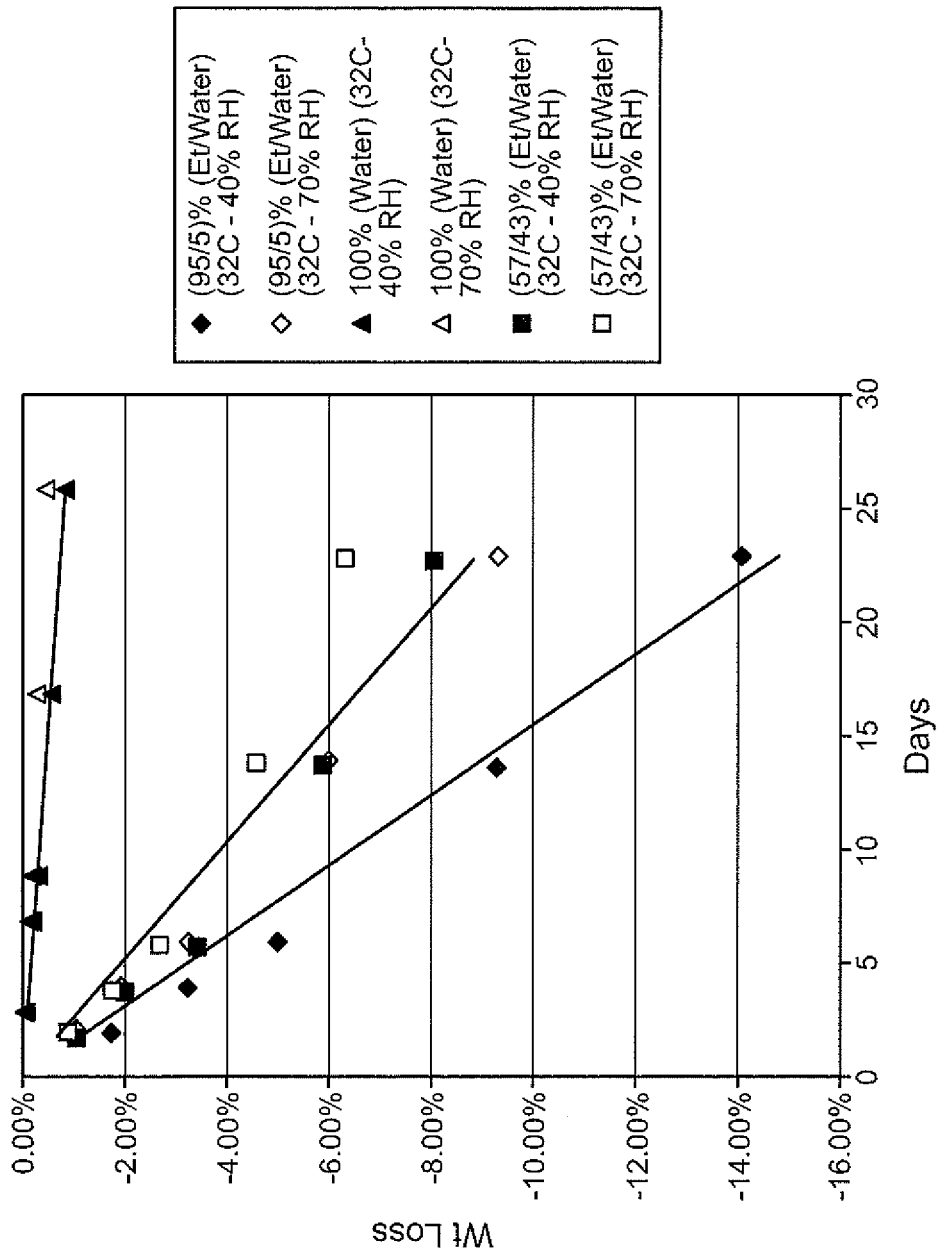
FIG. 22 is a graph of weight loss as a function of time for pouches made from Film No. 17, under two different relative humidity conditions.
Figure 23:
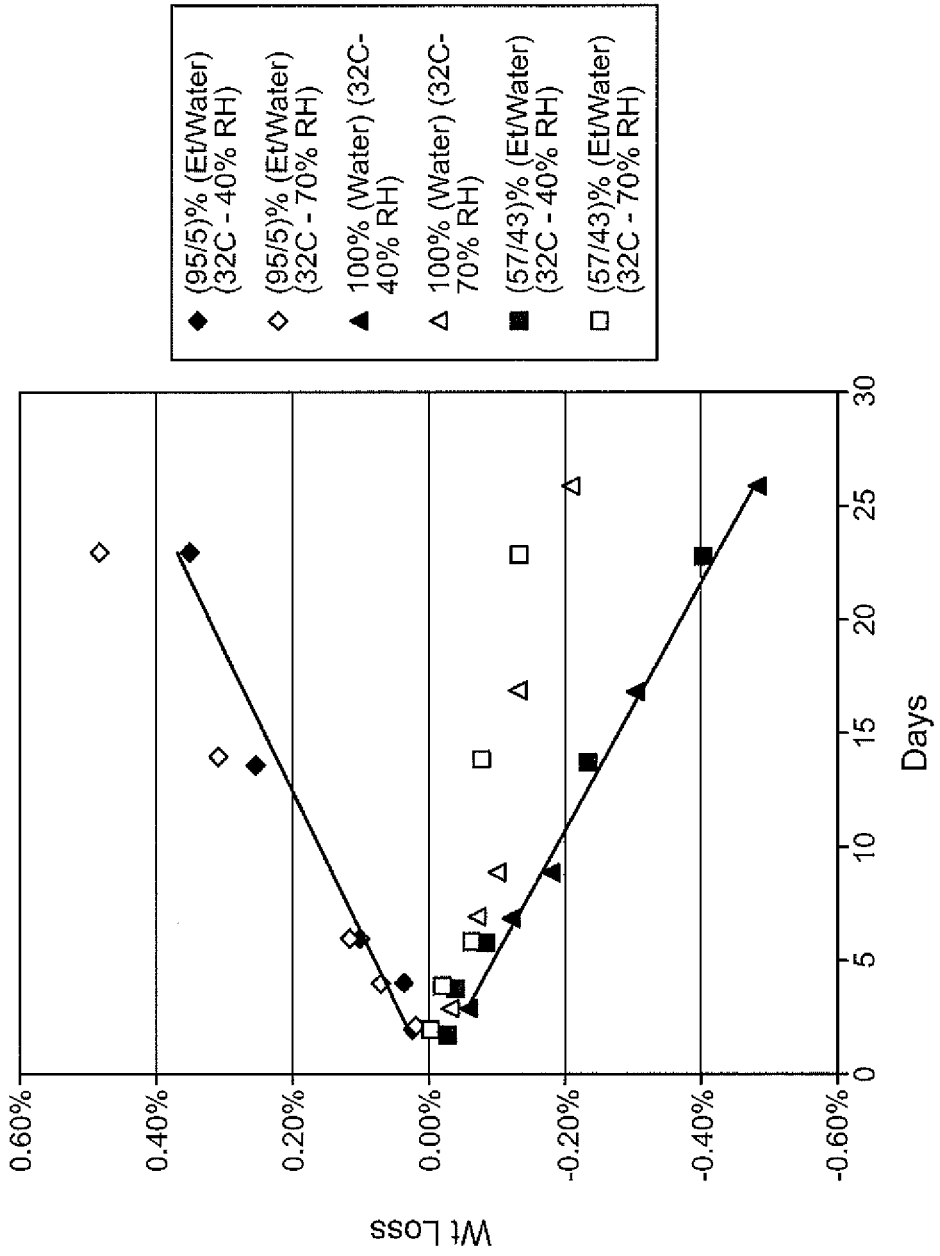
FIG. 23 is a graph of weight loss as a function of time for pouches made from Film No. 18, under two different relative humidity conditions.
Figure 24:
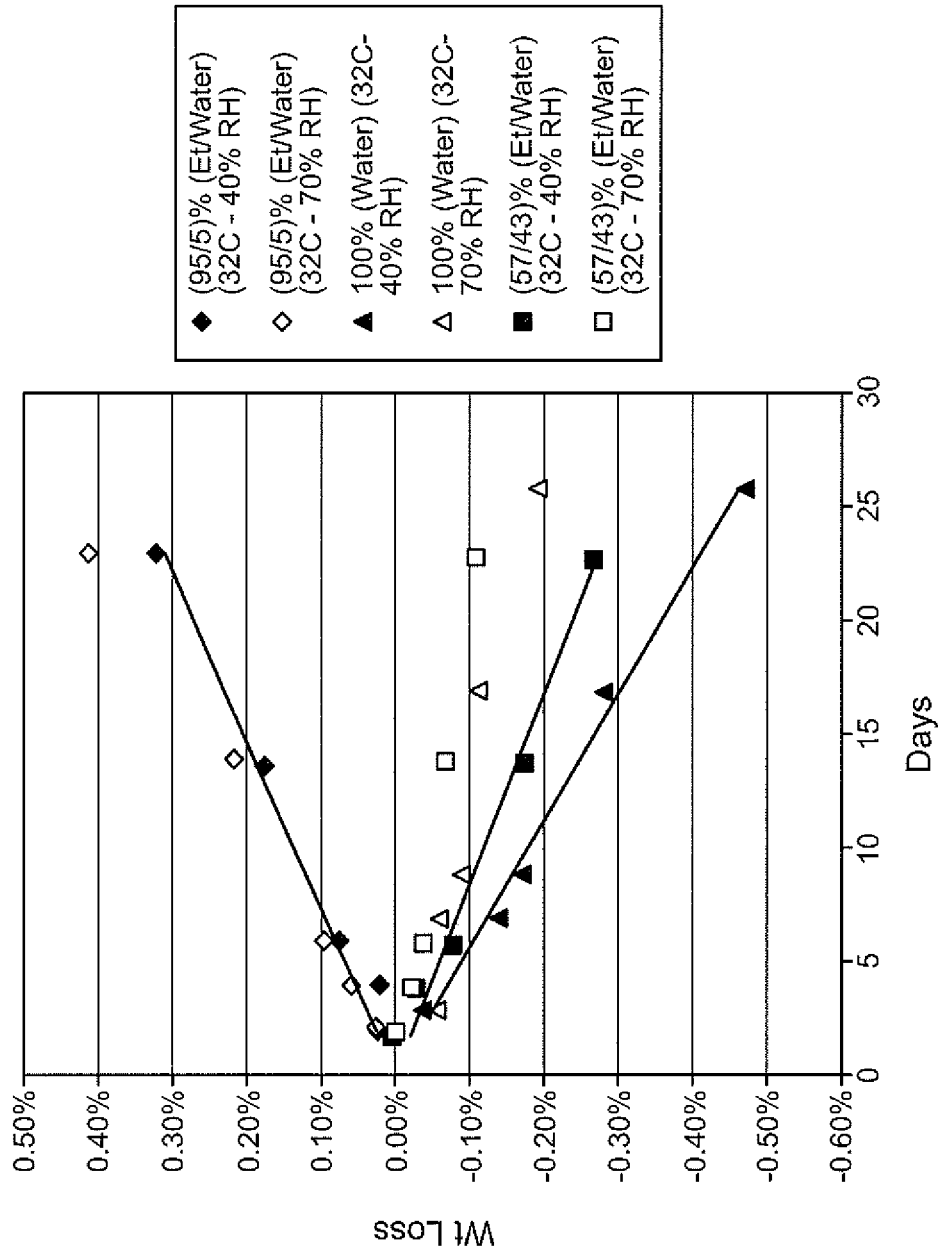
FIG. 24 is a graph of weight loss as a function of time for pouches made from Film No. 19, under two different relative humidity conditions.

FIGS. 19-24 are graphical representations of the data obtained from the weight loss studies of the 180 pouches. FIG. 19 provides the test results for Film No. 22. FIG. 20 provides the test results for Film No. 21. FIG. 21 provides the test results for Film No. 20. FIG. 22 provides the test results for Film No. 17. FIG. 23 provides the test results for Film No. 18. FIG. 24 provides the test results for Film No. 19.

As can be seen in FIGS. 19-24, the rate of weight loss varied as a function of the nature of the liquid, the conditions of storage, and the type of film. Films with the highest amount of cyclic olefin copolymer (Film Nos. 19 and 20, containing 49% and 18.25% cyclic olefin copolymer, respectively) exhibited the lowest rates of weight loss (0.48% and 0.8% loss of water, respectively, at 40% relative humidity) compared with films containing less cyclic olefin copolymer, and in fact exhibited weight gain in samples containing DPF501. In contrast, films with the lowest amount of cyclic olefin copolymer (Film Nos. 17 and 22, each with 0% cyclic olefin copolymer) exhibited the highest rates of weight loss compared with the films containing more cyclic olefin copolymer, and in fact respectively exhibited 14% and 11% weight loss in the samples containing DPF501 at 40% relative humidity. The two films containing the intermediate levels of cyclic olefin copolymer (Film Nos. 18 and 21) produced intermediate results with respect to weight loss.

Figure 25:
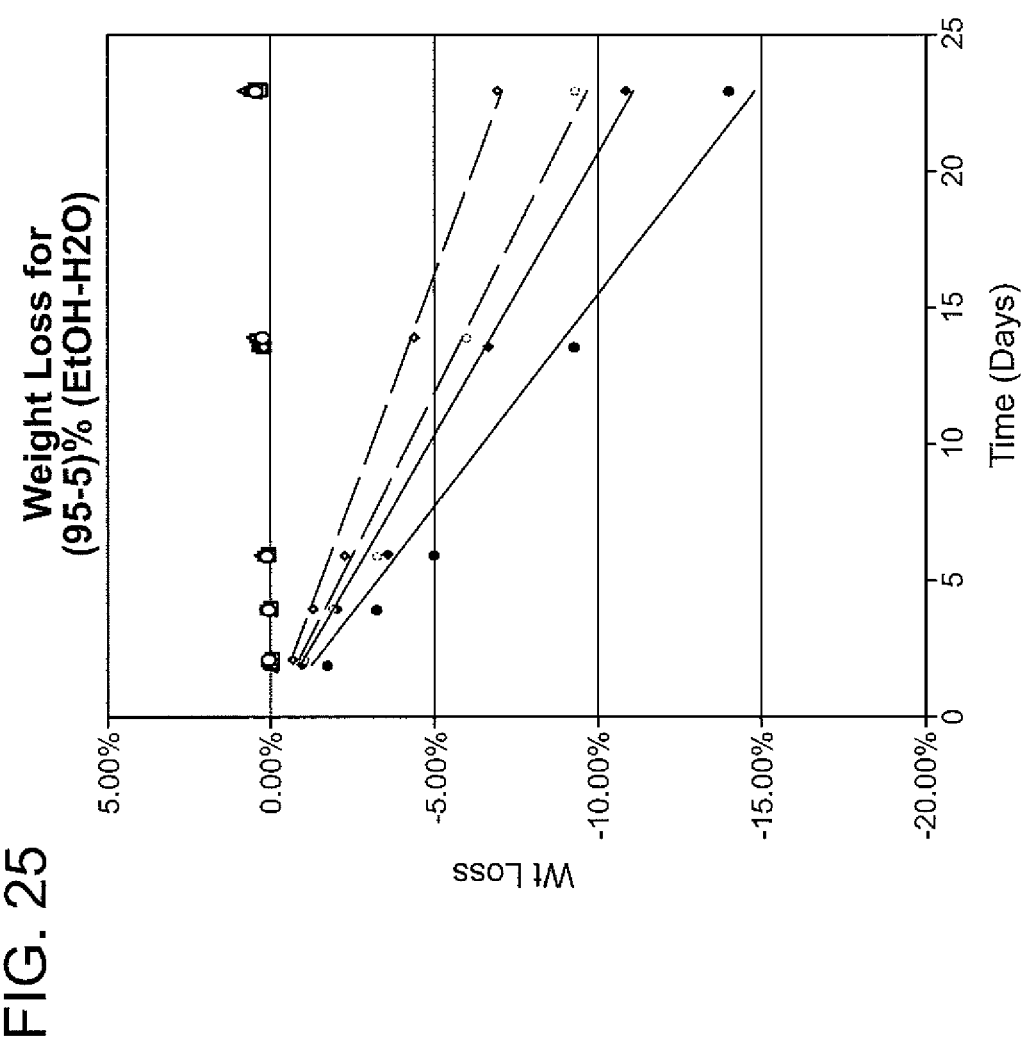
FIG. 25 is a graph of weight loss as a function of time for a 95% ethanol solution in pouches made from Film Nos. 17-22, under two different relative humidity conditions.
Figure 26:
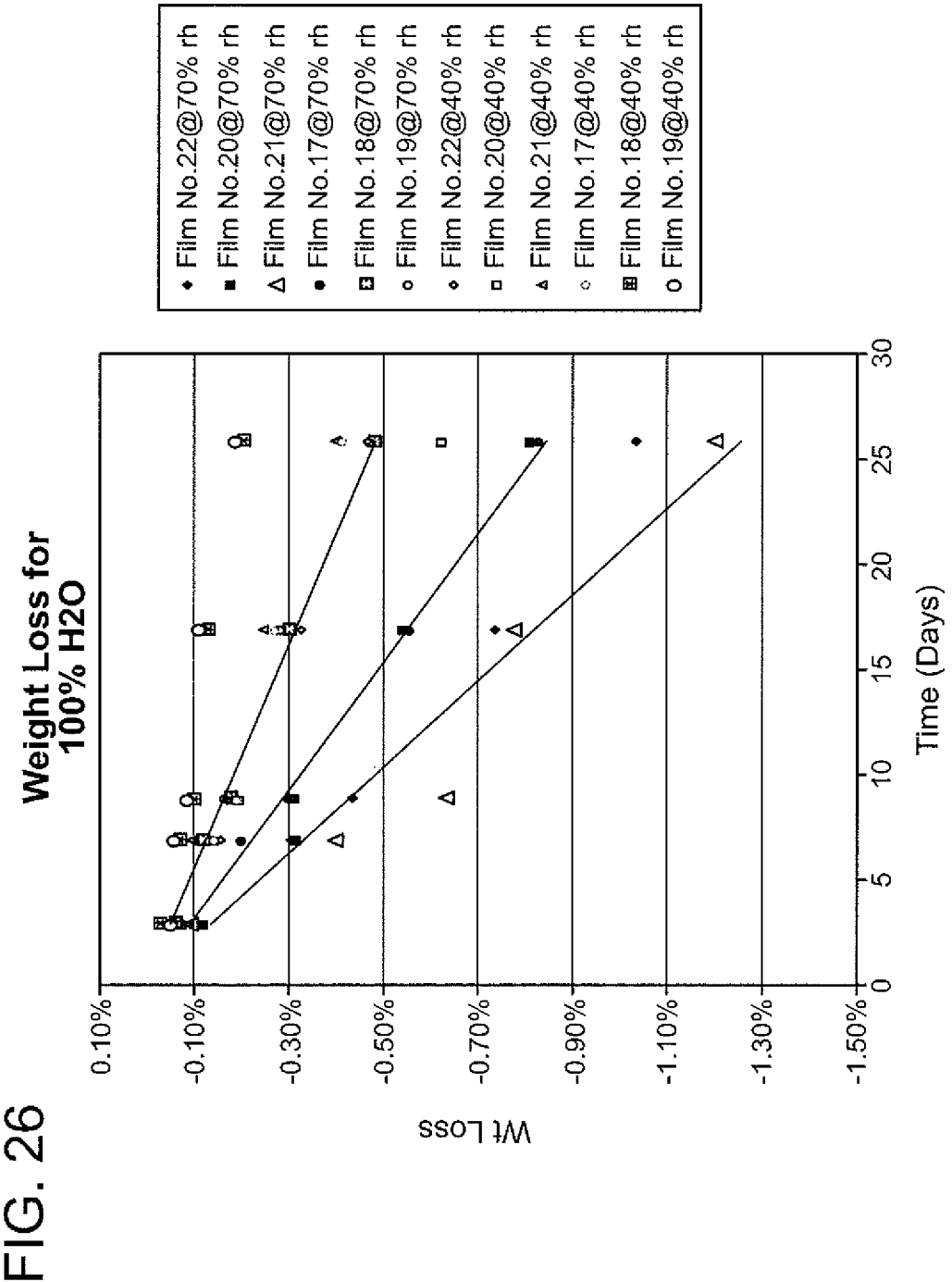
FIG. 26 is a graph of weight loss as a function of time for a 100% water in pouches made from Film Nos. 17-22, under two different relative humidity conditions.
Figure 27:
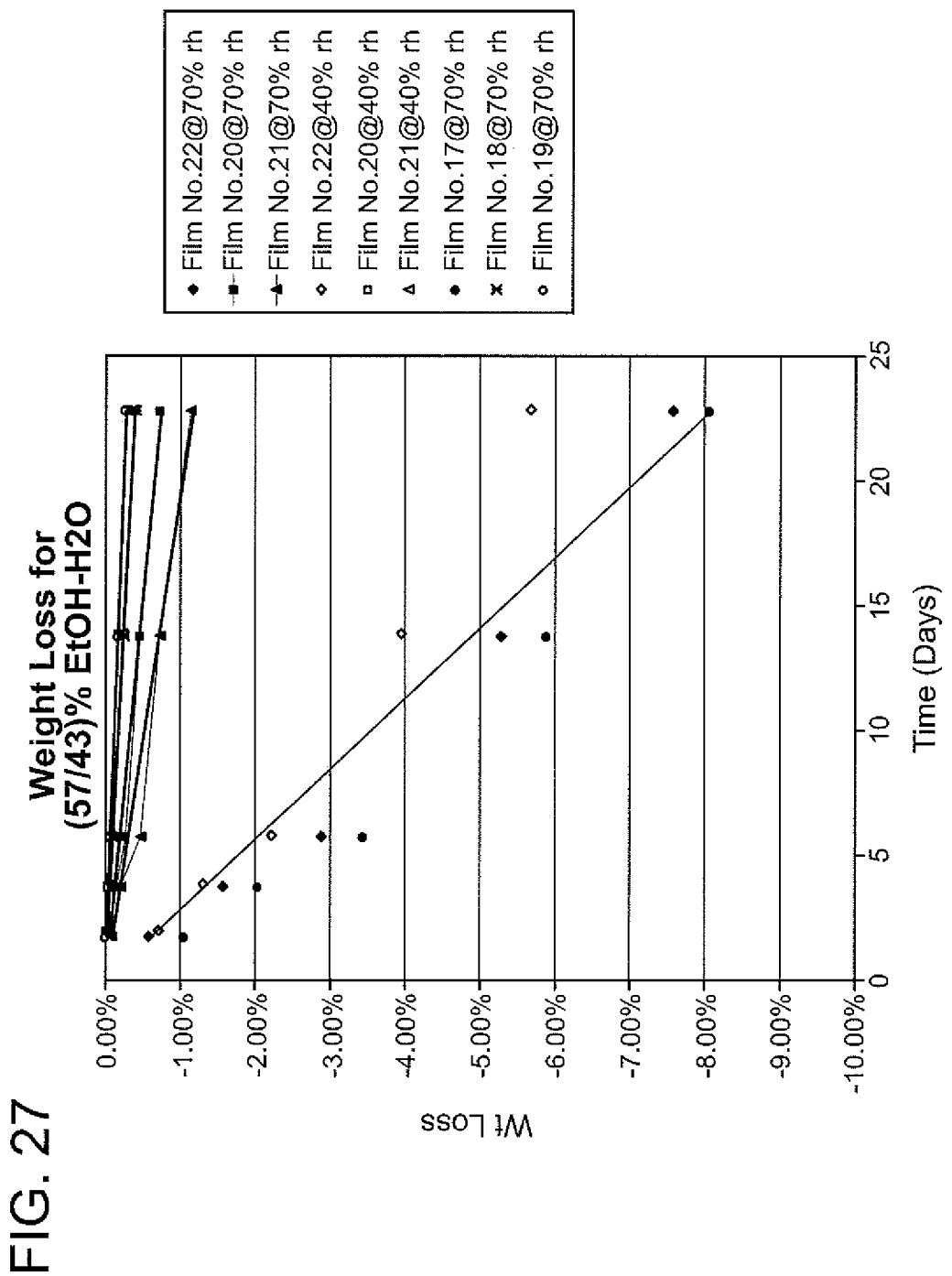
FIG. 27 is a graph of weight loss as a function of time for a 57%/43% ethanol/water solution in pouches made from Film Nos. 17-22, under two different relative humidity conditions.

The data in FIGS. 19-24 is rearranged in FIGS. 25-27. FIG. 25 is a plot of weight loss as a function of time for all of the samples containing the DPF501 liquid, and reveals that Film No. 17, which was a hot blown film, exhibited a higher rate of weight loss than Film No. 22, which was a solid state oriented (i.e., heat shrinkable) film. FIG. 25 also shows that all the films containing the cyclic olefin copolymer actually increased in weight as a function of time, rather than losing weight.

FIG. 26 is a plot of weight loss as a function of time for all of the pouches containing 100% water. FIG. 26 revealed that the greater the film thickness and the greater the amount of cyclic olefin copolymer, the lower the rate of water lost from the pouch.

FIG. 27 is a plot of weight loss as a function of time for all of the pouches containing the 60/40 blend of ethanol and water. As pointed out above, the films possessing 0% cyclic olefin copolymer exhibited the highest rate of weight loss, while the films exhibiting the lowest rate of weight loss contained the highest percentage of cyclic olefin copolymer.

Figure 28:
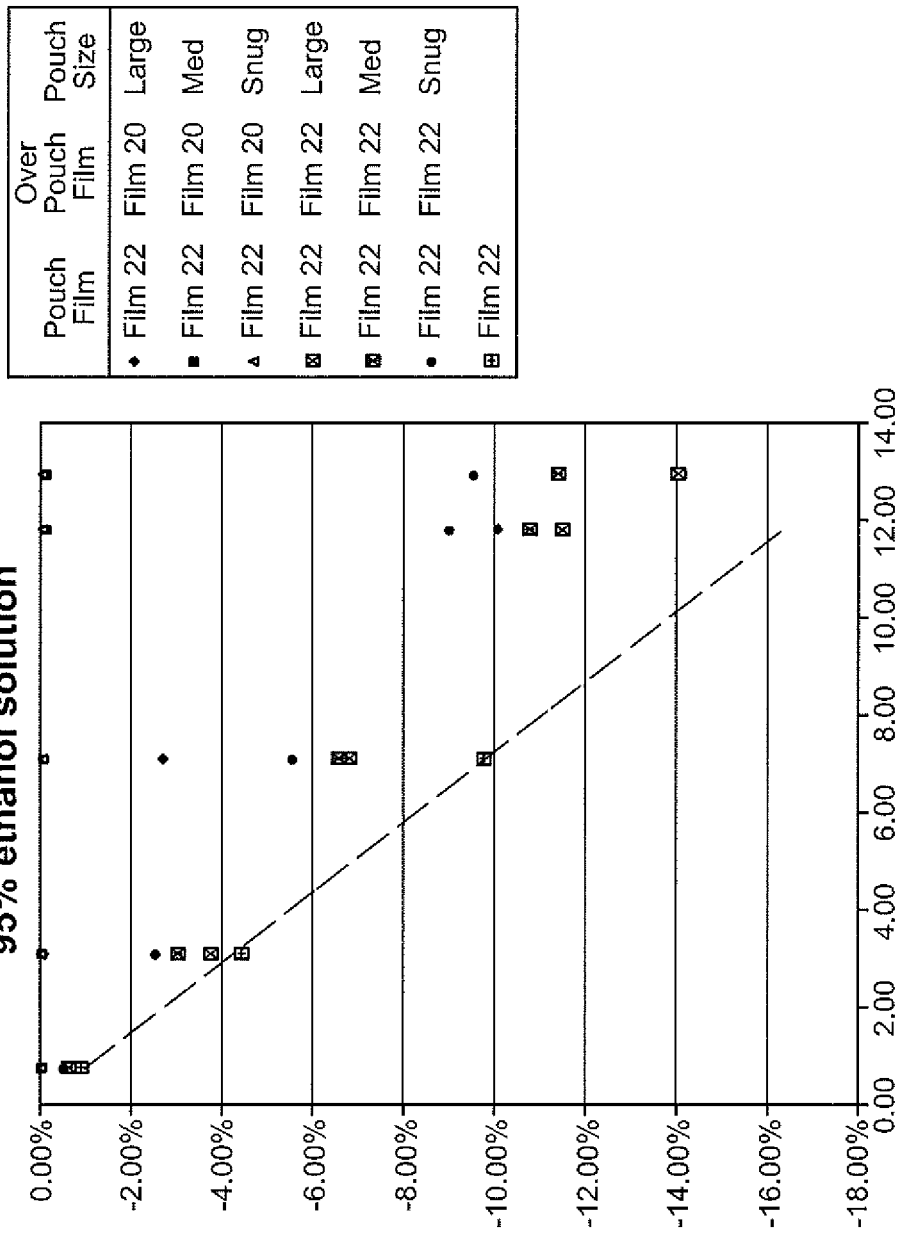
FIG. 28 is a graph of weight loss as a function of time for a 95% ethanol solution in pouches made from Film No. 22 overpouched with various sizes of overpouches made from Film 20 and Film 22.
Figure 29:
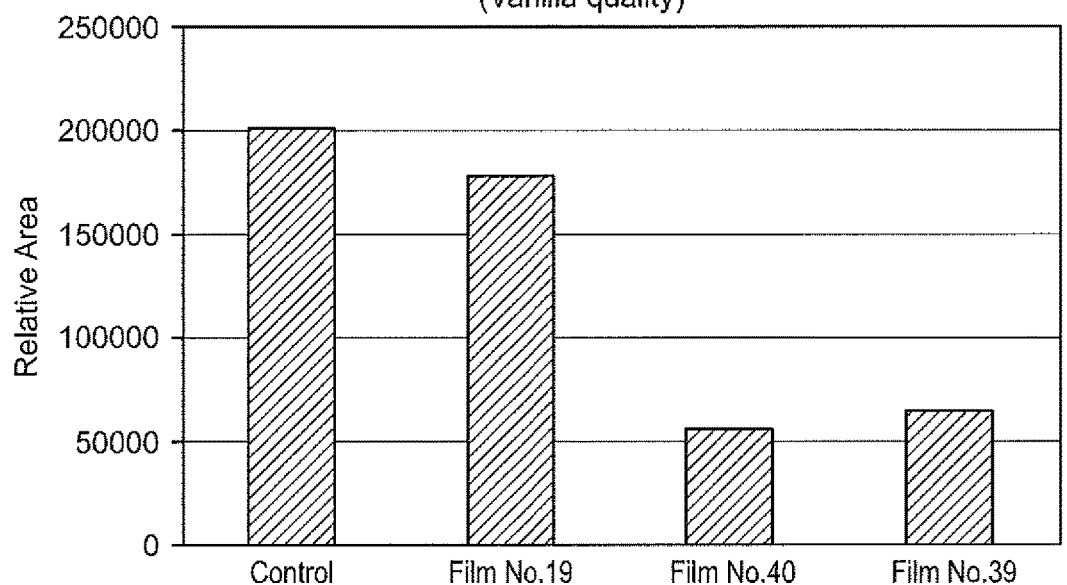
Figure 30:
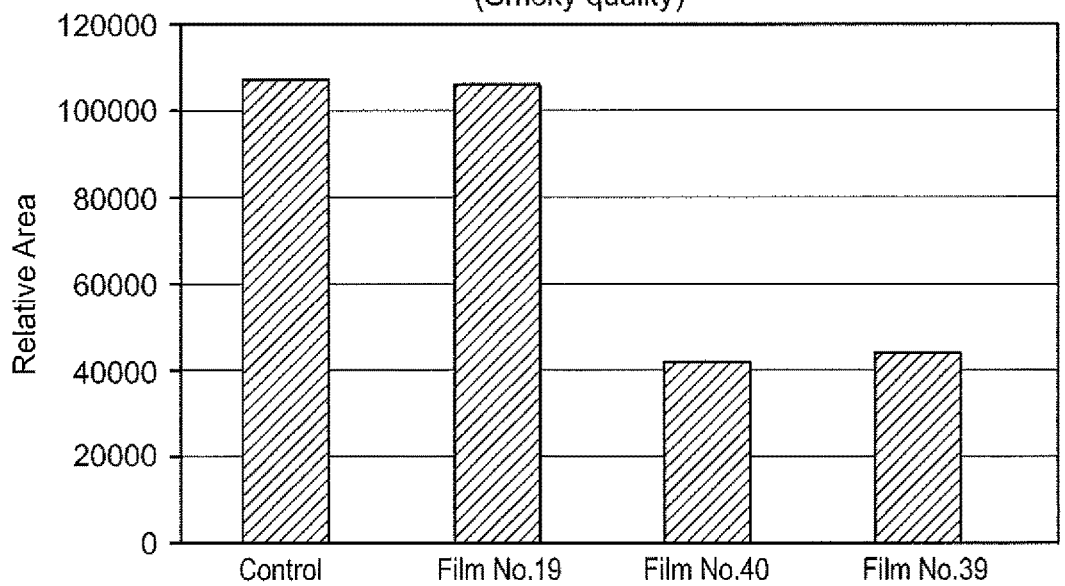
Figure 35:
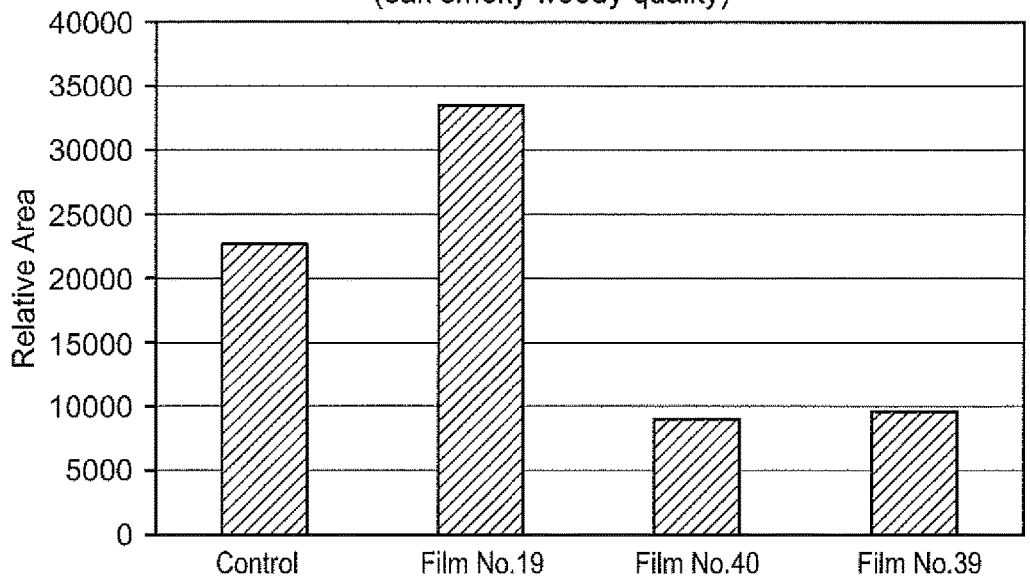
Figure 36:
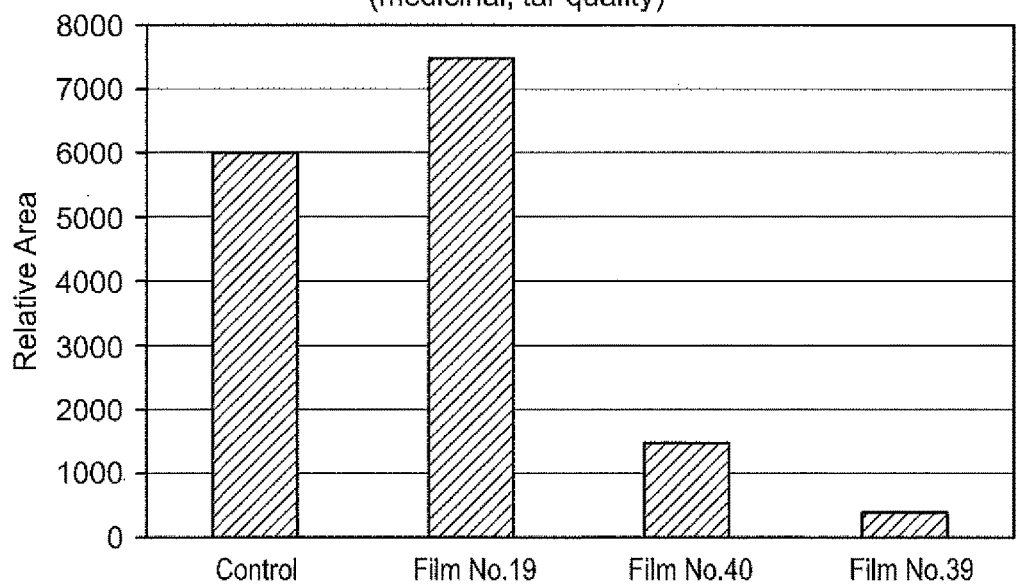
Figure 37:
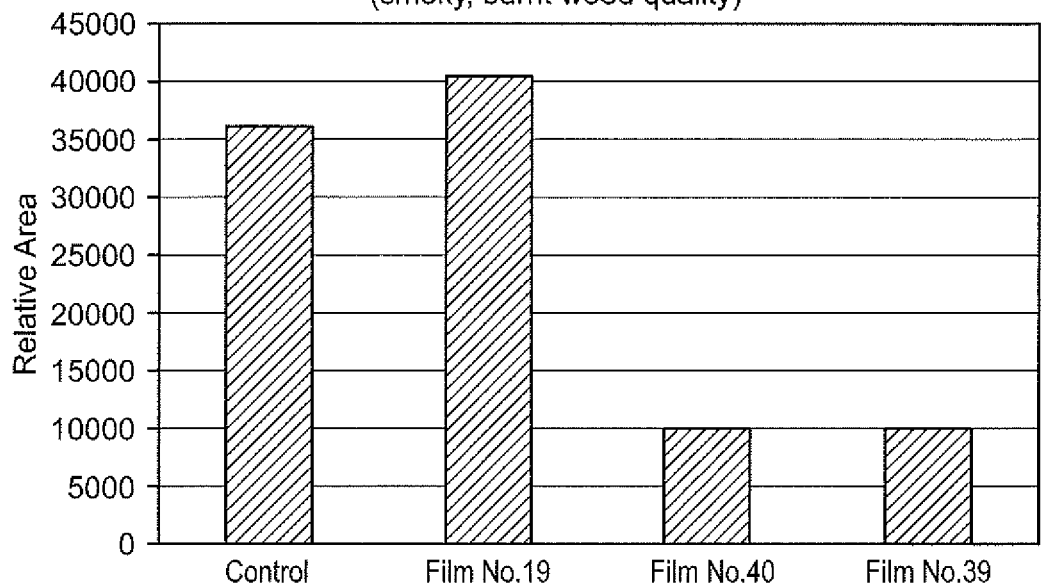
Figure 38:
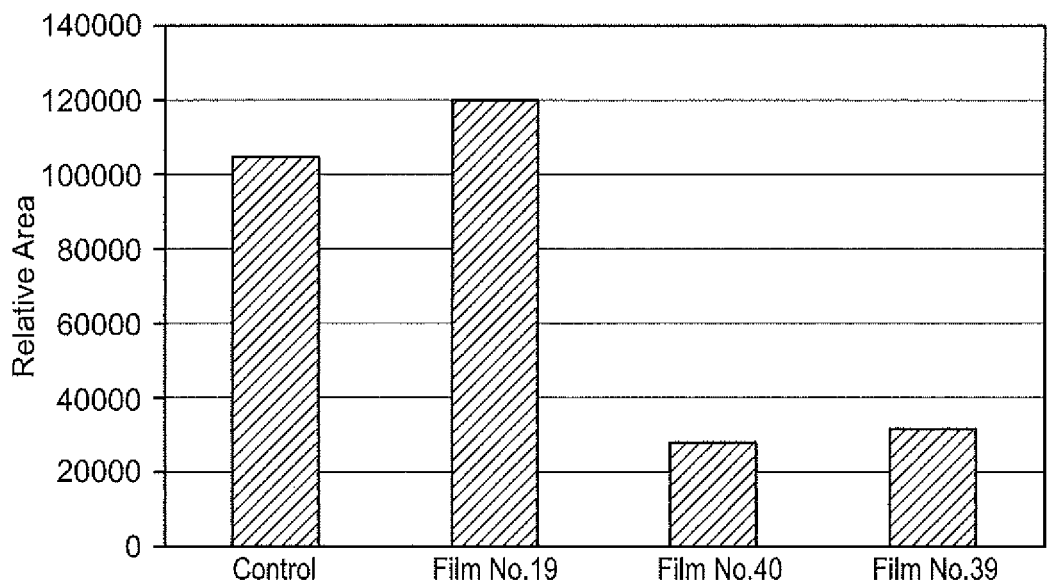
Figure 41:
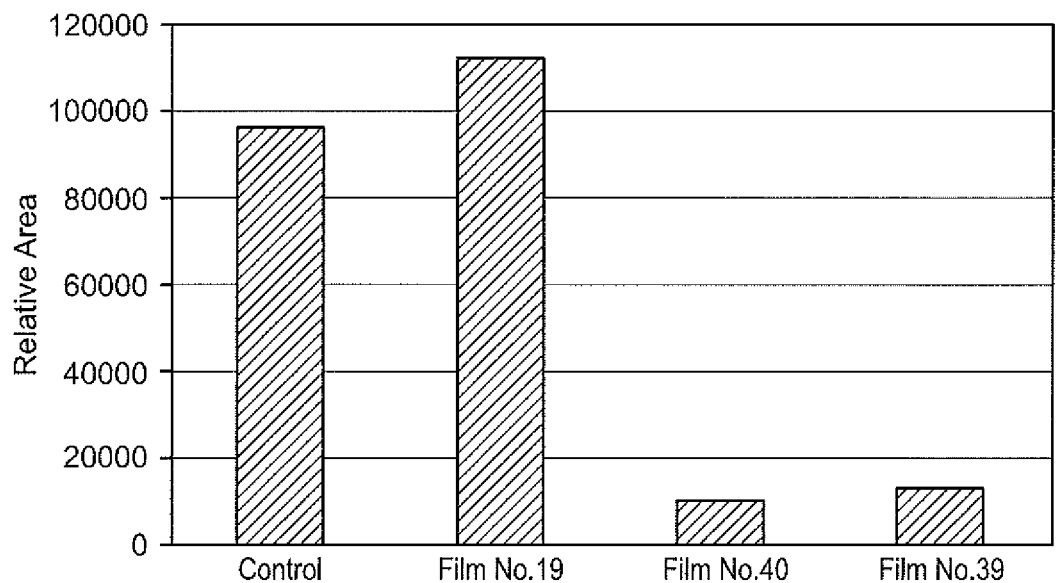
Figure 42:
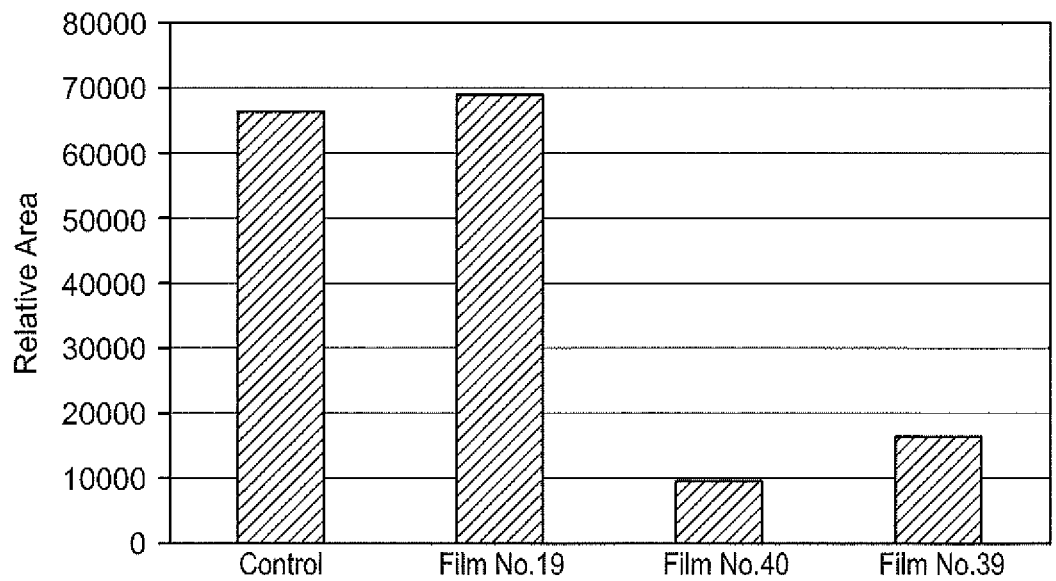

FIG. 28 is a plot of weight loss as a function of time for pouch-in-pouch arrangements wherein the innermost pouch was in each case made from Film No. 22 (containing 0% cyclic olefin copolymer) filled with DPF501 fluid. Three samples were overpouched with the same Film No. 22, containing 0% cyclic olefin copolymer. One pouch was large (folded dimensions 6 inches by 8 inches), one pouch was medium sized (folded dimensions 4.5 inches by 6.5 inches) and one pouch was small (i.e., "snug") with folded dimensions of 3.5 inches by 5 inches. The other half of the inner pouches were overpouched with Film No. 20, which contained 18.25% cyclic olefin copolymer, with the same three sizes of overpouches used, i.e., 6"×8", 4.5"×6.5", and 3.5"×5". As shown in FIG. 28, the pouch-in-pouch results utilizing the outer pouch containing 18.25% cyclic olefin copolymer exhibited lower rates of weight loss than the pouch-in-pouch results utilizing the outer pouch containing 0% cyclic olefin copolymer. Moreover, the snug pouch-in-pouch samples having snug outer pouches exhibited lower rate of weight loss than the corresponding samples having large outer pouches.

Distillate Aging in Small Casks Enveloped in Films 17-20 and 22-25

Film Numbers 17-25, set forth below, were prepared. Film Nos. 17, 18, 19 and 23 were hot blown (i.e., not heat shrinkable) films prepared in accordance with the process illustrated in FIG. 16, described above. Film Nos. 20, 21, 22, 24, and 25 were oriented (i.e., heat-shrinkable) films made in accordance with the process illustrated in FIG. 15, described above. Several large bags were made from each of Film Nos. 17-20 and 22-25. Inside each bag was placed an oak barrel (53 gallons) filled with a distillate liquid. For each of Film Nos. 17-20 and 22-25, three or four distillate-filled barrels were packaged in a bag, with the bagged barrels being placed on a rack for aging of the distillate.

| Film No. 17 | | |
|---|---|---|
| Layer 1 | Layer 2 | Layer 3 |
| 70% sscEAO-3<br>30% LDPE-2<br>(0.45 mil) | sscEAO-6<br>(2.10 mils) | 70% sscEAO-3<br>30% LDPE-2<br>(0.45 mil) |

| Film No. 18 | | |
|---|---|---|
| Layer 1 | Layer 2 | Layer 3 |
| 70% sscEAO-3<br>30% LDPE-2<br>(0.45 mil) | 50% sscEAO-6<br>50% ENB-3<br>(2.10 mils) | 70% sscEAO-3<br>30% LDPE-2<br>(0.45 mil) |

| Film No. 19 | | |
|---|---|---|
| Layer 1 | Layer 2 | Layer 3 |
| 70% sscEAO-3<br>30% LDPE-2<br>(0.45 mil) | 30% sscEAO-6<br>70% ENB-3<br>(2.10 mils) | 70% sscEAO-3<br>30% LDPE-2<br>(0.45 mil) |

| Film No. 20 | | | | |
|---|---|---|---|---|
| Layer 1 | Layer 2 | Layer 3 | Layer 4 | Layer 5 |
| 50% LLDPE-2<br>25% MDPE<br>17% EVA-1<br>8% PolyBlnd<br>(0.34 mil) | LLDPE-2<br>(0.34 mil) | 70% ENB-3<br>30% ssc<br>EAO-6<br>(0.64 mil) | LLDPE-2<br>(0.34 mil) | 50% LLDPE-2<br>25% MDPE<br>17% EVA-1<br>8% PolyBlnd<br>(0.34 mil) |

| Film No. 21 | | | | |
|---|---|---|---|---|
| Layer 1 | Layer 2 | Layer 3 | Layer 4 | Layer 5 |
| 50% LLDPE-2<br>25% MDPE<br>17% EVA-1<br>8% PolyBlnd<br>(0.34 mil) | LLDPE-2<br>(0.34 mil) | 50% ENB-3<br>50% ssc<br>EAO-6<br>(0.64 mil) | LLDPE-2<br>(0.34 mil) | 50% LLDPE-2<br>25% MDPE<br>17% EVA-1<br>8% PolyBlnd<br>(0.34 mil) |

Film No. 22

| Layer 1 | Layer 2 | Layer 3 | Layer 4 | Layer 5 |
|---|---|---|---|---|
| 50% LLDPE-2<br>25% MDPE<br>17% EVA-1<br>8% PolyBlnd<br>(0.34 mil) | LLDPE-2<br>(0.34 mil) | LLDPE-2<br>(0.64 mil) | LLDPE-2<br>(0.34 mil) | 50% LLDPE-2<br>25% MDPE<br>17% EVA-1<br>8% PolyBlnd<br>(0.34 mil) |

Film No. 23

| Layer 1 | Layer 2 | Layer 3 | Layer 4 | Layer 5 |
|---|---|---|---|---|
| sscEAO-5<br>(0.70 mil) | m-LLDPE-4<br>(0.30 mil) | EAO-BC<br>(1.0 mil) | m-LLDPE-4<br>(0.30 mil) | sscEAO-5<br>(0.70 mil) |

Film No. 24

| Layer 1 | Layer 2 | Layer 3 | Layer 4 | Layer 5 |
|---|---|---|---|---|
| 92% LLDPE-1<br>8% MB<br>(0.25 mil) | LLDPE-1<br>(0.50 mil) | 50% ENB-3<br>50% sscEAO-6<br>(1.00 mil) | LLDPE-1<br>(0.50 mil) | 92% LLDPE-1<br>8% MB<br>(0.25 mil) |

Film No. 25

| Layer 1 | Layer 2 | Layer 3 | Layer 4 | Layer 5 |
|---|---|---|---|---|
| 92% LLDPE-1<br>8% MB<br>(0.25 mil) | LLDPE-1<br>(0.50 mil) | 70% ENB-3<br>30% sscEAO-6<br>(1.00 mil) | LLDPE-1<br>(0.50 mil) | 92% LLDPE-1<br>8% MB<br>(0.25 mil) |

Film No. 26

| Layer 1 | Layer 2 | Layer 3 | Layer 4 | Layer 5 |
|---|---|---|---|---|
| 50% LLDPE-2<br>25% MDPE<br>17% EVA-1<br>8% PolyBlnd<br>(0.34 mil) | LLDPE-2<br>(0.34 mil) | ssc EAO-6<br>(0.64 mil) | LLDPE-2<br>(0.34 mil) | 50% LLDPE-2<br>25% MDPE<br>17% EVA-1<br>8% PolyBlnd<br>(0.34 mil) |

Film No. 27

| Layer 1 | Layer 2 | Layer 3 | Layer 4 | Layer 5 |
|---|---|---|---|---|
| 50% LLDPE-2<br>25% MDPE<br>17% EVA-1<br>8% PolyBlnd<br>(0.34 mil) | LLDPE-2<br>(0.34 mil) | 60% ENB-3<br>40% ssc EAO-6<br>(0.64 mil) | LLDPE-2<br>(0.34 mil) | 50% LLDPE-2<br>25% MDPE<br>17% EVA-1<br>8% PolyBlnd<br>(0.34 mil) |

Film No. 28

| Layer 1 | Layer 2 | Layer 3 | Layer 4 | Layer 5 |
|---|---|---|---|---|
| 92% LLDPE-1<br>8% MB<br>(0.25 mil) | LLDPE-1<br>(0.50 mil) | 60% ENB-3<br>40% sscEAO-6<br>(1.00 mil) | LLDPE-1<br>(0.50 mil) | 92% LLDPE-1<br>8% MB<br>(0.25 mil) |

Film No. 29

| Layer 1 | Layer 2 | Layer 3 |
|---|---|---|
| 70% sscEAO-3<br>30% LDPE-2<br>(0.45 mil) | 50% sscEAO-6<br>50% ENB-3<br>(2.10 mils) | 70% HDPE-4<br>30% LDPE-2<br>(0.45 mil) |

Film No. 30

| Layer 1 | Layer 2 | Layer 3 |
|---|---|---|
| 70% sscEAO-3<br>30% LDPE-2<br>(0.45 mil) | 40% sscEAO-6<br>60% ENB-3<br>(2.10 mils) | 70% sscEAO-3<br>30% LDPE-2<br>(0.45 mil) |

Film No. 31

| Layer 1 | Layer 2 | Layer 3 | Layer 4 | Layer 5 |
|---|---|---|---|---|
| 70% sscEAO-3<br>30% AB-4<br>(0.4 mil) | sscEAO-4<br>(0.6 mil) | 20% sscEAO-6<br>80% ENB-3<br>(1.0 mil) | sscEAO-4<br>(0.6 mil) | 70% sscEAO-3<br>30% AB-4<br>(0.4 mil) |

Film No. 32

| Layer 1 | Layer 2 | Layer 3 | Layer 4 | Layer 5 |
|---|---|---|---|---|
| sscEAO-5<br>(0.70 mil) | m-LLDPE-4<br>(0.30 mil) | 75% EAO-BC<br>25% ENB-3<br>(1.0 mil) | m-LLDPE-4<br>(0.30 mil) | sscEAO-5<br>(0.70 mil) |

Film No. 33

| Layer 1 | Layer 2 | Layer 3 | Layer 4 | Layer 5 |
|---|---|---|---|---|
| sscEAO-5<br>(0.70 mil) | m-LLDPE-4<br>(0.30 mil) | 50% EAO-BC<br>50% ENB-3<br>(1.0 mil) | m-LLDPE-4<br>(0.30 mil) | sscEAO-5<br>(0.70 mil) |

Film No. 34

| Layer 1 | Layer 2 | Layer 3 | Layer 4 | Layer 5 |
|---|---|---|---|---|
| 70% ssc EAO-4<br>30% SEB<br>(0.7 mil) | ssc EAO-4<br>(2.0 mils) | ENB-3<br>(0.5 mil) | ssc EAO-4<br>(2.0 mils) | ENB-4<br>(0.8 mil) |

Film No. 35

| Layer 1 | Layer 2 | Layer 3 | Layer 4 | Layer 5 |
|---|---|---|---|---|
| 70% ssc EAO-4<br>30% SEB<br>(0.7 mil) | ssc EAO-4<br>(2.0 mils) | ENB-4<br>(0.5 mil) | ssc EAO-4<br>(2.0 mils) | ENB-4<br>(0.8 mil) |

Various films above exhibited the following properties:

| Film No. | ETR (g/100μ/m²/day) | OTR (cc/m²/day) | MVTR (g/100in²/day) | Peak Load (Newtons) | Energy to Break (Joules) | Ratio OTR to ETR | Ratio OTR to MVTR |
|---|---|---|---|---|---|---|---|
| 15 | 0.0178 | 200 | 0.02 | — | — | 11,236 | 10,000 |
| 1 | 1.6 | 40 | 1.2 | 75 | 0.55 | 25 | 33.3 |
| 13 | 0.266 | 325 | 0.44 | 91 | 0.5 | 1222 | 739 |
| 12 | | 380 | 0.055 | 123 | 1.25 | — | 6,909 |
| 11 | 0.0375 | 390 | 0.064 | 130 | 1.5 | 10,400 | 6,094 |
| 14 | 0.9565 | 1275 | 0.18 | 117 | 2.67 | 1329 | 7,083 |
| 16 | 0.04845 | 128 | 0.35 | 136 | 1.8 | 2642 | 366 |
| 2 | — | 3300 | 0.65 | 200 | 1.8 | — | 5,077 |
| 34 | 0.373 | 1750 | 0.29 | 67 | 1.22 | 4692 | 6,034 |
| 35 | 5.69 | 2900 | 0.45 | 77 | 3.09 | 510 | 6,444 |

Additional films were prepared or obtained, as follows:

Film No. 36

| Layer 1 | Layer 2 | Layer 3 | Layer 4 | Layer 5 | Layer 6 | Layer 7 |
|---|---|---|---|---|---|---|
| PETG (0.28 mil) | CO-PET (0.28 mil) | CO-PET (0.28 mil) | CO-PET (0.08 mil) | 85% CO-PET 15% PA-MXD6 (0.28 mil) | CO-PET (0.27 mil) | CO-PET (0.09 mil) |

Film No. 37

| Layer 1 | Layer 2 | Layer 3 | Layer 4 | Layer 5 |
|---|---|---|---|---|
| 47% LLDPE-1 23.5% EVA1 23.5% MDPE 4% AF 2% WAX 4 (0.27 mil) | 67% m-EBC 33% LLDPE-2 (0.27 mils) | 90 EVOH-1 10 PA6/12 (0.13 mil) | 67% m-EBC 33% LLDPE-2 (0.27 mils) | 47% LLDPE-1 23.5% EVA1 23.5% MDPE 4% AF 2% WAX 4 (0.27 mil) |

Film No. 37 exhibited a modulus of 95,000 psi in each of the longitudinal direction and the transverse direction.

Film No. 38

| Layer 1 | Layer 2 | Layer 3 | Layer 4 | Layer 5 |
|---|---|---|---|---|
| 98% EVA-3 2% AB-5 (0.9 mil) | 70% EAO-6 30% ENB-3 (0.67 mils) | 70% EAO-6 30% ENB-3 (1.35 mil) | 70% EAO-6 30% ENB-3 (0.67 mils) | 98% EVA-3 2% AB-5 (0.9 mil) |

Film No. 39

Monolayer film made from 100% PVC

Film No. 40

This film was SP Class PPD Barrier Packaging Film obtained from Shield Pack Specialty Packaging. It had a total thickness of 3.9 mils and an OTR of less than 0.003 cc/100 in²/day and a WVTR of less than 0.003 g/100 in²/day. It was four layer structure having the following layer arrangement:

| polyethylene | Metal foil | Ionomer resin |
|---|---|---|

Film No. 41

| Layer 1 | Layer 2 | Layer 3 | Layer 4 | Layer 5 |
|---|---|---|---|---|
| 9-layer Laminate (see below) (2.75 mils) | 53.33% PUAdh-1 42.67% EtAcet 4% PUAdh-2 (0.18 mils) | BOPET (0.52 mil) | 53.33% PUAdh-1 42.67% EtAcet 4% PUAdh-2 (0.18 mils) | 5-layer Laminate (see below) (1.00 mil) |

In Film No. 41, BOPET was a biaxially oriented polyester film, coated with an acrylic bonder on one side. BOPET was obtained from Kureha. It had a thickness of 0.52 mil and a density of 1.4 g/cc.

| Layer 1 | Layer 2 | Layer 3 | Layer 4 | Layer 5 | Layer 6 | Layer 7 | Layer 8 | Layer 9 |
|---|---|---|---|---|---|---|---|---|
| 50% PEC 44% sscEAO-9 6% AB/S 0.64 mil | 60% MHD-1 40% MHD-2 0.17 mil | Ion-2 .14 mil | PA6-2 0.28 mil | mLLDPE-5 0.22 mil | PA6-2 .28 mil | PA6/66-2 0.18 mil | mLLDPE-5 0.39 mil | 50% PEC 44% sscEAO-9 6% AB/S 0.46 mil |

5-Layer Laminate in Film No. 41

| Layer 1 | Layer 2 | Layer 3 | Layer 4 | Layer 5 |
| --- | --- | --- | --- | --- |
| 50% PEC<br>49% sscEAO-9<br>1% AB/S<br>0.23 mil | mLLDPE-5<br>0.18 mil | PA6-2<br>0.25 mil | mLLDPE-5<br>0.18 mil | 50% PEC<br>49% sscEAO-9<br>1% AB/S<br>0.17 mil |

Film No. 42

| Layer 1 | Layer 2 | Layer 3 | Layer 4 |
| --- | --- | --- | --- |
| 50% ssc EAO-8<br>48% LDPE-2<br>2% S&AB-1<br>(0.14 mil) | 60% sscEAO-6<br>40 ENB-3<br>(0.42 mils) | LLDPE-1<br>(0.07 mil) | 70% sscEAO-5<br>28% LLDPE-3<br>2% PA-1<br>(0.27 mils) |

Angels' Share Weight Loss Test No. 1

Shrink-Wrapped and Vacuum-Packaged Barrels Vs Control

All barrels were pre-soaked with water for hydration for 2-10 days. When the barrel swelled and met the saturation point the barrel was considered to be ready to fill with 60% duplicating fluid 5 anhydrous (Lot No. 82013826198) and 40% water. The barrels were then wrapped with the films described below. The barrels were stored in an indoor cabinet and weighed weekly. This test was conducted following the protocol and procedures previously mentioned.

Four 1-liter control barrels were not wrapped. Four 1-liter barrels were shrink-wrapped in Film No. 36. Four 1-liter barrels were shrink-wrapped in Film No. 22. Four 1-liter barrels were vacuum-packaged in Film No. 19. Four 1-liter barrels were shrink-wrapped in Film No. 25. Two 3-liter barrels were shrink-wrapped in Film No. 25. Two 5-liter barrels were shrink-wrapped in Film No. 25. The shrink-wrapped and vacuum-packaged barrels were allowed to age for 45 days. The average percentage weight loss for each treatment was calculated.

Percent Weight Loss after 45 Days

| Sample Identity | Barrel Treatment | Barrel Volume (liters) | Total Average Weight Loss (%) |
| --- | --- | --- | --- |
| Control | Unwrapped | 1 | 9.92 |
| Film No 36 | Shrink-wrapped | 1 | 0.88 |
| Film No. 22 | Shrink-wrapped | 1 | 0.53 |
| Film No. 19 | Vacuum-packaged | 1 | 0.31 |
| Film No. 25 | Vacuum-packaged | 1 | 0.13 |
| Film No. 25 | Shrink-wrapped | 3 | 0.17 |
| Film No. 25 | Shrink-wrapped | 5 | 0.23 |

As is apparent from the data in the table above, the control barrel lost significantly more weight (angels' share) than all the treatment wrapped barrels. All of the treatment wrapped barrels had statistically similar angels' share reduction when stored over 45 days

Angels' Share Weight Loss Test No. 2

Shrink-Sleeve, Shrink-Bag, and Loose-Bag Packaged Barrels Vs Control

All barrels were pre-soaked, saturated, wrapped, and stored as in weight loss test No. 1, above. Test 2 consisted of 24 barrels: four 1-liter barrels shrink-sleeve packaged in Film No. 36; four 1-liter barrels shrink-sleeve packaged in Film No. 25; four 1-liter barrels shrink bag packaged in Film No. 25; four 1-liter barrels loose bag packaged in Film No. 25; two 3-liter unwrapped control barrels; two 5-liter unwrapped control barrels; four 1-liter unwrapped control barrels. This test was conducted for 42 days (1-liter barrels) and 45 days for (3 L or 5 L barrels), and the average percentage weight loss for each treatment was calculated.

Percent Weight Loss after 42 Days (1-Liter Barrels) 45 Days (3 & 5-Liter Barrels)

| Sample Identity | Barrel Treatment | Barrel Volume (liters) | Total Average Weight Loss (%) |
| --- | --- | --- | --- |
| Control | Unwrapped | 1 | 5.35 |
| Film No. 36 | Shrink-Sleeve | 1 | 6.32 |
| Film No. 25 | Shrink-sleeve | 1 | 7.12 |
| Film No. 25 | Shrink- bag | 1 | 0.02 |
| Film No. 25 | Loose-bag | 1 | 0.00 |
| Control | Unwrapped | 3 | 11.44 |
| Control | Unwrapped | 5 | 7.23 |

The barrels shrink bag packaged in Film No. 25 and loose-bag packaged in Film No. 25 had a significant reduction in angels' share compared with the control barrels. However, the barrels shrink-sleeve packaged in Film No. 36 and Film No. 25 did not have a significant reduction in angels' share compared with the control barrels.

Angels' Share Weight Loss Test No. 3

Pallet-Wrapped, 2"-Wrapped, and 6"-Wrapped Packaged Barrels Vs Control

All barrels were pre-soaked, saturated, wrapped, and stored as in weight loss test No. 1, above. Test 3 consisted of 20 barrels: four 1-liter unwrapped control barrels; four 1-liter barrels individually stretched wrapped with 6-inch film strips with barrels on pallet, using Film No. 25; four 1-liter barrels with barrels and pallet wrapped together as one package, using a bag made from Film No. 25; four 1-liter barrels individually wrapped with 2" wide film strips using Film No. 25 (but film having 0.75 mil total thickness, wrapped three times to obtain 2.25 mils total film thickness); four 1-liter barrels stretch wrapped with 2" strips of Film No. 25 (but at 1.1 mil total thickness). The test was conducted for 49 days and the average percentage weight loss for each treatment was calculated.

| Barrel Treatment | Barrel Volume (liters) | Total Average Weight Loss (%) |
| --- | --- | --- |
| Control (unwrapped) | 1 | 11.87 |
| Pallet | 1 (four barrels) | 11.31 |
| Film No. 25 (Pallet wrapped in bag) | 1 (four barrels) | 0.24 |

-continued

| Barrel Treatment | Barrel Volume (liters) | Total Average Weight Loss (%) |
|---|---|---|
| Film No. 25: 6" strips (Pallet) | 1 (four barrels) | 16.52 |
| A1 2" strips (0.75 mil) | 1 | 6.14 |
| 4C 2" strips (1.1 mil) | 1 | 5.18 |

Barrels wrapped in treatments A1 2" strips (0.75 mil), Film No. 25 pallet wrapped in bag and 4C 2" strips (1.1 mil) demonstrated significant reduction in "angel share" compared to the control barrels/control pallet. However, the barrels wrapped in Film No. 25 6" strips had a statistically significant increase in "angel share" compared to the controls. Film No. 25 pallet wrapped bag had the greatest reduction in "angel share" and it was statistically different from all other treatments.

Angels' Share Weight Loss Test No. 4

Pallet-Wrapped, 2"-Wrapped, and 6"-Wrapped Packaged Barrels vs Control

All barrels were pre-soaked, saturated, wrapped, and stored as in weight loss test No. 1, above. Barrel test 4 consisted of 24 barrels: Four 1 L barrels packaged in Film No. 19 (packaged in a bag); four 1 L barrels packaged in Film No. 41 1.1 mil (2" strips wrapped); four 1 L barrels packaged in Film No. 42 0.7 mil (2" strips wrapped); four 1 L barrels packaged in Film No. 42 1.1 mil (2" strips wrapped); one 3 L barrels packaged in Film No. 42 1.1 mil (3" strip wrapped); one 5 L barrel packaged in Film No. 42 1.1 mil (2" strip wrapped); four 1 L control barrels (not wrapped); one 3 L control barrel (not wrapped) and one 5 L barrel (not wrapped). All barrels had the ends of the barrel left open. The barrels were wrapped to achieve and approximate 2.2 mil thickness once wrapped. This test was conducted following the protocol and procedures previously mentioned. This test was conducted for 49 days and the average percentage weight loss for each treatment was calculated.

| Barrel Treatment | Barrel Volume (liters) | Normalized Weight Loss (%) |
|---|---|---|
| Film No. 19 (bag) | 1 | 0.00 |
| Film No. 41 2" strips (1.1 mil) | 1 | 6.08. |
| Film No. 42 2" strips (0.7 mil) | 1 | 12.08 |
| Film No. 42 2" strips (1.1 mil) | 1 | 7.51 |
| Film No. 42 3" strips (1.1 mil) | 3 | 3.5 |
| Film No. 42 3" strips (1.1 mil) | 5 | 1.94 |
| Control (unwrapped) | 1 | 7.60 |
| Control (unwrapped) | 3 | 7.64 |
| Control (unwrapped) | 5 | 5.40 |

Angels' Share Weight Loss Test No. 5

COC-Wrapped, Foil-Wrapped, Barrier-Film, PVC-Wrapped Packaged Barrels vs Control All barrels were pre-soaked, saturated, wrapped, and stored as in weight loss test No. 1, above. Barrel test 5 used virgin wheat whiskey in 10 barrels. Two barrels were packaged in Film No. 19, two barrels were packaged in foil based Film No. 40, two barrels were packaged in PVC Film No. 39, and two control barrels not wrapped were utilized. Weights were measured on day 0 and day 49. The test demonstrated the outcome when oxidation is unable to occur during maturation. Sensory testing was conducted on various samples.

| Barrel Treatment | Barrel Volume (liters) | Total Average Weight Loss (%) |
|---|---|---|
| Control (unwrapped) | 1 | 15.22 |
| NFX4672 (bag) | 1 | 0.11 |
| Film No. 40 (Foil) | 1 | 0.04 |
| Film No. 39 (PVC) | 1 | 1.54 |

Sensory Consumer Taste Panel Test No. 1

Three triangle tests were conducted in order to evaluate if a difference in color, aroma or taste exists between (i) grain neutral spirit (GNS) samples aged in control barrels (unwrapped), and (ii) GNS samples aged in barrels wrapped in Film No. 19, or (iii) GNS samples aged in barrels wrapped in Film No. 16, or (iv) GNS samples aged in barrels wrapped in Film No. 1.

The GNS was 190 proof (USP/NF grade) derived solely from corn, procured from Pharmco Products Inc. The GNS was proofed down to 60% using reverse osmosis treated $H_2O$ and used to fill 5 gallon new oak barrels.

Preference information was also requested for the samples in this triangle test, as well as the additional triangle tests disclosed below. However, the preference responses were incomplete and were deemed not to be statistically significant.

The barrels were 5-gallon new oak barrels charred on the inside. The samples were aged for 249 days. All barrels were aged in the same warehouse environment.

The barrels (control, and barrels aged while wrapped in Film Nos. 19, 17, and 1) were weighed prior to sampling. The barrels were agitated for three minutes each using a four wheel dolly. Barrels were vented and rotated at half the agitation time. All samples were collected using a commercially sterile method and all equipment was cleaned and sanitized prior to use.

Separate equipment was used for each sample to prevent cross contamination between samples. Samples were stored in glass jars with paraffin wrapped around the closure. Jars were placed in foil bags to prevent both oxygen and light from entering. 800 Milliliters of GNS was collected from each barrel: 100 milliliters for proof testing, 500 milliliters for sensory testing and 200 milliliters for analytical testing. Proof testing was conducted using a Mettler Toledo No. AD-1260 (China), with Alcodens Version 2.5 analytical program. The warehouse temperature was 50° F. during sampling. Analytical testing samples were stored in amber vials with paraffin wrapped around the closure.

The GNS samples submitted for analytical testing were analyzed to determine whether there was a difference in compounds developed during maturation between the four samples. The analytical data determined that all the compounds sought were present in each GNS sample. The GNS sample from the barrel wrapped in Film No. 1 had a higher concentration of guaiacol, conferaldehyde and syringol but otherwise contained a similar profile.

The consumer panel testing was carried out in accordance with the Standard Guide for Sensory Evaluation of Beverages Containing Alcohol ASTM E1879-00, which is hereby incorporated, in its entirety, by reference thereto. There were a total of 16 consumer panelists. The panel was a convenient sample of typical consumers. A presentation explaining general sensory practices was provided to the panel members prior to conducting Panel Test No. 1.

The hypothesis tested was whether consumer panelists were capable of detecting an organoleptic difference between the control sample (from an unwrapped barrel) versus the samples from barrels wrapped in Film No 19, Film No. 17, and Film No. 1. Panelists detected a difference between the Control sample and the sample from the barrel wrapped in Film No. 1. The major difference between the Control and the sample from the barrel wrapped in Film No 1 was color (the control sample was lighter), followed by differences in taste and aroma.

The hypothesis was rejected for the other two triangle tests as the panelists were not able to detect a difference between the control sample (from an unwrapped barrel) and the samples from barrels wrapped in Film No 19 and Film No. 17.

Due to high sample alcohol by volume (ABV) of greater than 57%, and concerns of overwhelming the panelist's senses, the samples were diluted 50/50 using demineralized water, in accordance with ASTM E1879-00, yielding an ABV of about 30%. All samples were stored at room temperature and color coded with tissue paper to prevent panelist bias during pouring. All samples were served in 1 ounce plastic vials with the clarity of glass. Panelists were provided with unsalted crackers and water to cleanse their palates. In addition, spit cups were provided.

Each triangle test had separate evaluation sheets with different sample codes. All codes were randomly selected and assigned to treatments. Each panelist was also assigned a number, and the serving order of the three triangle tests was randomized.

The panelists were asked to evaluate the color of the product first, followed by aroma and finally, taste. The panelists were then asked to select the different sample. Follow-up information was also requested: (a) how different was the sample: mark on a scale of weak to very strong; (b) why was the sample different (color, aroma, taste or all of the above); and (c) whether the panelists preferred the different sample (yes or no).

Triangle Test 1 consisted of three samples: two samples of GNS from the barrel wrapped in Film No. 19 (49 wt % cyclic olefin copolymer), and one control sample (barrel not wrapped). This test was conducted following the protocol and procedures above.

Triangle Test 2 consisted of three samples: two samples of GNS from the barrel wrapped in Film No. 17 (0% COC) and one control sample (barrel not wrapped). This test was conducted following the protocol and procedures above.

Triangle Test 3 consisted of three samples: two samples of GNS from the barrel wrapped in Film No. 1 (containing EVOH oxygen barrier layer) and one control sample (barrel not wrapped). This test was conducted following the protocol and procedures above.

The table below summarizes the parameters measured before collecting samples for analytical testing and sensory testing. Each barrel was weighed prior to aging (initial weight), and then after aging (final weight) but before agitation. Initial samples were then collected for proof measurements, where the temperature was monitored.

Angels' Share Weight Loss after about 10 Months of Aging in 5-Gallon Oak Barrels

| Barrel Treatment | Average Initial weight (kg) | Average Final weight (kg) | Average Weight Loss (kg) | Average Percentage Weight Loss |
|---|---|---|---|---|
| Control (unwrapped) | 30.91 | 25.60 | 1.32 | 4.26 |
| Film No. 19 | 31.08 | 31.00 | 0.08 | 0.26 |
| Film No. 17 | 30.79 | 30.53 | 0.26 | 0.84 |
| Film No. 1 | 30.95 | 30.59 | 0.36 | 1.16 |

Results of Triangle Test 1 (aged GNS from Control barrel vs. aged GNS from barrel surrounded by Film No. 19): the hypothesis was rejected because less than 10 panelists selected the correct different sample. Only seven panelists were able to detect a difference.

Results of Triangle Test 2 (aged GNS from Control barrel vs. aged GNS from barrel surrounded by Film No. 17): the hypothesis was rejected because less than 10 panelists selected the correct different sample. Only five panelists were able to detect a difference.

Results of Triangle Test 3 (aged GNS from Control barrel vs. aged GNS from barrel surrounded by Film No. 1): the hypothesis was accepted because at least 10 panelists selected the correct different sample. Eleven panelists were able to detect a difference.

Triangle Test Results from Consumer Panel Test No. 1

| Triangle Test No. | Treatment | Detectable difference of taste, aroma, and color compared to the control | Proof | Temperature (° F.) |
|---|---|---|---|---|
| — | Control (unwrapped) | N/A | 118.90 | 55.22 |
| 1 | Control vs. Film No. 19 | NO (7/16)* | 114.66 | 57.80 |
| 2 | Control vs. Film No. 17 | NO (5/16)* | 115.14 | 57.60 |
| 3 | Control vs. Film No. 37 | YES (11/16)* | 114.70 | 57.70 |

*For a statistically significant difference of p = 0.05 between samples and acceptance of the hypothesis, a minimum of 10 of the 16 panelist need to detect a difference by selecting the correct "different" sample (Meilgaard, Civille and Carr, Sensory Evaluation Techniques, 3$^{rd}$ Ed., CRC Press LLC, 1991, which is hereby incorporated in its entirety, by reference thereto; see particularly page 369)

pH for Each Barrel and Comments Provided from Analytical Lab

| Treatment | pH value | Comments |
|---|---|---|
| Control | 4.42 | Sweet, light in color |
| Barrel with Film No. 19 | 4.07 | Sweet, light in color |
| Barrel with Film No. 17 | 3.95 | Sweet, light in color |
| Barrel with Film No. 37 | 3.98 | Phenolic (bad smell), dark color |

The analytical lab tested for the presence of each of the following compounds: vanillin, eugenol, syringaldehyde, guaiacol, cresol isomers, coniferaldehyde, syringol, 4-methylguaiacol, and methyl octalactones. In attempting to correlate the sensory data with the analytical data the researchers searched for difference in the aged distillate from the barrel covered by Film No. 1, compared to the other three samples (Control, Film #19, and Film #17). The analytical data revealed that all the compounds were present in each of the four GNS samples. The GNS sample from the barrel covered by Film No. 1 had a higher concentration of guaiacol, coniferaldehyde and syringol, but otherwise contained a similar profile. Guaiacol is extracted from the lignin and produces in the oak from which the barrel is made, and provides a "smoky" aroma and flavor. If present in too high of a concentration it can lead to "off-flavors."

It is hypothesized that the panelists could differentiate the aged distillate from the barrel covered by Film No. 1 because of the color difference between this aged distillate and the Control. The sample from the barrel covered by Film No. 1 had a darker color than the Control. The color formation during maturation is linked to the content of gallic acid and ellagic acid (water soluble tannins) in the aged distillate. These compounds also lead to astringency in GNS sample. These compounds can later be oxidized to give fragrant compounds. The sample from the barrel covered by Film No. 1 had the greatest oxygen barrier (i.e., lowest oxygen transmission rate) relative to the Control, Film No. 19, and Film No. 17, and could have prevented these compounds from being oxidized. pH readings were in the range of 3.95 (barrel surrounded by Film No. 17) to 4.42 (Control).

The following conclusions were drawn from the results of Panel Test No. 1 and analytical analysis of the samples: (1) the aged GNS from the barrel covered by Film No. 1 had significantly different organoleptic properties compared to the control sample by sensory testing methods; (2) the consumer taste panelists were not able to detect a difference between the GNS aged in the Control (unwrapped barrel) and the GNS aged in the barrel surrounded by Film No. 19, or the difference between the GNS aged in the Control (unwrapped barrel) and the GNS aged in the barrel surrounded by Film No. 17; and (3) GNS aged in Film No. 1 had a darker color than the other samples and greater production of guaiacol, coniferaldehyde and syringol.

Sensory Consumer Taste Panel Test No. 2

Three triangle tests were conducted in order to evaluate if a difference in color, aroma or taste exists between grain neutral spirit (GNS) samples aged in new 5-gallon oak control barrels (unwrapped), versus (i) GNS samples aged in new 5-gallon oak barrels wrapped in Film No. 20, or versus (ii) GNS samples aged in barrels wrapped in Film No. 22, or versus (iii) GNS samples aged in new 5-gallon oak barrels wrapped in Film No. 16. The hypothesis tested was whether consumer panelists were capable of detecting an organoleptic difference between the control sample (from the unwrapped barrel) and the samples from barrels wrapped in Film No. 20, Film No. 22, or Film No. 16. A difference was detected by the panelists between all wrapped barrel samples and the control sample. The major difference was color (the control sample was lighter) followed by differences in taste and aroma.

The barrels were 5-gallon new oak barrels charred on the inside. The samples were aged for 249 days. All barrels were aged in the same warehouse environment. The four barrels (control, and barrels aged while wrapped in Film Nos. 20, 22, and 16) were weighed prior to sampling, and the barrels were agitated, vented, rotated, and samples collected as in Panel Test No. 1, above. The equipment used, sample storage, and taking of sample volumes was also performed as in Panel Test No. 1, above. The warehouse temperature was 58° F. during sampling. Analytical testing samples were stored in amber vials with paraffin wrapped around the closure.

The results of the analytical testing determined that all the compounds were present in each GNS sample. The Control GNS (unwrapped) always had the lowest concentration of each compound. The GNS packaged in Film #22 had the highest concentration of every compound except: hexose, guaiacol, syringol, and guaiacyl acetone.

The samples were tested for the presence of the following compounds: vanillin, eugenol, syringaldehyde, guaiacol, cresol isomers, coniferaldehyde, syringol, 4-methylguaiacol, s-hydroxymethyl furan, pyrogallol, sinapinaldehyde, methoxy eugenol, acetosyringone, benzoic acid, methyl homovanillate, syringic acid, 4-methyl guaiacol, 4-methyl syringol, 4-vinyl guaiacol, hexadecanoic acid, octadecanoic acid, ellagic acid, o-trimethyl ellagic acid, quercetin (2-(3, 4-dihydroxyphenyl)-3,5,7-trihydroxy-4H-chromen-4-one, furfural (2-furanaldehyde), whiskey lactone, 5-furancarboxaldehyde, guaiacyl acetone, hexose, beta-d-glucopyranose, and methyloctalactones. The samples were also tested for pH.

In attempting to correlate the sensory data with the analytical data the researchers searched for a difference in the packaged barrel samples compared to the control (unpackaged GNS). The analytical data determined that all the compounds were present in each GNS sample. The unpacked control GNS sample always had lowest concentration of each compound. GNS packaged in NFX 2131 had the highest concentration of every compound except: hexose, guaiacol, syringol, furfural, whiskey lactone, 5-furancarboxaldehyde and guaiacyl acetone (which it had similar amounts to the other treatments). GNS packaged in PPS was high in furfural, whiskey lactone and 5-furancarboxaldehyde. GNS packaged in NFX2133 was high in hexose, syringol and guaiacyl acetone.

It was hypothesized that the panelist could differentiate the packaged barrel samples from the control mainly due to color differences. The packaged samples had a darker color. The color formation during maturation is linked with the gallic acid and ellagic acid (water soluble tannins). The tannins decompose during charring/toasting or aging the process, oxygen penetrates into the whiskey through the barrel wood and oxidizes solutes. Whiskey tannins are generated by opening up the pyrogallol attached to glucose.

The Standard Guide for Sensory Evaluation of Beverages Containing Alcohol ASTM E1879-00 was used for conducting Panel Test No. 2. The panel was a convenient sample of typical consumers. A presentation explaining general sensory practices was provided to the panel members prior to conducting Panel Test No. 2.

Due to high sample alcohol by volume (ABV) of greater than 57%, and concerns of overwhelming the panelist's senses, the samples were diluted 50/50 using demineralized water, in accordance with ASTM E1879-00, yielding an ABV of about 30%. All samples were stored at room temperature and color coded with tissue paper to prevent panelist bias during pouring. All samples were served in 1 ounce plastic vials with the clarity of glass. Panelists were provided with unsalted crackers and water to cleanse their palates. In addition, spit cups were provided. Each triangle test had separate evaluation sheets with different sample codes. All codes were randomly selected and assigned to treatments. Each panelist was also assigned a number, and the serving order of the three triangle tests was randomized.

The panelists were asked to evaluate the color of the product first, followed by aroma and finally, taste. The panelists were then asked to select the different sample. Follow-up information was also requested: (a) how different was the sample: mark on a scale of weak to very strong; (b) why was the sample different (color, aroma, taste or all of the above); and (c) whether the panelists preferred the different sample (yes or no).

Triangle Test 1 consisted of three samples: two samples of aged GNS from barrel surrounded by Film No. 16 (100% polyphenylene sulfide film, loose, uncompromised wrap) and one aged GNS sample from the Control barrel (barrel not wrapped). This test was conducted following the protocol and procedures above.

Triangle Test 2 consisted of three samples: two samples of aged GNS from barrel surrounded by Film No. 22 (0% COC, tight with heat shrink wrap) and one control sample (barrel not wrapped). This test was conducted following the protocol and procedures above.

Triangle Test 3 consisted of three samples: two samples of GNS from the barrel wrapped in Film No. 20 (18% COC, tight with heat shrink wrap) and one control sample (barrel not wrapped). This test was conducted following the protocol and procedures above.

The table below summarizes the parameters measured before collecting samples for analytical testing and sensory testing. Each barrel was weighted prior to agitation and initial samples were, then collected for proof measurements, where the temperature was monitored.

Barrel Treatment Weights and Percentage "Angel Share" Lost

| Barrel Treatment | Average Initial weight (kg) | Average Final weight (kg) | Average Weight Loss (kg) | Average Percentage Weight Loss |
| --- | --- | --- | --- | --- |
| Control (unwrapped) | 30.91 | 25.60 | 1.32 | 4.26 |
| Film No. 20 | 30.58 | 30.46 | 0.12 | 0.39 |
| Film No. 22 | 30.95 | 30.78 | 0.17 | 0.54 |
| Film No. 16 | 31.22 | 30.83 | 0.39 | 1.27 |

The consumer taste panel had twenty six panelists. For a significant difference of $p = 0.05$ between samples and acceptance of the hypothesis, a minimum of 10 panelist need to detect a difference by selecting the correct "different" sample (Meilgaard, Civille and Carr, 1991)

Results of Triangle Test 1 (aged GNS from Control barrel vs. aged GNS from barrel surrounded by Film No. 20): The hypothesis can be accepted because more than 14 panelists selected the correct different sample. Twenty panelists were able to detect a difference. The major difference was color (the control sample was lighter) followed by differences in taste and aroma.

Results of Triangle Test 2 (aged GNS from Control barrel vs. aged GNS from barrel surrounded by Film No. 22): The hypothesis can be accepted because more than 14 panelists selected the correct different sample. Fifteen panelists were able to detect a difference. The major difference was color (the control sample was lighter) followed by differences in taste and aroma.

Results of Triangle Test 3 (aged GNS from Control barrel vs. aged GNS from barrel surrounded by Film No. 16): The hypothesis can be accepted because more than 14 panelists selected the correct different sample. Twenty-one panelists were able to detect a difference. The major difference was color (the control sample was lighter) followed by differences in taste and aroma.

Triangle Test Results from Consumer Panel Test No. 2

| Triangle Test No. | Treatment | Taste, Aroma, Color Difference vs Control |
| --- | --- | --- |
| — | Control Unwrapped | N/A |
| 1 | Control vs. Film No. 20 (18% COC) | YES (21/26)* |
| 2 | Control vs. Film No. 22 (0% COC) | YES (15/26)* |
| 3 | Control vs. Film No. 16 (100% PPS) | YES (20/26)* |

*Source Meilgaard, Civille and Carr (1991)

The following conclusions were drawn from the results of Panel Test No. 2: (1) the GNS packaged all had significantly different organoleptic properties compared to the control sample. (2) some of consumer taste panelists preferred the GNS stored in the packaging treatments barrels compared to the control samples (unwrapped barrels).

Sensory Consumer Taste Panel Test No. 3

As described above, it was surmised that the color difference between the control and the aged GNS Film Nos. 16, 20, and 22 enabled the panelists in Panel Test No. 2 to determine the identity of the Control sample (unwrapped), i.e., simply because the Control sample was lighter in color than the aged distillate samples taken from barrels covered by Film Nos. 16, 20, and 22. As a result, in Panel Test No. 3, a new panel repeated Panel Test No. 2. As there was enough aged distillate remaining after the completion of Panel Test No. 2, the aged distillate used in Panel Test No. 3 was taken from the glass containers used to supply and store the aged distillate used in Panel Test No. 2. However, in Panel Test No. 3 black cups were used to remove the color bias during the first three triangle tests which involved only aroma and taste, with the consumer panel conducting three further and separate triangle tests, using clear cups, to evaluate only the color.

Thus, six triangle tests were conducted. The samples taken for sensory testing in Panel Test No. 2 included enough extra GNS from each of the barrels to conduct the six triangle tests of Panel Test No. 3. Except for the use of the black cups in the first three triangle tests in Panel Test No. 3, the procedure used was the same as in Panel Test No. 2. The panel test was conducted as before, i.e., in accordance with The Standard Guide for Sensory Evaluation of Beverages Containing Alcohol ASTM E1879-00.

Triangle Test 1 consisted of three samples: two samples of aged GNS from barrel surrounded by Film No. 16 (100% polyphenylene sulfide film, loose, uncompromised wrap) and one aged GNS sample from the Control barrel (barrel not wrapped). This test was conducted in black cups evaluating only taste and smell. Otherwise, this test was conducted following the protocol and procedures above.

Triangle Test 2 consisted of three samples: two samples of aged GNS from barrel surrounded by Film No. 22 (0% COC, tight with heat shrink wrap) and one control sample (barrel not wrapped). This test was also conducted in black cups evaluating only taste and smell. Otherwise, this test was conducted following the protocol and procedures above.

Triangle Test 3 consisted of three samples: two samples of GNS from the barrel wrapped in Film No. 20 (18% COC, tight with heat shrink wrap) and one control sample (barrel not wrapped). This test was also conducted in black cups evaluating only taste and smell. Otherwise, this test was conducted following the protocol and procedures above.

Triangle Test 4 consisted of three samples: two samples of aged GNS from barrel surrounded by Film No. 16 (100% polyphenylene sulfide film, loose, uncompromised wrap) and one aged GNS sample from the Control barrel (barrel not wrapped). This test was conducted in clear cups, and the panelists were instructed to evaluate color only. Otherwise, this test was conducted following the protocol and procedures above.

Triangle Test 5 consisted of three samples: two samples of aged GNS from barrel surrounded by Film No. 22 (0% COC, tight with heat shrink wrap) and one control sample (barrel not wrapped). This test was conducted in clear cups, and the panelists were instructed to evaluate color only. Otherwise, this test was conducted following the protocol and procedures above.

Triangle Test 6 consisted of three samples: two samples of GNS from the barrel wrapped in Film No. 20 (18% COC, tight with heat shrink wrap) and one control sample (barrel not wrapped). This test was conducted in clear cups, and the panelists were instructed to evaluate color only. Otherwise, this test was conducted following the protocol and procedures above.

Results of Triangle Test 1 (aged GNS from Control barrel vs. aged GNS from barrel surrounded by Film No. 20): The hypothesis can be rejected because less than 10 panelists selected the correct different sample. In the black cups, only 6 of the 18 panelists were able to select the Control sample from the sample aged in the barrel surrounded by Film No. 20.

Results of Triangle Test 2 (aged GNS from Control barrel vs. aged GNS from barrel surrounded by Film No. 22): The hypothesis can be rejected because less than 10 panelists selected the correct different sample. In the black cups, only 9 of the 18 panelists were able to select the Control sample from the sample aged in the barrel surrounded by Film No. 22.

Results of Triangle Test 3 (aged GNS from Control barrel vs. aged GNS from barrel surrounded by Film No. 16): The hypothesis can be accepted because more than 10 panelists selected the correct different sample. Even with the black cups, 12 of the 18 panelists were able to select the Control sample from the sample aged in the barrel surrounded by Film No. 16.

Results of Triangle Test 4 (aged GNS from Control barrel vs. aged GNS from barrel surrounded by Film No. 20): The hypothesis can be accepted because 17 of the 18 panelists selected the correct different sample. In the clear glass cups, only 1 of the 18 panelists was unable, based on color alone, to select the Control sample from the sample aged in the barrel surrounded by Film No. 20.

Results of Triangle Test 5 (aged GNS from Control barrel vs. aged GNS from barrel surrounded by Film No. 22): The hypothesis can be accepted because 16 of the 18 panelists selected the correct different sample. In the clear glass cups, only 2 of the 18 panelists were unable, based on color alone, to select the Control sample from the sample aged in the barrel surrounded by Film No. 22.

Results of Triangle Test 6 (aged GNS from Control barrel vs. aged GNS from barrel surrounded by Film No. 16): The hypothesis can be accepted because 17 of the 18 panelists selected the correct different sample. In the clear glass cups, only 1 of the 18 panelists was unable to select the Control sample from the sample aged in the barrel surrounded by Film No. 16.

Below is a summary of the aroma and taste only Triangle Test Results from Consumer Panel Test No. 3.

Triangle Test Results for Aroma and Taste Only from Consumer Panel Test No. 3

| Triangle Test No. | Treatment | Detectable difference of taste and aroma compared to the control |
|---|---|---|
| — | Control Unwrapped | N/A |
| 1 | Control vs. Film No. 20 (18% COC) | NO (6/18)* |
| 2 | Control vs. Film No. 22 (0% COC) | NO (9/18)* |
| 3 | Control vs. Film No. 16 (100% PPS) | YES (12/18)* |

*The consumer taste panel had eighteen panelists. For a significant difference of p = 0.05 between samples and acceptance of the hypothesis a minimum of 10 panelist need to detect a difference by selecting the correct "different" sample (Meilgaard, Civille and Carr, 1991)

Below is a summary of the color only Triangle Test Results from Consumer Panel Test No. 3.

Triangle Test Results for Color Only from Consumer Panel Test No. 3

| Triangle Test No. | Treatment | Detectable difference of color compared to the control |
|---|---|---|
| — | Control Unwrapped | N/A |
| 4 | Control vs. Film No. 20 (18% COC) | YES (17/18)* |
| 5 | Control vs. Film No. 22 (0% COC) | YES (16/18)* |
| 6 | Control vs. Film No. 16 (100% PPS) | YES (17/18)* |

*The consumer taste panel had eighteen panelists. For a significant difference of p = 0.05 between samples and acceptance of the hypothesis a minimum of 10 panelist need to detect a difference by selecting the correct "different" sample (Meilgaard, Civille and Carr, 1991)

The results above from Panel Test No, 3 demonstrated that color was the attribute contributing to the significant difference observed in Panel Test No. 2. The second panel found only the PPS treatment was significantly different in taste/smell compared to the control. All samples were still significantly different from the control when color was evaluated. The data from Panel Test No. 3 demonstrates that both Film No. 20 and Film No. 22 exhibited aroma and taste character indistinguishable from the Control sample.

Sensory Consumer Taste Panel Test No. 4

Barrel Treatment Weights and Percentage "Angel Share" Loss in Barrels Used in Panel Test 5

| Barrel Treatment | Average Initial weight (g) | Average Final weight (g) | Average Weight Loss (g) | Average Percentage Weight Loss |
|---|---|---|---|---|
| Control (unwrapped) | 1700.27 | 1442.01 | 258.265 | 15.19 |
| Film No. 19 | 1718.02 | 1716.16 | 1.87 | 0.11 |
| Film No. 40 | 1835.69 | 1834.92 | 0.77 | 0.04 |
| Film No. 39 | 1801.05 | 1773.37 | 27.68 | 1.54 |

Three triangle tests were conducted in order to evaluate if a difference in color, aroma or taste exists between virgin wheat whiskey (VWW) samples aged in control barrels (unwrapped) and VWW aged in barrels wrapped in Film No. 19, Film No. 39 (PVC, as per the prior art) and Film No. 40 (Foil, as per the prior art). All of the 1-liter barrels had been aged about 2 months.

Four one-liter oak barrels were weighed prior to sampling in order to calculate angel share reduction. The barrels were then agitated for three minutes. All samples were collected in a commercially sterile method and all equipment was cleaned and sanitized prior to use. Separate equipment was used for each sample to prevent cross-contamination between samples. Samples were stored in glass jars with paraffin wrapped around the closure. Jars were then placed in foil bags to prevent both oxygen and light from entering. 800 Milliliters of aged VWW was collected from each barrel: 100 milliliters for proof testing, 500 milliliters for sensory testing, and 200 milliliters for analytical testing. Analytical testing samples were stored in amber vials with paraffin wrapped around the closure.

The GNS samples collected were also submitted to the analytical lab for identification testing to determine if a difference in compounds developed during maturation exists between the four samples. The analytical lab tested for presences of the following compounds; vanillin, eugenol, syringaldehyde, guaiacol, cresol isomers, coniferaldehyde, syringol, 4-methylguaiacol, s-hydroxymethyl furan, pyrogallol, sinapinaldehyde, methoxy eugenol, acetosyringone, benzoic acid, methyl homovanillate, syringic acid, 4-methyl guaiacol, 4-methyl syringol, 4-vinyl guaiacol, hexadecanoic acid, octadecanoic acid, ellagic acid, o-trimethyl ellagic acid, quercetin, furfural (2-furanaldehyde), whiskey lactone, 5-furancarboxaldehyde, guaiacyl acetone, hexose, beta-d-glucopyranose and methyloctalactones. The lab also tested the pH of the samples.

The Standard Guide for Sensory Evaluation of Beverages Containing Alcohol ASTM E1879-00 was used for the study execution. The panel was a convenient sample of typical consumers. A brief presentation explaining/teaching general sensory practices occurred prior to the study. Clear cups were used for the sensory testing, so the panelists could compare sample color differences.

Each triangle test had separate evaluation sheets with different sample codes. All codes were randomly selected and assigned to treatments. Each panelist was also assigned a number, and the serving order of the three triangles tests was randomized.

The panelists were asked to evaluate the color of the product first, followed by aroma and finally, taste, as in Panel Test No. 1. Panelists were also asked the same questions as described above in Panel Test No. 1. However, unlike Panel Test No. 1, the samples were not diluted down to an ABV of about 30 percent for the sensory studies. The samples had an ABV of at least at least 57 percent.

Triangle Test 1 consisted of three samples: two samples from the barrel wrapped in Film No. 19, and one Control sample (barrel not wrapped). This test was conducted following the protocol and procedures above.

Triangle Test 2 consisted of three samples: two samples from the barrel wrapped in Film No. 40 (Foil), and one Control sample (barrel not wrapped). This test was conducted following the protocol and procedures above.

Triangle Test 3 consisted of three samples: two samples from the barrel wrapped in Film No. 39 (PVC), and one Control sample (barrel not wrapped). This test was conducted following the protocol and procedures above.

The table below, provides a summary of all three triangle tests for Consumer Panel Test No. 4. As can be seen in the table below, the number of correct responses for the aroma and taste test results was not high enough to show that the panelists could determine differences between the Control sample (unwrapped) and the samples from barrels surrounded by Film Nos. 19, 40, and 39.

Triangle Test Results for Taste and Aroma from Consumer Panel Test No. 4

| Triangle Test No. | Treatment | Detectable difference of aroma and taste compared to the control |
| --- | --- | --- |
| — | Control Unwrapped | N/A |
| 1 | Control vs. Film No. 19 | NO (4/8)* |
| 2 | Control vs. Film No. 40 | NO (3/8)* |
| 3 | Control vs. Film No. 39 | NO (4/8)* |

However, it was apparent that the panelists were able to detect the difference in color of the control sample versus the samples from barrels surrounded by Film Nos. 19, 40, and 39.

| Triangle Test No. | Treatment | Detectable difference of color compared to the control |
| --- | --- | --- |
| — | Control Unwrapped | N/A |
| 4 | Control vs. Film No. 19 | YES (7/8)* |
| 5 | Control vs. Film No. 40 | YES (8/8)* |
| 6 | Control vs. Film No. 39 | YES (7/8)* |

*Source Meilgaard, Civille and Carr (1991)

The consumer taste panel had eight panelists. For a significant difference of p=0.05 between samples and acceptance of the hypothesis a minimum of 6 panelist need to detect a difference by selecting the correct "different" sample.

Sensory Consumer Taste Panel Test No. 5

It was surmised that in Panel Test No. 4, the alcohol concentration in each of the samples was so high (ABV of at least 57%) the panelists' senses were overwhelmed by the ABV of the samples, and thereby could not distinguish one sample from another. Accordingly, another panel was assembled and the aged VWW samples were tested again. As there was enough VWW remaining after the completion of Panel Test No. 4, the aged distillate used in Panel Test No. 5 was taken from the glass containers used to supply and store the aged distillate used in Panel Test No. 4. However, due to the high sample ABV of at least 57% and the concerns of overwhelming the panelist's senses as in Panel Test No. 4, the samples were diluted 50/50 using demineralized water, in accordance with ASTM E1879-00, to achieve an ABV of about 30%.

Also, due to concerns that panelists could utilize color difference to identify the correct Control sample, black cups were utilized for the aroma and taste test so that color was eliminated as a basis for panelists' selection of the correct Control sample. Both the aroma and flavor triangle tests of Panel Test No. 5, and color triangle tests the Panel Test No. 5, were conducted in accordance with ASTM E1879-00.

Panel Test No. 5 included a total of six triangle tests. In triangle tests 1-3, samples were served in black cups to remove panelist bias for color, and the panelists were only allowed to evaluate taste and smell. In triangle tests 4-6, the panelists evaluated color only, and the samples were served in clear cups.

All samples were stored at room temperature and color coded with tissue paper to prevent panelist bias during pouring. All samples were served in 1 oz plastic vials. Panelists were provided with unsalted crackers and water to cleanse their palates, and spit cups were provided.

The table below, summarizes the parameters measured before collecting samples for analytical testing and sensory testing. Each barrel was weighed prior to agitation and initial samples were then collected for proof measurements, where the temperature was monitored.

Triangle Test 1 consisted of three samples: two samples from the barrel wrapped in Film No. 19, and one control sample (barrel not wrapped). This test was conducted in black cups with panelists evaluating only taste and smell.

Triangle Test 2 consisted of three samples: two samples from the barrel wrapped in Film No. 40 (Foil) and one control sample (barrel not wrapped). This test was conducted in black cups evaluating only taste and smell.

Triangle Test 3 consisted of three samples: two samples from the barrel wrapped in Film No. 39 (PVC) and one control sample (barrel not wrapped). This test was conducted in black cups evaluating only taste and smell.

The table below, provides a summary of the results of Aroma and Taste Triangle Tests 1-3 in Panel Test No. 5.

Triangle Test Results for Aroma and Taste from Consumer Panel Test No. 5

| Triangle Test No. | Treatment | Detectable difference of aroma and taste compared to the control |
|---|---|---|
| — | Control Unwrapped | N/A |
| 1 | Control vs. Film No. 19 | NO (7/18)* |
| 2 | Control vs. Film No. 40 | YES (10/18)* |
| 3 | Control vs. Film No. 39 | YES (10/18)* |

The consumer test panel had 18 panelists. For a significant difference of p=0.05 between samples and acceptance of the hypothesis a minimum of 10 panelists need to detect a difference by selecting the correct different sample (Miilgaard, Civille and Carr, 1991). In Triangle Test 1, the hypothesis can be rejected because less than 10 panelists selected the correct different sample. In Triangle Test 2, the hypothesis can be accepted because 10 panelists selected the correct different sample. In Triangle Test 3, the hypothesis can be accepted because 10 panelists selected the correct different sample.

Turning next to the Triangle Tests directed to distinguishing samples based on color alone, Triangle Test 4 consisted of three samples: two samples from the barrel wrapped in Film No. 19 and one control sample (barrel not wrapped). This test was conducted in clear cups evaluating only color. Triangle Test 5 consisted of three samples: two samples from the barrel wrapped in foil and one control sample (barrel not wrapped). This test was conducted in clear cups evaluating only color. Triangle Test 6 consisted of three samples: two samples from the barrel wrapped in PVC and one control sample (barrel not wrapped). This test was conducted in clear cups evaluating only color.

The table below, provides a summary of the results of Triangle Tests 4-6 in Panel Test No. 5.

Triangle Test Results for Color Only from Consumer Panel Test No. 5

| Triangle Test No. | Treatment | Detectable difference of color compared to the control |
|---|---|---|
| — | Control Unwrapped | N/A |
| 4 | Control vs. Film No. 19 | NO (5/18)* |
| 5 | Control vs. Film No. 40 | YES (18/18)* |
| 6 | Control vs. Film No. 39 | YES (17/18)* |

For a significant difference of p = 0.05 between samples and acceptance of the hypothesis, a minimum of 10 panelists need to detect a difference by selecting the correct "different" sample (Meilgaard, Civille and Carr, 1991)

In Triangle Test 4, the hypothesis can be rejected because less than 10 panelists selected the correct different sample (Control). In Triangle Test 5, the hypothesis can be accepted because more than 10 panelists selected the correct different sample. Eighteen panelists were able to detect a difference by identifying the different sample (Control). In Triangle Test 6, the hypothesis can be accepted because more than 10 panelists selected the correct different sample. Seventeen panelists were able to detect a difference by identifying the different sample (Control).

Comparing the results from Panel Tests 4 and 5 demonstrates that the panelists' senses were overwhelmed by the high ABV of the samples tested in Panel Test 4. The panelists could not distinguish the samples in Panel Test 4 but could distinguish them in Panel Test 5, in which the aged VWW was diluted 50% with water before being consumed by the panelists.

The results from the Panel Test 5 tests 1-3 established that the Foil based film of the prior art and the PVC based film of the prior art result in aroma and taste that is distinguishable from the Control, whereas the working example is not distinguishable from the Control with respect to aroma and taste. Furthermore, the results from Panel Tests 4-6 established that the barrel surrounded by the Foil based film of the prior art and the barrel surrounded by the PVC film of the prior art result in color differences distinguishable from the Control, whereas the working example produces color which is not distinguishable from the control. Moreover, with respect to the barrel surrounded by Film No. 19, panelists were unable to detect a significant difference between the working example and the Control with respect to color, aroma, and taste.

The table below is a compilation of the results angel share weight loss tests and the sensory panel tests set forth above. Also provided are physical properties for the films used in the tests, including various transmission rates, impact strength, and elongation to break.

The sensory panel tests results show that the alcoholic beverages aged in barrels surrounded by Film Nos. 19, 20, and 22 resulted in an aged product having an aroma and flavor indistinguishable from the control. The alcoholic beverage aged in Film No. 19 was the only aged alcoholic beverage indistinguishable from the control with respect to aroma, flavor, and color.

Various comparative films included Film No. 16, Film No. 37, Film No. 39, and Film No. 40, each of which was used to produce an aged alcoholic beverage that the sensory panel was able to distinguish from the control.

Although Film Nos. 18, 24, 25, 34, and 38 were not subjected to the sensory panel test, the permeabilities and presence of ethylene/norbornene were in common with Film No's 19 and 20, and would make Film Nos. 18, 24, 25, 34, and 38 likely to produce sensory panel result similar to the sensory panel results for Film Nos. 19 and 20.

Film No. 16, although having the requisite permeability combination, produced an off flavor component DEHP as shown in the pyrolysis-GCMS testing reported below.

Permeabilities, Peak Load, Elongation to Break, Angels' Share, and Sensory Data for Various Films

| Film No. & Film Thickness (mils) | wt % COC | Permeabilities | | | Peak Load (Newtons) | Elongation to Break (Joules) | Angel Share Loss (wt %) | | Sensory Test | |
|---|---|---|---|---|---|---|---|---|---|---|
| | | Ethanol Transmission Rate (ETR) (Mocon) | Oxygen Transmission Rate (OTR) | Moisture Vapor Transmission Rate (MVTR) | | | 5 Gallon Barrel* (gns aged 398 days) | 1 Liter Barrel Test 1 | Aroma and Taste Difference to Control | Color Difference to Control |
| Control (Unwrapped Barrel) | — | — | — | — | — | — | 6.6 | 10.0 | — | — |
| #16 6 mils | 0 | 0.032 g/m²/day | 21.2 cc/m²/day | 0.91 g/m²/day | — | — | 2.8 | — | Yes | Yes |
| #18: 3 mils | 35 | — | 264 cc/m²/day | 0.663 g/m²/day | 177 | 2.15 | 1.7 | — | — | — |
| #19: 3 mils (working) | 49 | 0.217 g/m²/day | 209 cc/m²/day | 0.54 g/m²/day | 180 | 2.07 | 0.3 | 0.22 @ 49 days aging | No | No |
| #20: 2.01 mils (working) | 18 | — | — | — | — | — | 0.7 | — | No | Yes (lighter) |
| #22: 2.01 mils (working) | 0 | 18.3 g/m²/day | 265 cc/m²/day | 0.5 g/m²/day | 286 | 4.02 | 1.2 | 0.53 | No | Yes (lighter) |
| #24: 2.5 mils (Working) | 20 | 0.41 g/m²/day | 250 cc/m²/day | 0.66 g/m²/day | 175 | 2.18 | — | — | — | — |
| #25: 2.5 mils (working) | 28 | 0.32 g/m²/day | 262 cc/m²/day | 0.71 g/m²/day | 167 | 1.77 | — | 0.13 | — | — |
| #34: 6 mils | 21.7 | 0.25 g/m²/day | 292 cc/m²/day | 0.19 g/m²/day | — | — | — | — | — | — |
| #36: 1.56 mils (comparative) | 0 | 0.22 g/m²/day | 32.1 cc/m²/day | 10.6 g/m²/day | 158 | 0.69 | — | 0.88 | — | — |
| #37: 1.2 mil (comparative) | 0 | 8.3 g/m²/day | 33 cc/m²/day | 24.7 g/m²/day | 75 | 0.55 | 2.3 | — | Yes | — |
| #38: 4.5 mils | 18 | 0.84 g/m²/day | 283 cc/m²/day | 0.62 g/m²/day | — | — | — | — | — | — |
| #39: 2.5 mil (comparative) | 0 | 8.41 g/m²/day | 230 cc/m²/day | 1.36 g/m²/day | — | — | — | 1.54 @ 49 days Aging | Yes | Yes |
| #40: 4.5 mils Coated Metal Foil (comparative) | 0 | <0.1 | <0.1 | 0.1 | — | — | — | 0.04 @ 49 days aging | Yes | Yes |

TDU-Pyrolysis GCMS Testing to Identify Volatiles and Semi-Volatiles Generated During Whisky Maturation Four 1-liter wooden oak barrels were filled with a virgin wheat whiskey (VWW) distillation product, and aged for two months at ambient conditions. The first barrel was not wrapped with film and was the Control barrel. The second barrel was surrounded by Film No. 19. The third barrel was surrounded by Film No. 40. The fourth barrel was surrounded by Film No. 39.

After the two-month aging period, samples were taken from each of the four barrels and placed in 4 ounce amber bottles. Analysis of the samples in the bottles was carried out using an Agilent 6890N Gas Chromatograph (GC) equipped with a 5975C Mass Selective Detector (MSD) and a GERSTEL Cooled Injection System (CIS 4) which was a programmed temperature vaporization (PTV) type inlet with liquid nitrogen cooling ($LN_2$). Sample introduction was automated using a GERSTEL MultiPurpose Sampler (MPS) equipped with a GERSTEL Thermal Desorption Unit (TDU) containing the pyrolysis insert, GERSTEL PYRO. The TDU-PYRO was coupled directly to the CIS 4 inlet.

The objective was to carry out analytical testing for the purpose of determining how different films surrounding the barrel during aging affected the composition of the aged distillate product inside the barrels surrounded by Film No. 19 (working example), Film No. 39 (comparative example in accordance with prior art), and Film No. 40 (comparative example in accordance with prior art) versus the aged distillate from a Control barrel having no film around it.

More particularly, the aged distillate in each barrel was tested for the amount of specific compounds, including vanillin, guaiacol, syringaldehyde, syringol, eugenol, isoeugenol, cis-β-methyl-γ-octalactone, o-cresol, 2-methoxy-4-methylphenol, 4-methylsyringol, 4-ethylguaiacol, 4-vinylguaiacol, vanillyl methyl ketone, methoxyeugenol, sinapaldehyde, and furfural. These compounds are known to impart desirable aroma, flavor, and color characteristics to the distillate as it ages. These compounds are either extracted from the wooden of the barrel or are reaction products of extracts from the wooden making up the barrel. In addition, the third objective was carried out for di(2-ethylhexyl)phthalate ("DEHP"), which is an unfavorable aroma.

Twenty microliters of each of the aged whiskey samples were pipetted separately into short, quartz test-tube shaped pyrolysis vials with slits using a manual microliter syringe. The tubes were secured with glass wool, connected to pyrolysis adapters and placed into a 98 position pyrolysis tray in the MPS. The whiskey samples were thermally desorbed at 300° C. to remove the volatile and semi-volatile compounds. Following thermal desorption, the samples were pyrolyzed at 450° C. to get the maximum amount of information from each sample.

The analytical conditions were as follows:

| | |
|---|---|
| Pyrolysis: | 450° C.; Lead Time: 0.10 min; Follow up Time: 1.0 min; Initial Time: 0.5 min |
| TDU: | Splitless; 40° C. (0.2 min.); 720° C./min to 300° C. (3 min) |
| PTV: | Quartz liner; Solvent vent (100 mL/min); 40° C. (0.05 min.); 10° C./s to 300° C. (10 min) |
| Column: | 30 m HP-5MS (Agilent); $d_i$ = 0.25 mm; $d_f$ = 0.25 µm |
| Pneumatics: | He, constant flow @ 1.5 milliliters/min |
| Oven: | 35° C. (3 min); 10° C./min to 315° C. (10 min) |
| MSD: | EI mode; full scan; 35-650 amu |

FIGS. 29-45 provide the results of the above GC/MS analytical testing for, respectively: vanillin, guaiacol, syringaldehyde, syringol, eugenol, isoeugenol, cis-β-methyl-γ-octalactone, o-cresol, 2-methoxy-4-methylphenol, 4-methylsyringol, 4-ethylguaiacol, 4-vinylguaiacol, vanillyl methyl ketone, methoxyeugenol, sinapaldehyde, furfural, and di(2-ethylhexyl)phthalate ("DEHP") in the barrels surrounded by Film Nos. 19, 39, and 40, as well as for the control barrel. Film No. 19 was a preferred film having three layers, with the core layer made from a blend containing 70 wt % ethylene norbornene copolymer, which is a cyclic olefin copolymer. Film No. 19 contained the cyclic olefin copolymer in an amount of 49 wt %, based on total film weight.

In FIGS. 29-44, a comparison of the amount of various desirable aroma and flavor components in the aged distillate in the barrel surrounded by Film No. 19 was more than 50 percent of the amount of the same aroma and flavor components in the aged distillate in the control barrel. In view of the much lower levels of the same flavor components produced by PVC (Film No. 39) and the foil-based film (Film No. 40), these results were unexpected. Moreover, FIGS. 29-44 show that the amount of the various desirable aroma and flavor components in the aged distillate from the barrel surrounded by Film No. 19 were present at a level of more than 75 percent of the amount of the same aroma and flavor components in the aged distillate in the control barrel, which was yet a further level of unexpectedness.

In FIGS. 32 (syringol), 33 (eugenol), 35 (cis-β-methyl-γ-octalactone), 36 (o-cresol), 37 (2-methoxy-4-methylphenol), 38 (4-methylsyringol), 39 (4-ethylguaiacol), 41 (vanillyl methyl ketone), 42 (methoxyeugenol), and 44 (furfural), the amount of the aroma and flavor component in the aged distillate from the barrel surrounded by Film No. 19 exceeded the amount (i.e., was unexpectedly more than 100% of the amount) of the corresponding aroma and flavor component in the control distillate aged without a film around the barrel. This result is of further significance because it suggests that the presence of the film produced accelerated aging of these specific aroma and flavor components by producing these aroma and flavor components at a faster rate. This has the potential to produce aged distillates of enhanced quality and/or accelerated aging rate.

In contrast to the aged distillate from the barrel surrounded by Film No. 19 and the control distillate aged without a film around the barrel, FIGS. 29-44 show that the aged distillates from the barrels surrounded by Film No. 39 (PVC—in accordance with the prior art) and Film No. 40 (coated metal foil in accordance with prior art) produced less than half of the flavor components of the control distillate. In most cases, Film Nos. 39 and 40 produced less than 25 percent of the flavor components of the control distillate. In two cases (FIG. 33: eugenol; FIG. 34: isoeugenol), the flavor component in the aged distillates from the barrels surrounded by Film No. 39 (PVC) and Film No. 40 (Foil) was less than 10 percent of the same flavor component in the working example utilizing Film No. 19.

Figure 45:
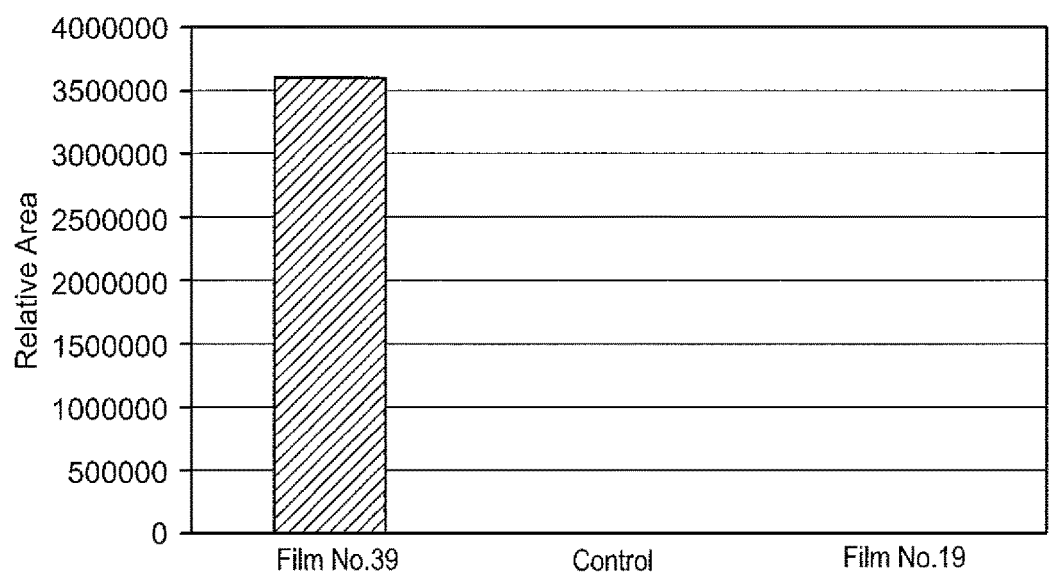

Finally, FIG. 45 shows that the aged distillate from the barrel surrounded by Film No. 39 (100% polyvinylchloride (PVC)), contained a relatively high amount of di(2-ethylhexyl)phthalate (DEHP), a compound providing an unfavorable aroma. This is believed to be at least part of the reason that panelists were able to detect a difference between the alcoholic beverage aged in Film No. 39 versus the alcoholic beverages aged in Film Nos. 19, 20, and 22.

Although the present invention has been described with reference to the preferred embodiments, it is to be understood that modifications and variations of the invention exist without departing from the principles and scope of the invention, as those skilled in the art will readily understand. Accordingly, such modifications are in accordance with the claims set forth below.

What is claimed is:

1. A process for aging an alcoholic beverage, comprising:
 (A) filling a first wooden barrel with an unaged alcoholic beverage, the barrel having an outer surface;
 (B) covering at least 60 percent of the outer surface of the first wooden barrel with a film having an oxygen transmission rate of at least 100 cc/m²/day and an ethanol transmission rate of less than 3 g/m²/day;
 (C) aging the unaged alcoholic beverage under ambient conditions while the alcoholic beverage remains in the first wooden barrel surrounded by the film for a time period of at least 1 month, to produce an aged alcoholic beverage, and
 wherein during aging, the alcoholic beverage acquires or produces at least one flavor component selected from the group consisting of vanillin, guaiacol, syringaldehyde, syringol, eugenol, isoeugenol, cis-β-methyl-γ-octalactone, o-cresol, 2-methoxy-4-methylphenol, 4-methylsyringol, 4-ethylguaiacol, 4-vinylguaiacol, vanillyl methyl ketone, methoxyeugenol, sinapaldehyde, and furfural, so that the aged alcoholic beverage contains the at least one flavor component in an amount of at least 50% relative to an amount of the same flavor component in a control alcoholic beverage aged in a control wooden barrel without any film covering the control barrel during aging.

2. The process according to claim 1, wherein at least 75% of the outer surface of the first wooden barrel is covered with the film, and the aged alcoholic beverage contains the at least one flavor component in an amount of at least 75% relative to the amount of the same flavor component in the control alcoholic beverage.

3. The process according to claim 2, wherein the aged alcoholic beverage contains each flavor component in the group consisting of vanillin, guaiacol, syringaldehyde, syringol, eugenol, isoeugenol, cis-β-methyl-γ-octalactone, o-cresol, 2-methoxy-4-methylphenol, 4-methylsyringol, 4-ethylguaiacol, 4-vinylguaiacol, vanillyl methyl ketone, methoxyeugenol, sinapaldehyde, and furfural in an amount of at least 75% relative to the amount of each corresponding flavor component in the control alcoholic beverage.

4. The process according to claim 1, wherein the film surrounds the outer surface of the first wooden barrel, and the aged alcoholic beverage contains each flavor component in the group consisting of each of syringol, eugenol, cis-β-methyl-γ-octalactone,o-cresol, 2-methoxy-4-methylphenol, 4-methylsyringol, 4-ethylguaiacol, vanillyl methyl ketone, and furfural in an amount of more than 100% relative to the amount of each corresponding flavor component in the control alcoholic beverage.

5. The process according to claim 1, wherein the film surrounds the outer surface of the first wooden barrel, and the film comprises cyclic olefin copolymer in an amount of from 15 to 80 weight percent, based on total film weight, and wherein the film has a thickness of from 1.5 to 6 mils, and wherein the aged alcoholic beverage contains eugenol in an amount of at least 110% relative to the amount of eugenol in the control alcoholic beverage.

6. The process according to claim 1, wherein the film comprises cyclic olefin copolymer in an amount of from 15 to 80 weight percent, based on total film weight, and the film has a thickness of from 1.5 to 6 mils and an ethanol transmission rate of less than 1 $g/m^2$/day and an oxygen transmission rate of at least 170 $cc/m^2$/day.

7. The process according to claim 1, wherein the film is a multilayer film comprising polyolefin in an amount of from 50 to 82 percent, based on total film weight, and cyclic olefin copolymer in an amount of from 18 to 50 weight percent based on total film weight, with the cyclic olefin copolymer being present in a blend with polyolefin, the film having a thickness of from 1.5 to 4 mils.

8. The process according to claim 7, wherein the multilayer film comprises three layers including two outer layers and one inner layer, the inner layer comprising a blend of from 20 to 80 wt % ethylene norbornene copolymer and from 80 to 20 wt % ethylene/alpha-olefin copolymer, and the alcoholic beverage product is selected from distillate and wine.

9. The process according to claim 8, wherein the barrel is surrounded by the film and the film has an ethanol transmission rate of less than 1 $g/m^2$/day and an oxygen transmission rate of at least 170 $cc/m^2$/day and a moisture vapor transmission rate less than 1 $g/m^2$/day, and the aged alcoholic beverage, either having an alcohol by volume of less than 30% or being diluted with water to have an alcohol by volume of 30%, exhibits an aroma and flavor, evaluated in accordance with ASTM E1879-00 Sensory Evaluation of Beverages Containing Alcohol, and ASTM E1885-04 Standard Method for Sensory Analysis—Triangle Test, indistinguishable relative to the control barrel containing the control alcoholic beverage.

10. The process according to claim 9, wherein the inner layer comprises a blend of from 40 to 60 wt % ethylene norbornene copolymer and from 60 to 40 wt % polyolefin, and the film has a thickness of from 2 to 3.5 mils and an ethanol transmission rate of less than 0.5 $g/m^2$/day and an oxygen transmission rate of at least 170 to 250 $cc/m^2$/day, and the first aged alcoholic beverage, either having an alcohol by volume of less than 30% or being diluted with water to have an alcohol by volume of 30%, further exhibits a color, evaluated in accordance with ASTM E1879-00 Sensory Evaluation of Beverages Containing Alcohol, and ASTM E1885-04 Standard Method for Sensory Analysis—Triangle Test, indistinguishable relative to the control barrel containing the control alcoholic beverage.

11. A process for aging an alcoholic beverage, comprising:
(A) filling a first wooden barrel with the unaged alcoholic beverage, the barrel having an outer surface;
(B) covering at least 60 percent of the outer surface of the first wooden barrel with a film having an oxygen transmission rate of at least 100 $cc/m^2$/day and an ethanol transmission rate of less than 3 $g/m^2$/day; and
(C) aging the unaged alcoholic beverage in the first wooden barrel covered with the film, the aging being carried out under ambient conditions for a time period of at least 1 month while the alcoholic beverage remains in the first wooden barrel covered by the film, to produce an aged alcoholic beverage, wherein during aging an angel share fraction of the alcoholic beverage escapes through the wooden barrel and through the film covering the outer surface of the wooden barrel, with the angel share fraction being at least 30% less relative to a corresponding angel share fraction escaping through a wooden control barrel containing a control alcoholic beverage aged in the control barrel, the control barrel having an outer surface in direct contact with an ambient atmosphere without any film covering any portion of the control barrel; and
wherein the aged alcoholic beverage, either having an alcohol by volume of less than 30% or upon being diluted with water to have an alcohol by volume of 30%, exhibits an aroma and flavor, upon evaluation in accordance with ASTM E1879-00 Sensory Evaluation of Beverages Containing Alcohol together with ASTM E1885-04 Standard Method for Sensory Analysis—Triangle Test, indistinguishable relative to the control barrel containing the control alcoholic beverage aged therein, the aged control alcoholic beverage also having an alcohol by volume of less than 30% or being diluted with water to have an alcohol by volume of 30%.

12. The process according to claim 11, wherein the first barrel is surrounded by the film and wherein the angels' share fraction escaping through the first wooden barrel and through the film is at least 70% less than the angel share fraction escaping through the wooden control barrel containing the control alcoholic beverage, and wherein the film comprises polyolefin.

13. The process according to claim 11, wherein the first barrel is surrounded by the film and wherein the angels' share fraction escaping through the first wooden barrel and through the film is at least 85% less than the angel share fraction escaping through the wooden control barrel containing the control alcoholic beverage, and wherein the film comprises from 30 to 85 wt % polyolefin and from 70 to 15 wt % ethylene/norbornene copolymer based on total film weight, and wherein the film has an oxygen transmission rate of from 170 to 350 $cc/m^2$/day and an ethanol transmission rate of from 0.10 to 1.0 $g/m^2$/day, and a moisture vapor transmission rate of 0.1 to 0.8 $g/m^2$/day.

14. The process according to claim 13, wherein during aging the angels' share fraction escaping through the first wooden barrel and through the film is at least 90% less than the angel share fraction escaping through the wooden control barrel containing the control alcoholic beverage, and wherein the film comprises from 40 to 60 wt % polyolefin and from 60 to 40 wt % ethylene/norbornene copolymer based on total film weight, and wherein the film has an oxygen transmission rate of from 170 to 250 $cc/m^2$/day and an ethanol transmission rate of from 0.17 to 0.27 $g/m^2$/day, and wherein the aged alcoholic beverage, either having an alcohol by volume of less than 30% or being diluted with water to have an alcohol by volume of 30%, further exhibits a color, evaluated in accordance with ASTM E1879-00 Sensory Evaluation of Beverages Containing Alcohol, and ASTM E1885-04 Standard Method for Sensory Analysis— Triangle Test, indistinguishable relative to the control barrel containing the control alcoholic beverage.

15. A process for aging an alcoholic beverage, comprising:
(A) filling a wooden barrel with an unaged alcoholic beverage, the wooden barrel having an oxygen transmission rate of from 1 to 10 cc/m$^2$/day;
(B) covering an outer surface of the barrel with a film having an oxygen transmission rate of at least 100 cc/m$^2$/day and an ethanol transmission rate of less than 3 g/m$^2$/day, the film having a thickness of from 1 to 10 mils; and
(C) aging the unaged alcoholic beverage while it remains in the wooden barrel, covered by the film, for at least 1 month, to produce an aged alcoholic beverage.

16. The process according to claim 15, wherein the film has an ethanol transmission rate of from 0.15 to 2 g/m$^2$/day, and the film comprises polyolefin.

17. The process according to claim 11, wherein the film has a thickness of from 1.5 to 5 mils.

18. The process according to claim 16, wherein the film has an oxygen transmission rate of at least 120 cc/m$^2$/day and an ethanol transmission rate of 0.1 to 1 g/m$^2$/day, and the film further comprises a cyclic olefin copolymer, and the aging of the alcoholic beverage is carried out for at least 2 months.

19. The process according to claim 18, wherein the film further comprises a blend of the polyolefin and the cyclic olefin copolymer, and the cyclic olefin copolymer comprises ethylene/norbornene copolymer, and the ethylene norbornene copolymer is present in the film in an amount of from 15 to 70 weight percent based on total film weight and the polyolefin is present in the film in an amount of from 30 to 85 wt % based on total film weight, and the aging of the alcoholic beverage is carried out for at least 3 months, and the film has a thickness of from 2 to 4 mils, an oxygen transmission rate of from 150 to 500 cc/m$^2$/day, an ethanol transmission rate of less than 1 g/m$^2$/day, and a moisture vapor transmission rate less than 1 g/m$^2$/day.

\* \* \* \* \*